US012811777B2

(12) United States Patent
Roopan

(10) Patent No.: US 12,811,777 B2
(45) Date of Patent: Nov. 24, 2026

(54) DECENTRALIZED ARTIFICIAL INTELLIGENCE BASED SYSTEM AND METHOD FOR PROCESSING TASKS BASED ON PROMPTS

(71) Applicant: InfinityOne LLC, Lewes, DE (US)

(72) Inventor: Brian Rajiv Roopan, Arlington, VA (US)

(73) Assignee: InfinityOne LLC, Lewes, DE (US)

( * ) Notice: Subject to any disclaimer, the term of this patent is extended or adjusted under 35 U.S.C. 154(b) by 0 days.

(21) Appl. No.: 18/886,560

(22) Filed: Sep. 16, 2024

(65) Prior Publication Data

US 2025/0247211 A1 Jul. 31, 2025

Related U.S. Application Data

(60) Provisional application No. 63/661,666, filed on Jun. 19, 2024, provisional application No. 63/650,869, filed on May 22, 2024, provisional application No. 63/627,289, filed on Jan. 31, 2024.

(51) Int. Cl.
*H04L 9/08* (2006.01)
*G06F 16/34* (2019.01)

(52) U.S. Cl.
CPC .......... *H04L 9/0822* (2013.01); *G06F 16/345* (2019.01)

(58) Field of Classification Search
CPC ............................. H04L 9/0822; G06F 16/245
See application file for complete search history.

(56) References Cited

U.S. PATENT DOCUMENTS

| | | | | |
|---|---|---|---|---|
| 8,166,021 | B1 * | 4/2012 | Cao | G06F 16/313 707/748 |
| 9,430,584 | B2 * | 8/2016 | Wang | G06F 16/90324 |
| 9,477,825 | B1 * | 10/2016 | Sinchak | H04L 63/08 |

(Continued)

FOREIGN PATENT DOCUMENTS

WO WO-2024243107 A1 * 11/2024 ....... G06F 16/24542

OTHER PUBLICATIONS

Ramesh Raskar, "NANDA: Networked agents and Decentralized AI," https://www.linkedin.com/pulse/nanda-networked-agents-decentralized-ai-ramesh-raskar-m3oie/. Feb. 21, 2025.

(Continued)

*Primary Examiner* — Tarek Chbouki
(74) *Attorney, Agent, or Firm* — Studebaker Brackett PLLC

(57) ABSTRACT

A system includes a plurality of nodes. Each of the plurality of nodes includes memory; a network interface; and a hardware processor coupled with the memory and the network interface. The system further includes a computing device. The computing device includes memory storing a master key, security keys encrypted using the master key, and associations between the security keys and the nodes. The computing device further includes a network interface and a hardware processor coupled with the memory and the network interface. The processor is configured to receive, from a node of the one or more nodes, a request for a security key of the one or more security keys, identify an association between the node and the security key within the associations, decrypt the security key using the master key to generate a decrypted security key, and communicate the decrypted security key to the node.

17 Claims, 32 Drawing Sheets

(56) References Cited

U.S. PATENT DOCUMENTS

| | | | | |
|---|---|---|---|---|
| 11,704,313 | B1 * | 7/2023 | Andrade | G06F 16/24535 707/714 |
| 11,921,764 | B2 * | 3/2024 | Prasad Tanniru | G06F 16/35 |
| 2009/0119095 | A1 * | 5/2009 | Beggelman | G06F 40/30 704/9 |
| 2013/0036112 | A1 * | 2/2013 | Poon | G06F 16/9536 707/723 |
| 2016/0182222 | A1 * | 6/2016 | Rane | H04L 63/0428 713/168 |
| 2017/0221240 | A1 * | 8/2017 | Stetson | G06F 16/9024 |
| 2019/0102430 | A1 * | 4/2019 | Wang | G06N 7/01 |
| 2019/0334705 | A1 * | 10/2019 | Parimal | H04L 9/3215 |
| 2021/0406774 | A1 * | 12/2021 | Browne | G06N 3/04 |
| 2023/0094137 | A1 * | 3/2023 | Pehl | G06F 16/9024 707/736 |
| 2024/0354325 | A1 * | 10/2024 | Baker | G06F 16/2386 |
| 2024/0403112 | A1 * | 12/2024 | Mohammed | G06Q 10/06311 |
| 2024/0404687 | A1 * | 12/2024 | Bell | G06Q 10/0633 |
| 2024/0406166 | A1 * | 12/2024 | Bell | G06N 3/045 |
| 2024/0419487 | A1 * | 12/2024 | Sharma | G06F 9/4881 |
| 2024/0427774 | A1 * | 12/2024 | Schmid | G06F 16/24565 |
| 2025/0192980 | A1 * | 6/2025 | Patil | G06F 16/254 |

OTHER PUBLICATIONS

"NANDA: The Internet of AI Agents, Pioneering the Future of Decentralized Intelligence," https://nanda.media.mit.edu. May 6, 2025.

* cited by examiner

DECENTRALIZED ARTIFICIAL INTELLIGENCE BASED SYSTEM AND METHOD FOR PROCESSING TASKS BASED ON PROMPTS

RELATED APPLICATIONS

This application claims priority under 35 U.S.C. § 119(e) to U.S. Provisional Application Ser. No. 63/627,289, titled "SYSTEMS AND METHODS FOR AN ENTERPRISE GENERATIVE AI SYSTEM," filed on Jan. 31, 2024, which is hereby incorporated herein by reference in its entirety. This application claims priority under 35 U.S.C. § 119(e) to U.S. Provisional Application Ser. No. 63/650,869, titled "SYSTEMS AND METHODS FOR A DECENTRALIZED ARTIFICAL INTELLIGENCE PLATFORM," filed on May 22, 2024, which is hereby incorporated herein by reference in its entirety. This application claims priority under 35 U.S.C. § 119(e) to U.S. Provisional Application Ser. No. 63/661,666, titled "SYSTEMS AND METHODS FOR A DECENTRALIZED ARTIFICAL INTELLIGENCE PLATFORM," filed on Jun. 19, 2024, which is herein incorporated by reference in its entirety.

TECHNICAL FIELD

Examples of the present disclosure relate to decentralized artificial intelligence (AI) platforms, and more particularly relate to a decentralized AI-based system and method for processing one or more tasks based on one or more prompts.

BACKGROUND

Generative AI refers to a class of artificial intelligence models capable of generating new content, such as text. images, and music, based on patterns learned from existing data. These AI models, including advanced architectures like Generative Pre-trained Transformer (GPT) and Deep Learning to Answer Long Questions (DALL-E), leverage deep learning techniques to produce outputs that mimic human creativity and intelligence. Generative AI models, whether commercial or open source, can summarize documents, generate emails, and even conduct advanced data analysis from multiple sources. Other capabilities of these AI models include reasoning (e.g., analyzing of tabular data to extract insights), assisting with multi-modal content generation, and the like.

Some generative AI models receive prompts and generate output (e.g., content) in response to the prompts. A prompt may include a piece of text or instruction to elicit a specific response or otherwise guide the output. Prompts often set up scenarios, include context, and ask questions that request specific types of content. Prompts may range from simple questions to complex instructions or even snippets of text that the receiving generative AI model is meant to continue or expand upon. The quality and specificity of the prompt often influence the relevance and accuracy of responses produced by generative AI models.

Retrieval augmented generation (RAG) systems can further improve the relevance and accuracy of responses produced by generative AI models. RAG systems incorporate information regarding a targeted subject matter domain in the prompts passed to the generative AI models. Incorporation of the targeted information into the prompts grounds the generative AI models to the subject matter domain, thereby reducing hallucinations and increasing response relevance and accuracy. RAG systems source the target information from search engine results.

AI agents carry out complex tasks by utilizing AI models and specialized agent tools. AI agents mark a substantial advancement from basic RAG systems, providing enhanced abilities to interact with data, perform actions, and solve multi-step problems. Additionally, the AI agent identifies necessary parameters for each tool by extracting information from the task's associated prompt, then supplying this data to the selected agent tools. Further, AI models associated with the AI agents may be configured for a specific country, language, industry, organization, department, team along with roles responsibilities, capabilities, skills, and the like.

LamaIndex and LangChain are robust frameworks for developing the AI agents, providing a variety of built-in agent tools to enhance their functionality. LamaIndex includes features including at least one of query engines, custom function agent tools, and specialized agents like ReAct Agent and OpenAI Agent. LangChain offers memory modules, vector stores, and document loaders. Both frameworks facilitate web scraping, database connectivity, application programming interface (API) integrations, and search functionalities. The frameworks further enable the creation of custom agent tools, allowing developers to customize the AI agents for specific tasks. These agent tools enable AI agents to perform diverse functions, including data analysis, information retrieval, complex problem-solving, and interaction with external services, making the AI agents highly versatile and adaptable for various AI applications.

Vector databases are specialized systems crafted to store, manage, and efficiently query high-dimensional vector data, essential for AI and machine learning applications. Well-known vector databases include Wcaviate, Pinecone, Milvus, Qdrant, Faiss, and Vespa, along with solutions from major cloud providers such as Amazon's OpenSearch, Google's Vertex AI, and Azure Cognitive Search. These databases are particularly effective at performing similarity searches, allowing for a rapid and precise retrieval of related data points. This capability is crucial for applications including recommendation systems, natural language processing (NLP), and image recognition.

Vector embeddings are numerical representations that capture semantic relationships within data, created by various models depending on data type. For text, commonly used models include Word2Vec, Bidirectional Encoder Representations from Transformers (BERT), and OpenAI's text embedding models, which convert words and sentences into dense vectors. Image embedding models including Convolutional Neural Networks (CNNs) and Contrastive Language Image Pretraining (CLIP) transform visual information into vector space, while audio embedding models including wav2vec handle sound data. Multi-modal models including CLIP may process both text and images, creating embeddings that enable cross-modal comparisons. The choice of embedding model depends on the specific use case, data type, and desired performance characteristics, with factors including model size, inference speed, and output dimensionality being crucial in the selection process.

Message queues are helpful in distributed systems and asynchronous communication setups. The message queues serve as intermediate storage for messages or tasks, enabling different system components to interact without needing direct or simultaneous connections. In these systems, producers place messages into the queue, while consumers pull and process these messages at their convenience. This separation of sender and receiver enhances scalability, fault tolerance, and system flexibility. The message queues may manage large amounts of data, ensure message delivery even if parts of the system are down, and support load balancing among multiple consumers. Notable message queue technologies include Apache Kafka, RabbitMQ, and Amazon SQS, each offering unique features for message persistence, ordering, and delivery assurance.

SUMMARY

This summary is provided to introduce a selection of concepts, in a simple manner, which is further described in the detailed description of the disclosure. This summary is neither intended to identify key or essential concepts of the subject matter nor to determine the scope of the disclosure.

At least one example is directed to a decentralized AI-based system and method for processing one or more tasks based on one or more prompts. This example solves several technical issues present in other task-processing systems and methods. For instance, some methods rely on a single device to execute complex processes, thus producing a single point of failure. However, decentralized and collaborative autonomous capabilities are needed for some situations, such as when deploying robots in burning buildings, clearing land mines from fields, or constructing structures in inhospitable environments. While some systems utilize AI models and specialized technologies to plan and control mechanical devices like robots for manufacturing or construction, these systems often lack the ability to collaboratively use multiple devices to complete a task.

Some task-processing methods further rely on information stored in centralized repositories, including file systems, project management tools, internal websites, and wikis. Although this approach may be convenient, it may present significant security risks if sensitive data is not encrypted. Even when encryption is used, relying on a single key for all data still leaves some systems vulnerable if the key is compromised.

Some task-processing methods further rely on vector databases to store both text and vectors, but these databases frequently fail to encrypt stored text and multi-modal data, creating a substantial security risk, particularly for sensitive data from organizations and government agencies. Without encryption, this data is susceptible to unauthorized access and potential breaches, which can have serious repercussions for data privacy and security. Therefore, implementing strong encryption measures is essential to protect this information from such threats.

The example system and methods described herein overcome the disadvantages described above, among others. For instance, in at least one example, a decentralized data storage and retrieval process allows different departments within an organization to have their own nodes with their own data separated from other nodes. Each department, team, or user may have their own node. Each node may include its own unique data security key to encrypt and decrypt the one or more data. The unique data security keys are sorted in a key vault and further encrypted with the key vaults master encryption key. A node without it's data security key cannot operate properly, and this fact allows for scheduled control over a node by withholding/denying access to its data security key. A data security key may also be withheld, deleted or denied in cases of security threats.

In at least one example, a system is provided. The system includes a plurality of nodes. Each node of the plurality of nodes includes a memory and at least one processor coupled with the memory. The at least one processor is configured to receive a prompt via an interface, generate a plurality of tasks to respond to the prompt, the plurality of tasks being associated with a subset of the plurality of nodes, each task of the plurality of tasks being associated with at least one node of the subset of the plurality of nodes, communicate the plurality of tasks to the subset of the plurality of nodes, receive one or more responses from the subset of the plurality of nodes, generate a summary response based on the one or more responses, and communicate the summary response via the interface.

In the system, the at least one processor may be further configured to receive a task of the plurality of tasks; and execute the task to generate a response of the one or more responses. The at least one processor may be further configured to identify the subset of the plurality of nodes based on one or more of node capability, node schedule, or node subject matter area. To identify the subset may include to access an ontology that relates nodes with one or more capabilities, one or more schedules, and one or more subject matter areas. The ontology may be stored in a graph database in which edges relate the nodes with the one or more capabilities, the one or more schedules, and the one or more subject matter areas. To generate the plurality of tasks may include to pass the prompt to an artificial intelligence (AI) agent configured to select a tool to process the prompt. The tool may include an AI model trained to generate plans including tasks to collectively respond to prompts.

In another example, a system is provided. The system includes a plurality of nodes. Each node of the plurality of nodes includes a memory storing one or more ontologies that associate one or more nodes of the plurality of nodes with one or more domains of data, each node of the one or more nodes being associated with at least one domain of the one or more domains of data; and at least one processor coupled with the memory. The at least one processor is configured to receive, via an interface, a query requesting data from the one or more domains of data, identify, via the ontology, a subset of the one or more nodes storing the data, retrieve the data from the subset of the one or more nodes, generate a response to the query based on the data, and communicate a response via the interface.

In the system, to identify the subset may include to traverse one or more graph databases storing the one or more ontologies. The one or more ontologies may include one or more of a data storage ontology, a subject matter ontology, a geospatial ontology, geofence, a capability ontology, or an availability ontology. The data storage ontology may relate data stores, nodes, and subject matter areas. The geospatial ontology may relate nodes with geospatial information. The query may be a first query. To retrieve the data may include to communicate a second query based on the first query to a node of the subset. To retrieve the data may include to determine whether the data is private data or public data.

In another example, a system is provided. The system includes a plurality of nodes. Each of the plurality of nodes includes first memory; at least one first network interface; and at least one first hardware processor coupled with the first memory and the first network interface. The system further includes a computing device. The computing device includes second memory storing a master key, one or more security keys encrypted using the master key, and one or more associations between the one or more security keys and one or more nodes of the plurality of nodes. The computing device further includes a second network interface and at least one second hardware processor coupled with the second memory and the second network interface. The at least one second processor is configured to receive, from a node of the one or more nodes, a request for a security key of the one or more security keys, identify an association between the node and the security key within the one or more associations, decrypt the security key using the master key to generate a decrypted security key, and communicate the decrypted security key to the node.

In the system, the at least one second hardware processor may be further configured to determine whether the request is in compliance with a security schedule for the node. The node may include a data security subsystem and to communicate the decrypted security key may include to communicate the decrypted security key to the data security subsystem. The node may include at least one other subsystem and the data security subsystem may be configured to receive a request from the other subsystem to decrypt target data; determine whether the target data is public data or private data; and decrypt the target data if the target data is public data. To decrypt the target data may include to decrypt data represented by a vector stored as plaintext. The node may include at least one other subsystem and the data security subsystem may be configured to receive a request from the other subsystem to decrypt target data; determine whether the target data is public data or private data; and deny decryption of the target data if the target data is private data.

To further clarify the advantages and features of the present disclosure, a more particular description will follow by reference to specific examples, which are illustrated in the appended figures. It is to be appreciated that these figures depict only typical examples of the disclosure and are therefore not to be considered limiting in scope. Additional specificity and detail will be described with the accompanying figures, which are incorporated within and constitute a part of this specification.

BRIEF DESCRIPTION OF DRAWINGS

The disclosure will be described and explained with additional specificity and detail with the accompanying figures.

Figure 1:
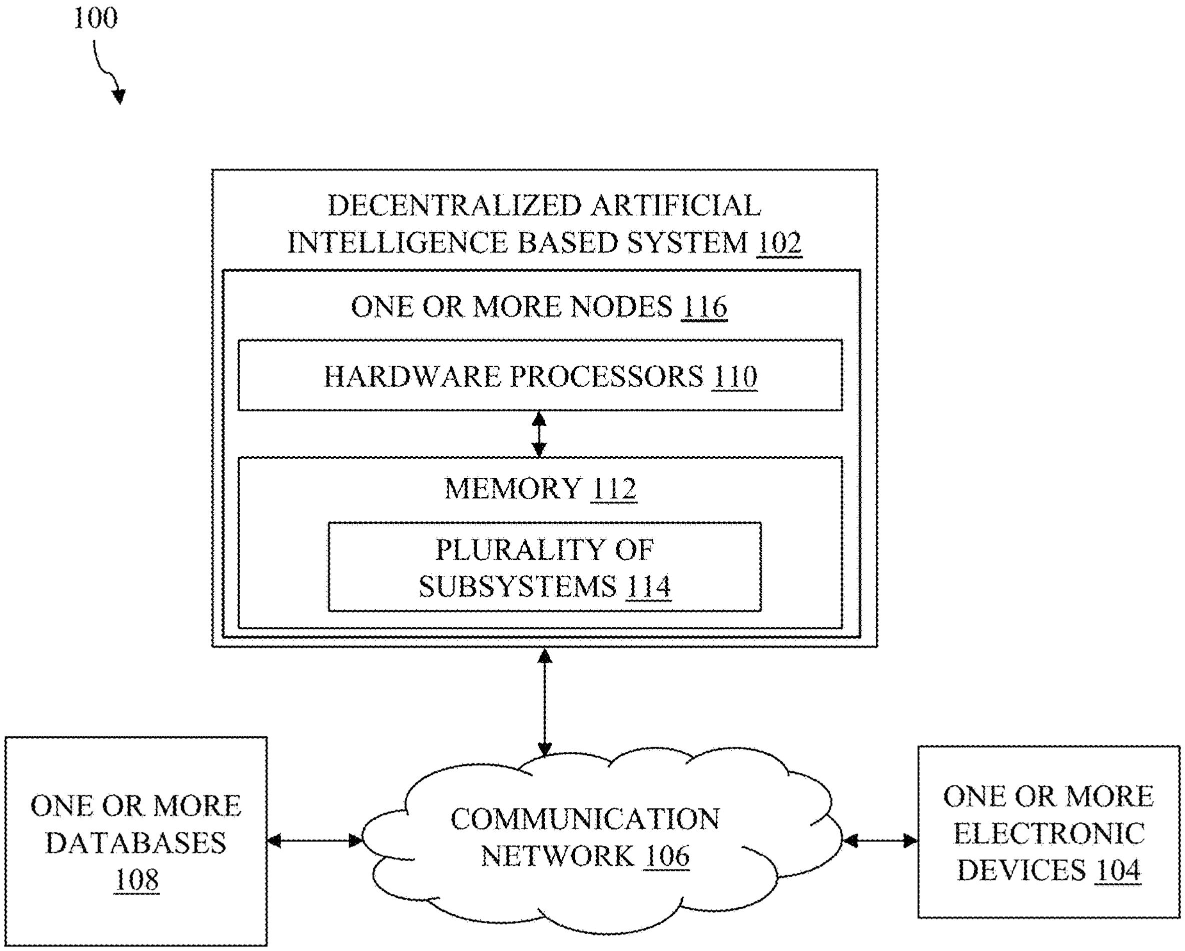
FIG. 1 is a block diagram illustrating a computing environment with a decentralized AI-based system for processing one or more tasks based on one or more prompts, in accordance with an example of the present disclosure.

Further, those skilled in the art will appreciate that elements in the figures are illustrated for simplicity and may not have necessarily been drawn to scale. Furthermore, in terms of the construction of the device, one or more aspects of the device may have been represented in the figures by conventional symbols, and the figures may show only those specific details that are pertinent to understanding the examples of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the examples illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are explanatory of the disclosure and are not intended to be restrictive thereof.

The terms “comprise”, “comprising”, or any other variations thereof, are intended to cover a non-exclusive inclusion, such that one or more devices, systems, sub-systems, elements, or structures preceded by “comprises . . . a” does not, without more constraints, preclude the existence of other devices, systems, sub-systems, elements, or structures. Appearances of the phrase “in an example”, “in another example” and similar language throughout this specification may, but not necessarily do, all refer to the same example. Moreover, any feature, aspect, or structure described with reference to a particular example or implementation may be incorporated within any example or implementation. As such, individual examples or implementations are not intended to be mutually exclusive relative to one another.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (e.g., standalone, client or server computer system) configured by an application may constitute a subsystem that is configured and operated to perform certain operations. In some examples, the subsystem may be implemented mechanically or electronically, so a subsystem includes dedicated circuitry or logic that is permanently configured (within a special-purpose processor) to perform certain operations. In another example, a subsystem may also comprise programmable logic or circuitry (as encompassed within a general-purpose processor or other programmable processor) that is configured by code to perform certain operations.

Some examples described herein are implemented using a computer system (standalone, client or server system, or other system including memory and a processor) configured to execute certain operations. This configuration may be accomplished by a combination of software code and a programmable processor and/or by dedicated circuitry or logic that is permanently configured to perform certain operations. The computer systems described herein may further include a network interface including a hardware port, network card, and a software stack configured to drive operation of network interface. This software stack may include drivers and other network software to support, for example, a transmission control protocol-internet protocol (TCP-IP) network. Other types of wired and wireless network interfaces will be apparent to those skilled in the art.

Some examples described herein utilize one or more AI agents. These AI agents may be implemented, for example, using the LlamaIndex framework. The AI agents may access a generative AI model (such as a large language model) and one or more tools to execute tasks and generate a variety of content. The AI models accessed by the agents may be hosted locally on a node that hosts the AI agent, or remotely on a computing device distinct from the host node.

Referring now to the drawings, and more particularly to FIG. 1 through FIG. 13, where similar reference characters denote corresponding features consistently throughout the figures, there are shown some examples, and these examples are described in the context of the following example system and/or method.

FIG. 1 is a block diagram illustrating a computing environment 100 with a decentralized AI-based system 102 configured to execute one or more tasks based on one or more user-originated prompts, in accordance with an example of the present disclosure. The user-originated prompts may include one or more character strings, such as “Mine aluminum on Mars.” As shown in FIG. 1, the environment 100 includes the system 102, one or more databases 108, and one or more electronic devices 104 that are configured to communicate with one another via a communication network 106. The system 102, in turn, includes one or more nodes 116. Individual nodes may be referred to herein as a node 116. Each of the nodes 116 includes one or more hardware processors 110 coupled with memory 112. The memory 112 stores software code configured to implement a plurality of subsystems 114. Like the nodes 116, in some examples, the system 102, the databases 108, the devices 104, and the network 106 may be implemented using one or more computing devices that include one or more hardware processors (e.g., the hardware processors 110) and memory (e.g., the memory 112) coupled with the hardware processors. Within these computing devices the hardware processors may retrieve software code from the memory and execute processes (e.g., programs) described herein to implement aspects of the system 102.

In some examples, the one or more hardware processors 110 may be any type of computational circuit, including, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, neural processing unit, or any other type of processing circuit. The one or more hardware processors 110 may also include embedded controllers, including generic or programmable logic devices or arrays, application specific integrated circuits, single-chip computers, or the like.

In some examples, the memory 112 may be non-transitory volatile memory and/or non-volatile memory. The memory 112 may be coupled for communication with the one or more hardware processors 110, being a computer-readable storage medium. The one or more hardware processors 110 may execute machine-readable instructions and/or source code stored in the memory 112. A variety of machine-readable instructions may be stored in and accessed from the memory 112. The memory 112 may include any suitable elements for storing data and machine-readable instructions, including read only memory, random access memory, erasable programmable read only memory, electrically erasable programmable read only memory, a hard drive, a removable media drive for handling compact disks, digital video disks, diskettes, magnetic tape cartridges, memory cards, or the like. In the present example, the memory 112 includes the plurality of subsystems 114 stored in the form of machine-readable instructions on any of the above-mentioned storage media and may be in communication with the one or more hardware processors 110.

Continuing with FIG. 1, the devices 104 and the nodes 116 include one or more interfaces (e.g., the interface subsystem 206 described further below with reference to FIG. 2) through which one or more users provide one or more inputs to the system 102. The inputs may include user-originated prompts and/or context associated with the user-originated prompts. For instance, in some examples, the inputs may include user-originated prompts in the form of vocalizations that are converted to strings of text via NLP or strings entered by a keyboard or some other input device. Additionally or alternatively, in some examples, each of the nodes 116 includes one or more interfaces configured to receive input prior to, during, or after execution of the tasks. This input may include, for example, additional context for user-originated prompts.

Continuing with FIG. 1, the system 102 may be configured to generate a plan to fulfil or otherwise respond to each user-originated prompt. For instance, in some examples, any one of the nodes 116 can receive a user-originated prompt and pass the user-originated prompt to a task logistics subsystem (e.g., the task logistics subsystem 210 described further below with reference to FIG. 2). In some examples, the task logistics subsystem includes one or more AI agents that access one or more AI models to generate a plan including one or more tasks. Within the plan, each of the tasks may be assigned to at least one of the one or more nodes 116.

Continuing with FIG. 1, the system 102 may be further configured to distribute the tasks specified in the plan to a subset of the nodes 116 for execution. For instance, in some examples, the plan includes data that maps the tasks to identified nodes within the subset. To distribute the tasks, the task logistics subsystem may be configured to transmit a request message to each node in the subset to execute a task mapped to the node in the plan. These request messages may conform to an API exposed and implemented by and between the task logistics subsystem and a task processor subsystem (e.g., the task processor subsystem 214 described further below with reference to FIG. 2) for the purpose of distributing tasks to nodes. It should be noted that this API, along with all other APIs described herein, may be secured by an API key that is used to encrypt API messages and data. API keys are described further below with reference to the key vault system 288 of FIG. 2. Moreover, the APIs described herein may traverse one or more public and/or private networks (e.g., one or more internet protocol networks) connecting the nodes 116 and may adhere to any of a variety of architectural styles, command sets, and protocols. For instance, in at least one example, the APIs may be configured to utilize a representational state transfer (REST) architecture that transmits and receives calls using hypertext transfer protocol (HTTP). Other variations to the APIs described herein will be apparent in view of this disclosure. In some examples, the nodes 116 may utilize one or more message queues in conjunction with the API to ensure reliable message delivery.

Continuing with FIG. 1, the system 102 may be further configured to process the tasks specified in the plan. For instance, in some examples, each node of the subset of nodes 116 is configured to execute a task processor subsystem (e.g., the task processor subsystem 214 described further below with reference to FIG. 2). In some examples, the task processor subsystem includes an AI agent fine-tuned or otherwise configured to process tasks (e.g., agent-generated prompts) targeted for execution by the node. In these examples, the AI agent is configured to parse each received task processor request message to extract an agent-generated prompt specified in the message and pass the agent-generated prompt to an AI model fine-tuned or otherwise configured to process tasks (e.g., agent-generated prompts) targeted for execution by the node. In these examples, the AI model is configured to receive the agent-generated prompt, process the agent-generated prompt to generate a response, and pass the response to the AI agent. The AI agent, in turn, is configured to store the response in a data store local to the node. It should be noted that, in some examples, the response data may include only publicly available data if the origin subsystem is not local to the node executing the AI agent. In these examples, the response data my include private data if the origin subsystem is local to the node executing the AI agent. In some examples, the task processor subsystem may communicate a message specifying the response to an origin subsystem identified by or specified within the received message. The origin subsystem may be, for example, the task logistics subsystem described above. During processing of the agent-generated prompt, the AI agent may execute or otherwise interoperate with one or more agent tools accessible to the AI agent. AI Agent tools are specialized processes executed by AI agents to accomplish tasks. AI agents are configured to choose the most suitable tools based on task requirements, capabilities of the tools, and the context in which the task is to be performed. The selection process may include assessing the tools' performance metrics, compatibility of the tools' performance metrics with existing systems, descriptions of the tools' performance metrics, as well as required and optional parameters, and the specific demands of the task. Examples of such agent tools may include, for example, statistical analysis libraries, machine learning models, and visualization tools.

For instance, in at least one example, upon receiving a task, the AI agent selects an appropriate tool to accomplish a task's goal by first analyzing the task's specific requirements. For instance, if the task involves analyzing a dataset to identify top-selling products, the AI agent reviews the available agent tools on the node. The AI agent then selects the tool best suited to meet the task's objective-in this case, a statistical analysis tool capable of processing and analyzing the dataset to identify patterns. The selected tool is executed to perform the task, and the results/response are returned to the origin subsystem for further processing. This method ensures that the tool chosen is optimally matched to the task's requirements, thereby enhancing efficiency and accuracy.

Continuing with FIG. 1, the system 102 is further configured to combine the responses associated with the tasks to generate one or more output responses for each user-originated prompt received by the system 102. For instance, in some examples, the origin subsystem (e.g., the task logistics subsystem) includes an AI agent fine-tuned or otherwise configured to summarize responses to tasks. In these examples, the origin subsystem receives response messages from the task processor subsystems of the subset of nodes and passes the messages to the AI agent for consolidation. The AI agent, in turn, parses the response messages to extract the responses, and constructs an agent-generated prompt to an AI model tuned to generate summary responses. The prompt may include human language instructions to consolidate the response messages into a cohesive and cogent overall summary response to each user-originated prompt. In some examples, the AI agent passes the agent-generated prompt to the AI model, receives a response from the AI model, and communicates the response to users who input the user-originated prompts through the interface that received the user-originated prompts. The communication of the response to the user may involve, in some examples, an interface subsystem (e.g., the interface subsystem 206). It should be noted that communication of the response may involve the interface subsystem controlling one or more interfaces local to the node or one or more interfaces incorporated within one of the devices 104.

Continuing with FIG. 1, the system 102 may be hosted on a central server such as a cloud server or a remote server. In an example, the system 102 may include a user device, a server computer, a server computer accessible over the network 106, a cloud-based computing system, a cloud-based computing system accessible over the network 106, a distributed computing system, or the like. Further, the network 106 may include a Wireless-Fidelity (Wi-Fi) connection, a hotspot connection, a Bluetooth connection, a local area network (LAN), a wide area network (WAN), any other wireless network, or the like. In an example, the one or more devices 104 may include a laptop computer, a desktop computer, a tablet computer, a smartphone, a wearable device, a smart watch, or the like. The one or more devices 104 may host a local browser, a mobile application, or the like. Furthermore, the one or more users may use a web application through the local browser and/or a mobile application to communicate with the system 102.

Continuing with FIG. 1, in an example, the databases 108 include one or more relational databases, one or more object-oriented databases, data warehouses, one or more cloud-based databases, one or more graph databases (e.g., a Neo4J database), or the like. In another example, a format of the data retrieved from the databases 108 may include a comma-separated values (CSV) format, a JavaScript Object Notation (JSON) format, an Extensible Markup Language (XML) format, spreadsheets, text, images, video, files, or the like. Additional examples of data stores that may be used to implement the databases 108 are described further below with reference to FIG. 8.

In an example of the present disclosure, the system 102 includes a plurality of subsystems 114. Details on the plurality of subsystems 114 have been elaborated upon in subsequent paragraphs of the present description with reference to FIG. 2.

Figure 2:
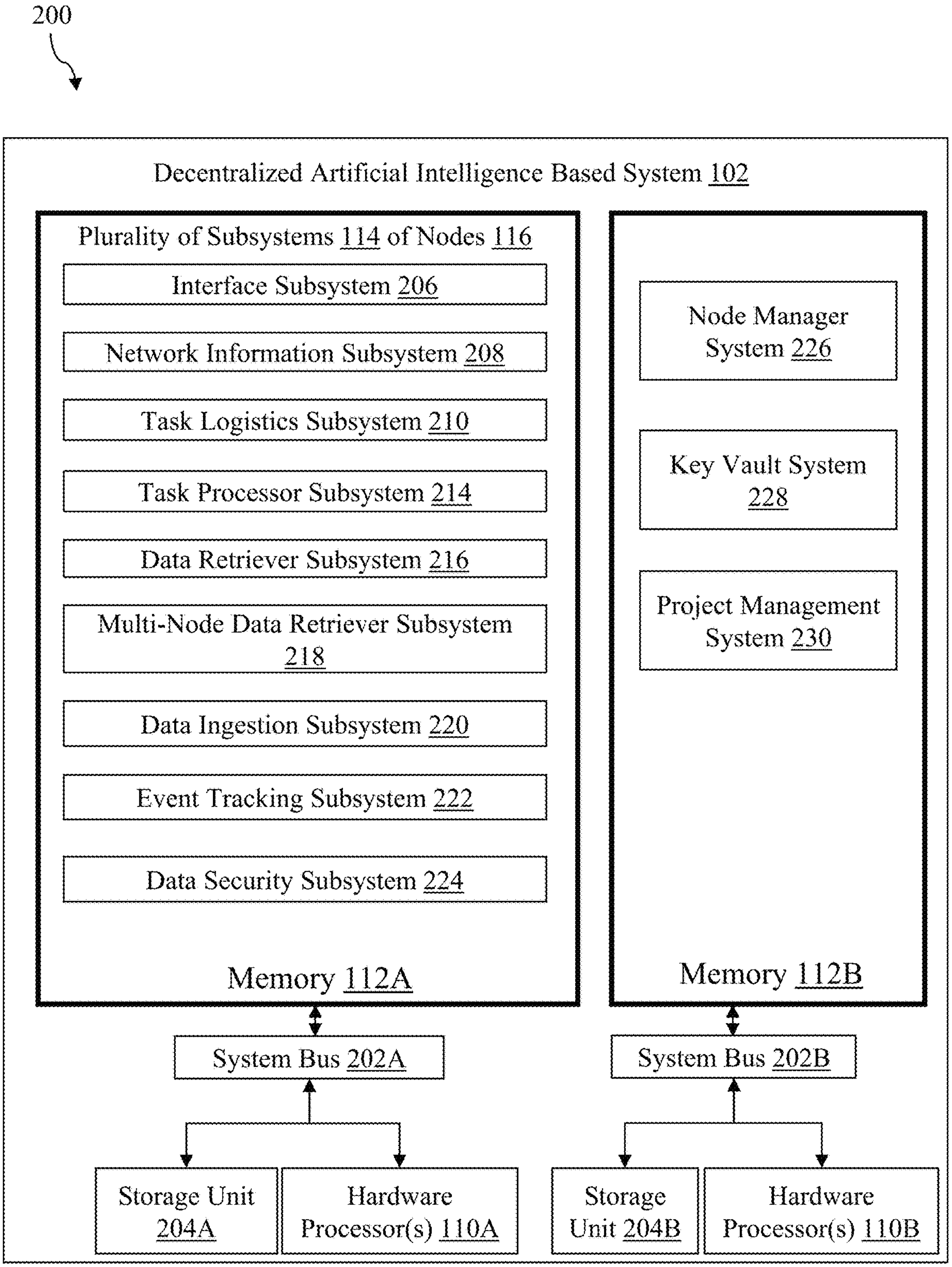
FIG. 2 is a detailed view of a decentralized AI-based system, in accordance with an example of the present disclosure.

FIG. 2 is a detailed view 200 of the system 102 for processing the one or more tasks based on the one or more prompts, in accordance with an example of the present disclosure. With combined reference to FIG. 1 and FIG. 2, the system 102 includes the memory 112 (shown as memory 112A and memory 112B in FIG. 2), the hardware processors 110 (shown as hardware processor(s) 110A and hardware processor(s) 110B in FIG. 2), and a storage units 204A and 204B.

In certain examples, the memory 112A, the hardware processors 110A, and the storage unit 204A are communicatively coupled through a system bus 202A or any similar mechanism. The memory 112B, the hardware processors 110B, and the storage unit 204B are communicatively coupled through a system bus 202B or any similar mechanism. The memory 112A includes code configured to implement the plurality of subsystems 114 via the hardware processors 110A. In certain examples, any of the various data structures described herein and below with reference to FIG. 8 may be allocated and stored within the memory 112 and the storage units 204. In an example, the plurality of subsystems 114 may be configured in at least one of the nodes 116. In some examples, each node of the nodes 116 is or incorporates an individual, distinct computing device that includes a distinct, respective instance of the memory 112A, the bus 202A, the storage unit 204A, and the hardware processors 110A. In an example, at least some of the nodes 116 are configured to share at least one storage unit 204A. In some examples, the memory 112B includes code configured to implement a node manager system 226, a key vault system 228, and a project management system 230. The plurality of subsystems 114 may include an interface subsystem 206, a network information subsystem 208, a task logistics subsystem 210, a task processor subsystem 214, data retriever subsystem 216, a multi-node data retriever subsystem 218, a data ingestion subsystem 220, an event tracking subsystem 222, and a data security subsystem 224.

The storage unit 204 may be a cloud storage, a Structured Query Language (SQL) database, a noSQL database, graph database, a file (e.g., of CSV data) or other location on a file system. The storage unit 204 may include any of the data stores described below with reference to FIG. 8. The storage unit 204 may encode data of various types, including strings, integers, and binary large objects. Other types of data stores that may be included in the unit 204 will be apparent in view of this disclosure.

As shown in FIG. 2, the plurality of subsystems 114 includes the interface subsystem 206 that is communicatively connected to, or implemented by, the one or more hardware processors 110A. In an example, the interface subsystem 206 may be configured to receive input specifying data associated with the one or more prompts from the one or more users through the one or more interfaces of the nodes 116. The interface subsystem 206 may also be configured to render output to a user of a node. One example of the interface subsystem 206 is described further below with reference to FIG. 10.

Figure 3A:
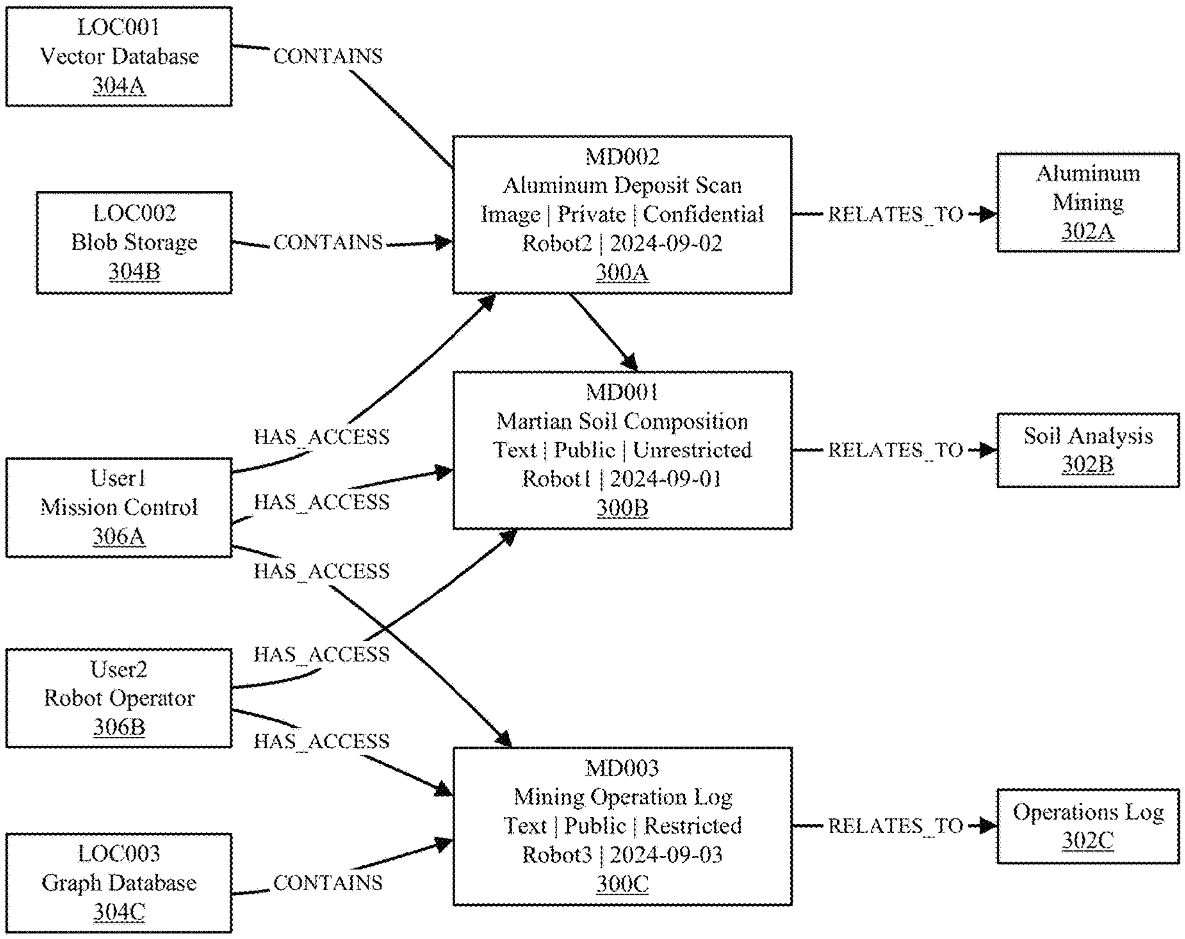
FIG. 3A is a diagram of a graph database storing a data storage ontology, in accordance with an example of the present disclosure.
Figure 3B:
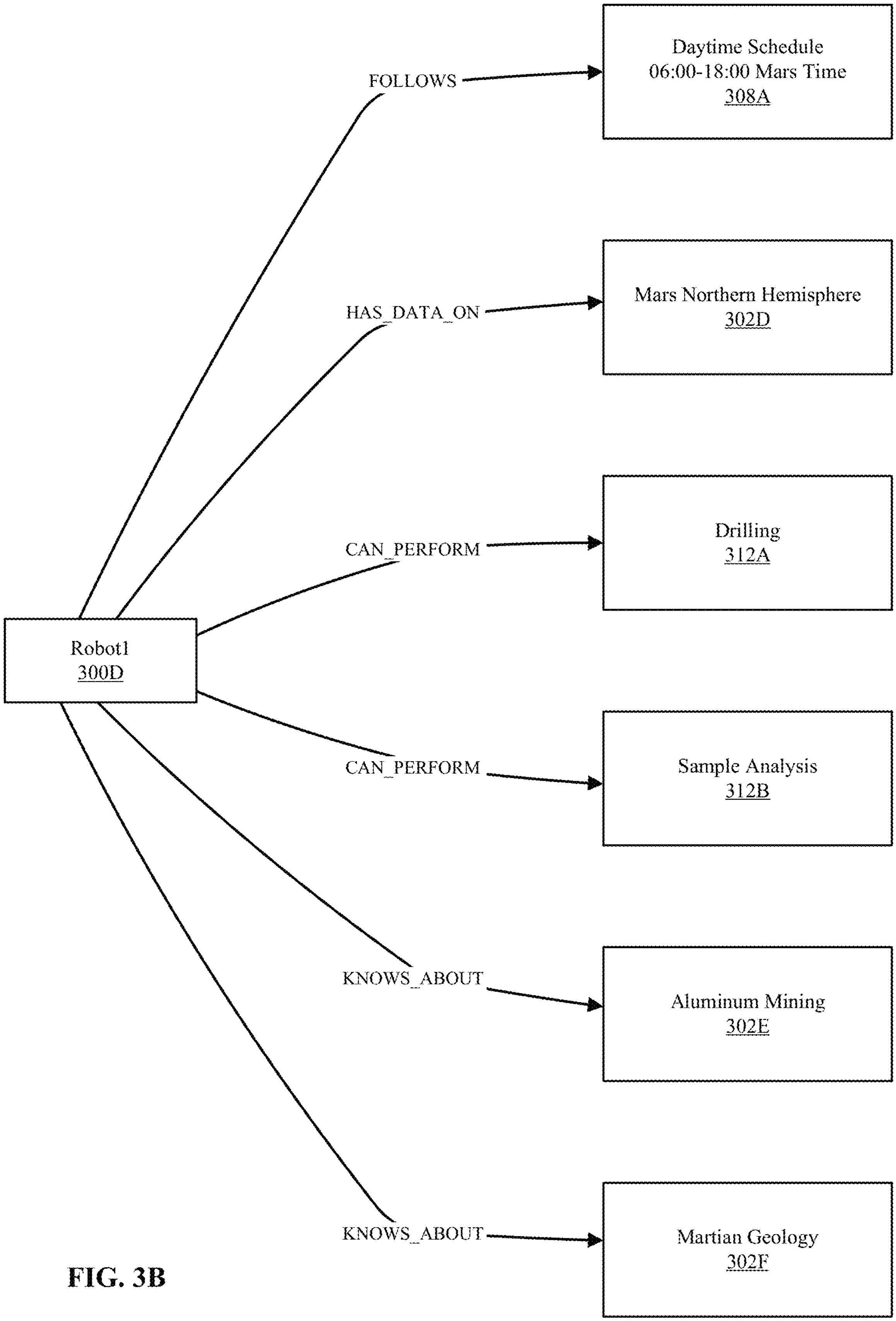
FIGS. 3B-3D are a diagram of a graph database storing subject matter, capability, and availability ontologies, in accordance with an example of the present disclosure.
Figure 3C:
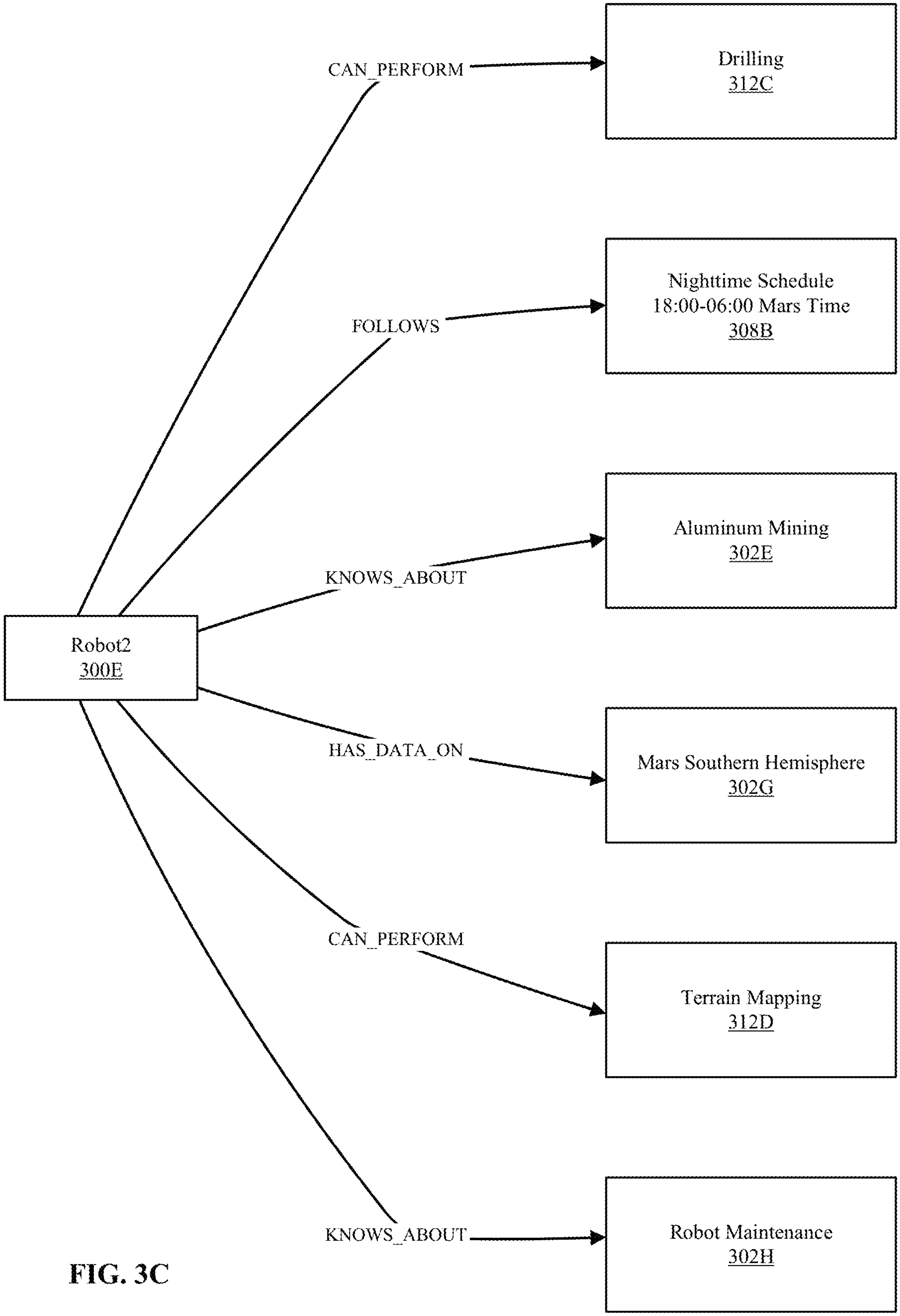
Figure 3D:
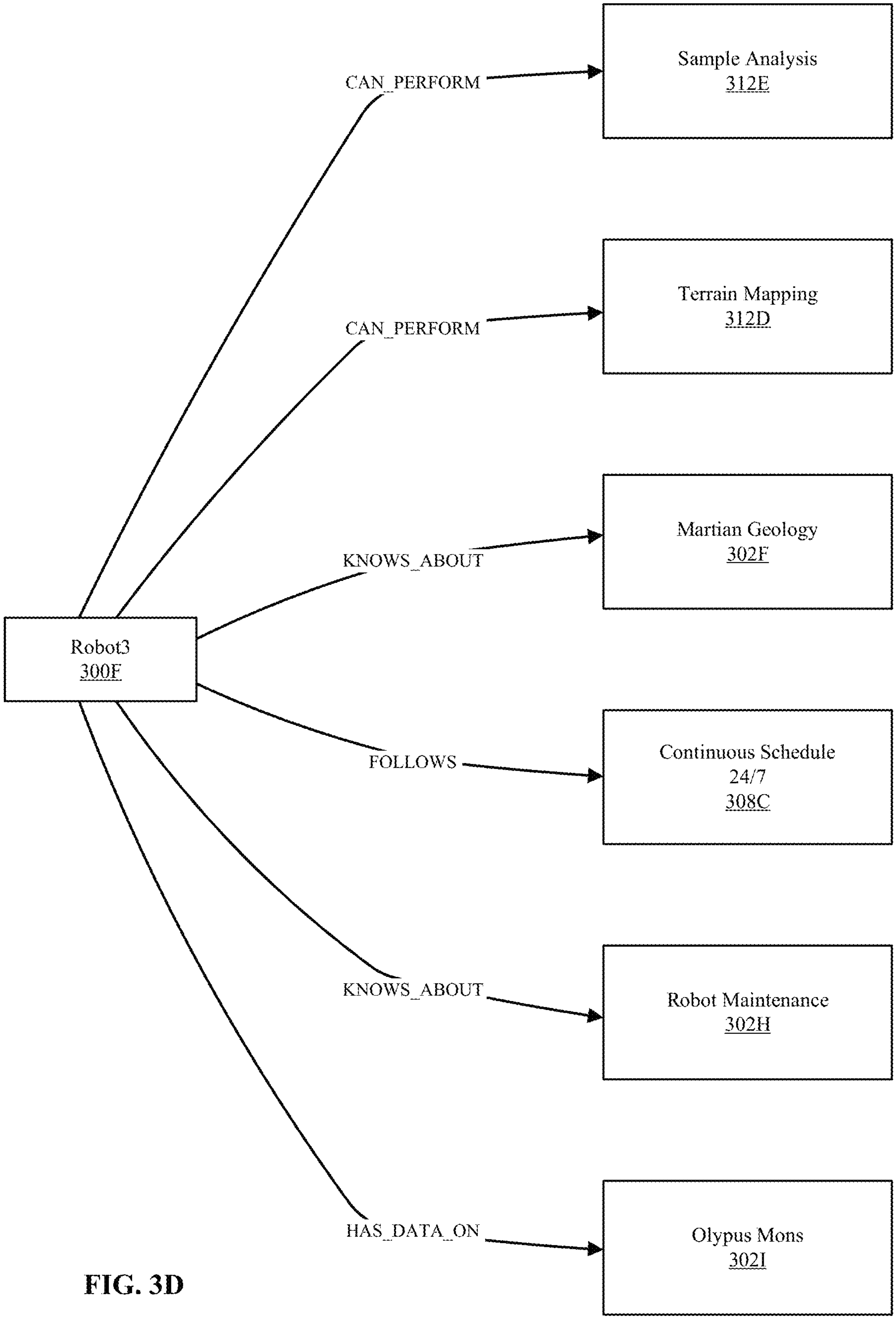
Figure 3E:
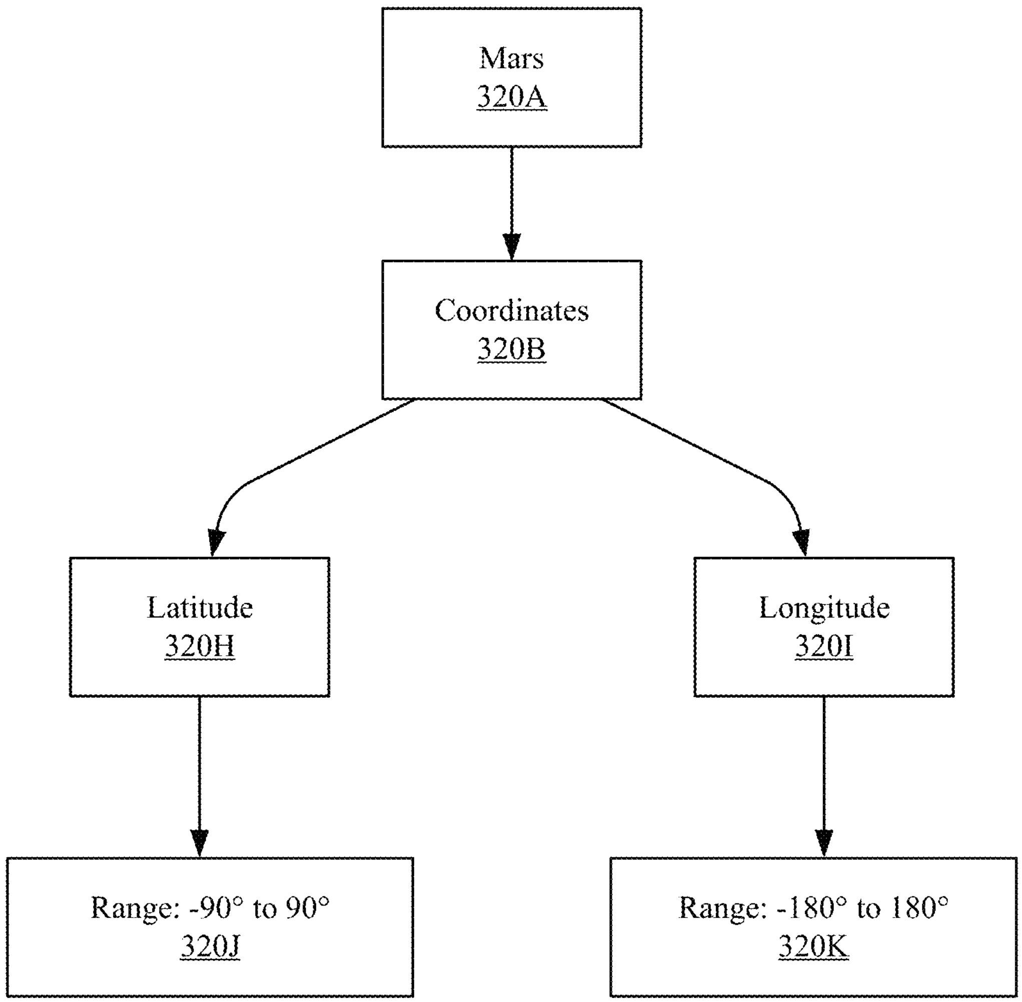
FIGS. 3E-3H are a diagram of a graph database storing a geospatial ontology, in accordance with an example of the present disclosure.
Figure 3F:
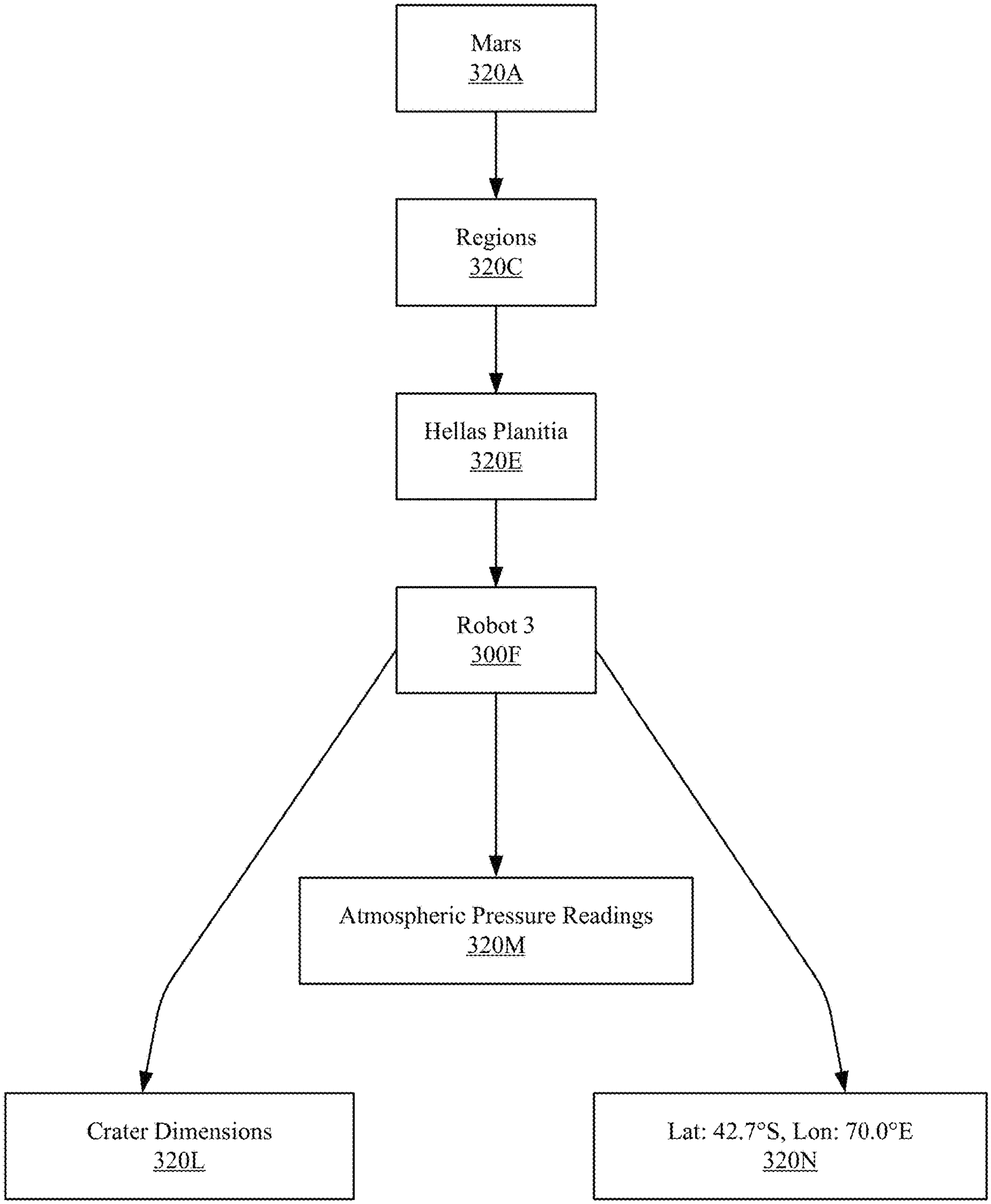
Figure 3G:
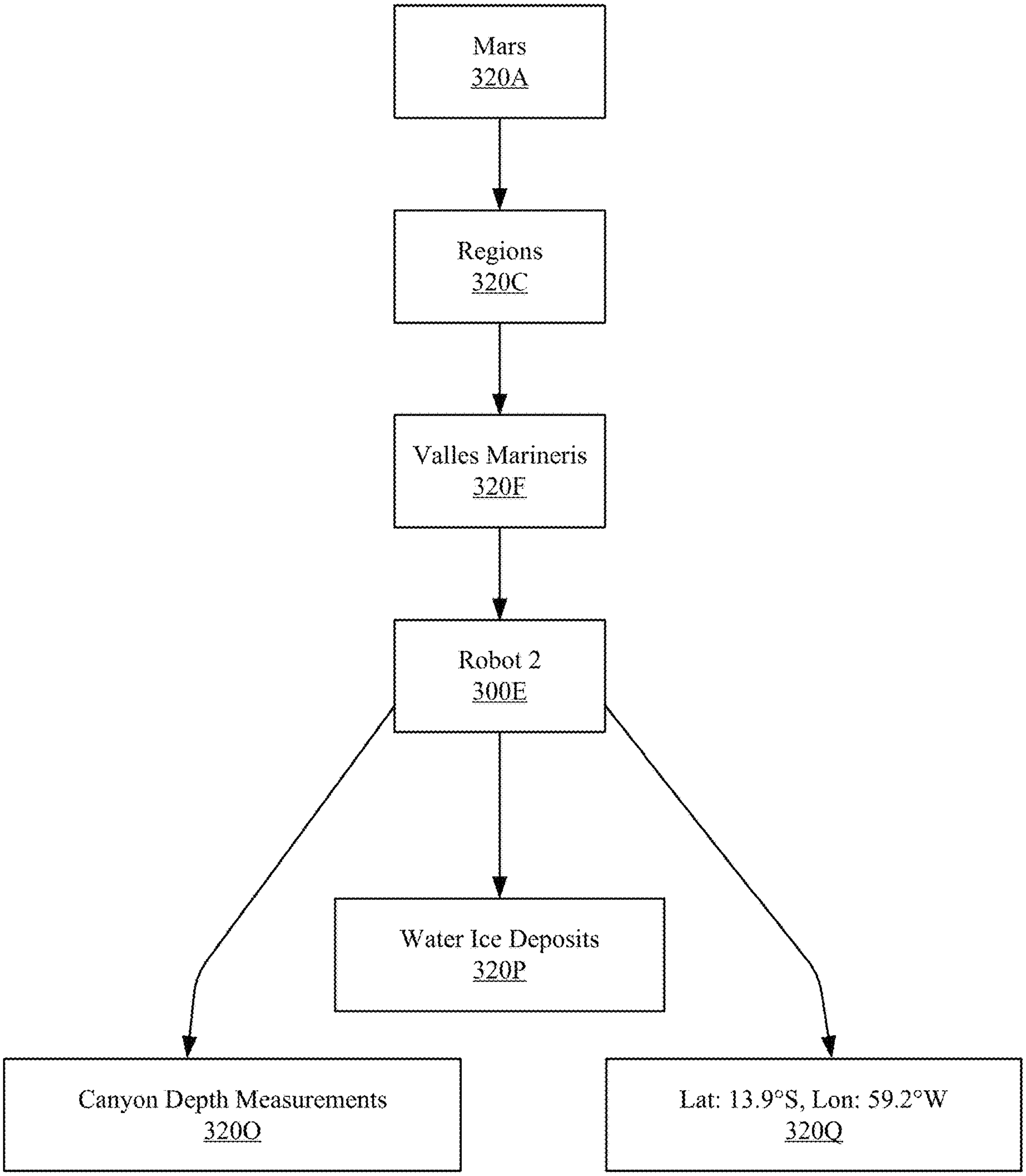
Figure 3H:
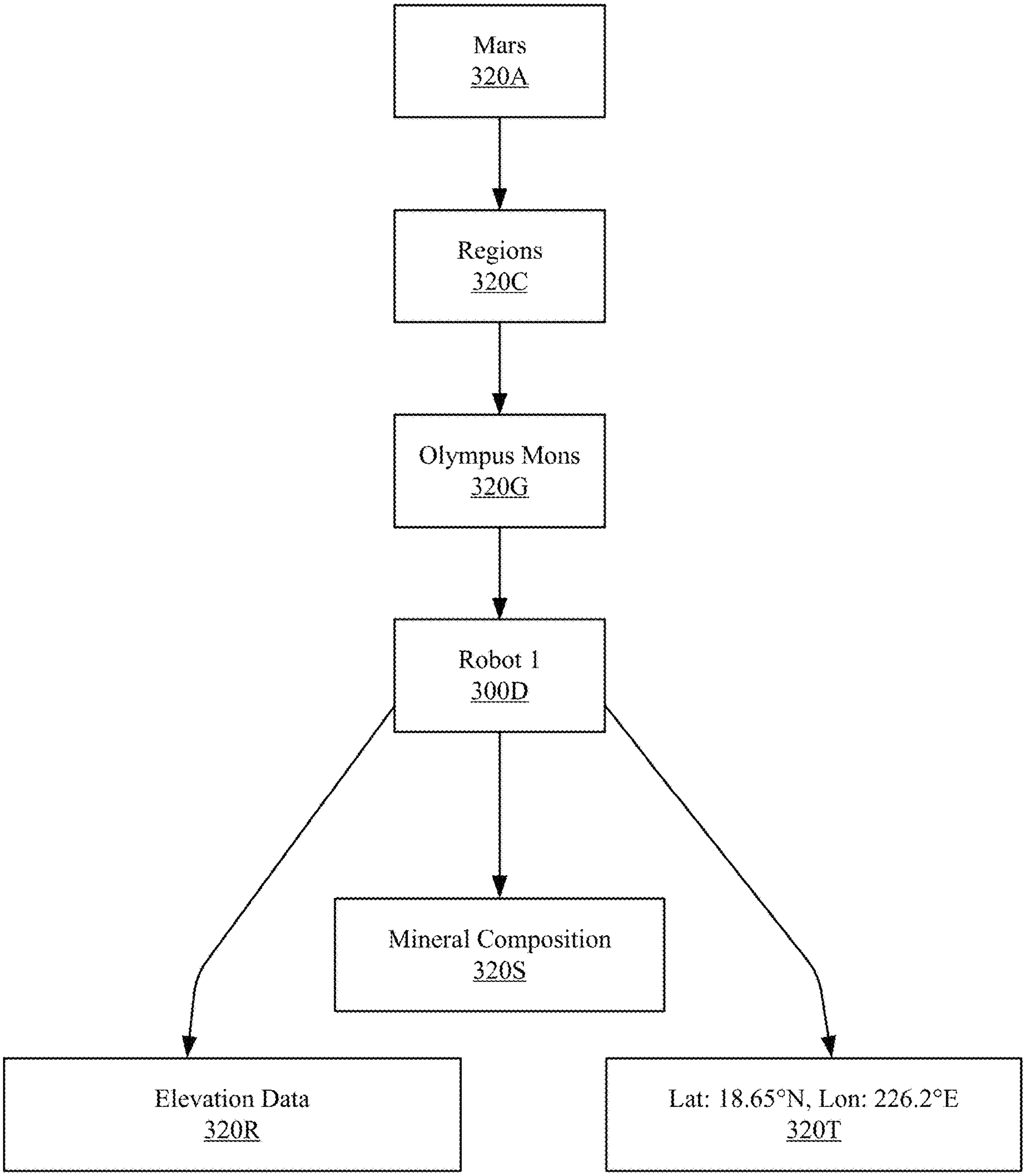
Figure 3I:
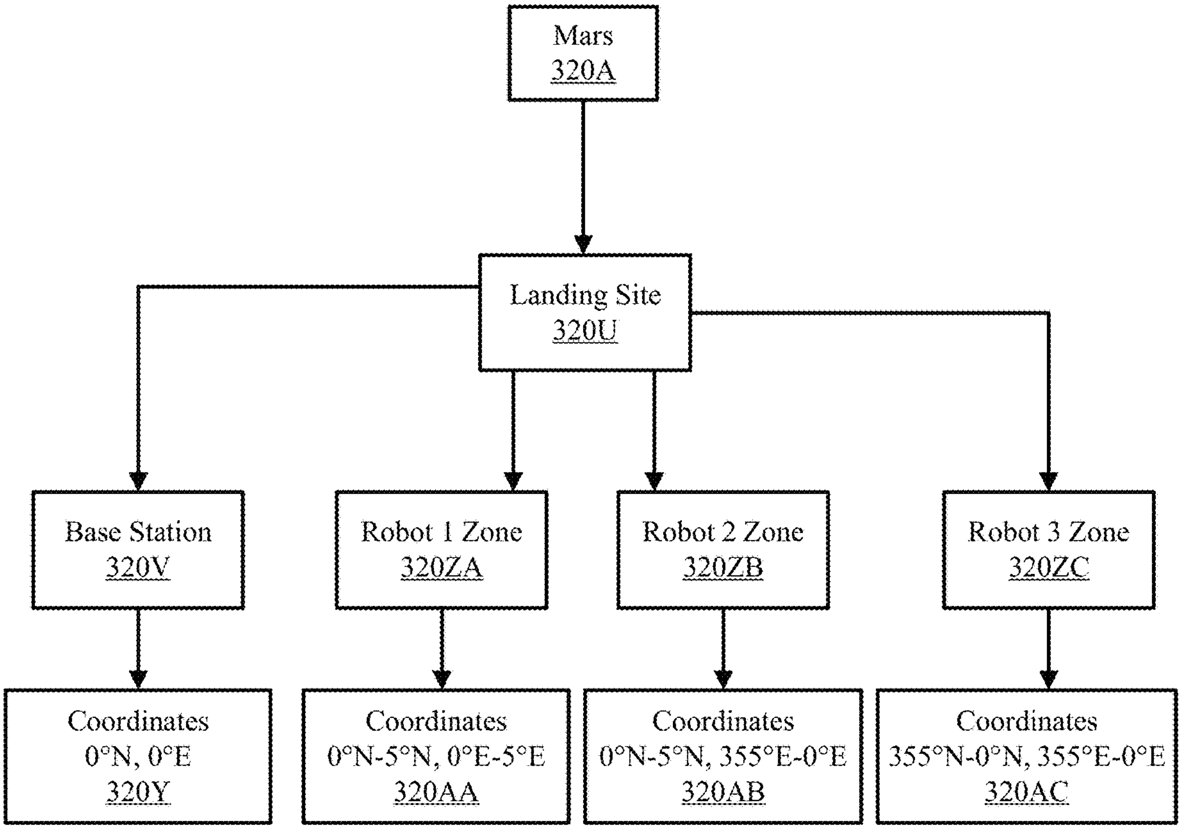
FIGS. 3I-3N are a diagram of a graph database storing a geofence ontology, in accordance with an example of the present disclosure.
Figure 3J:
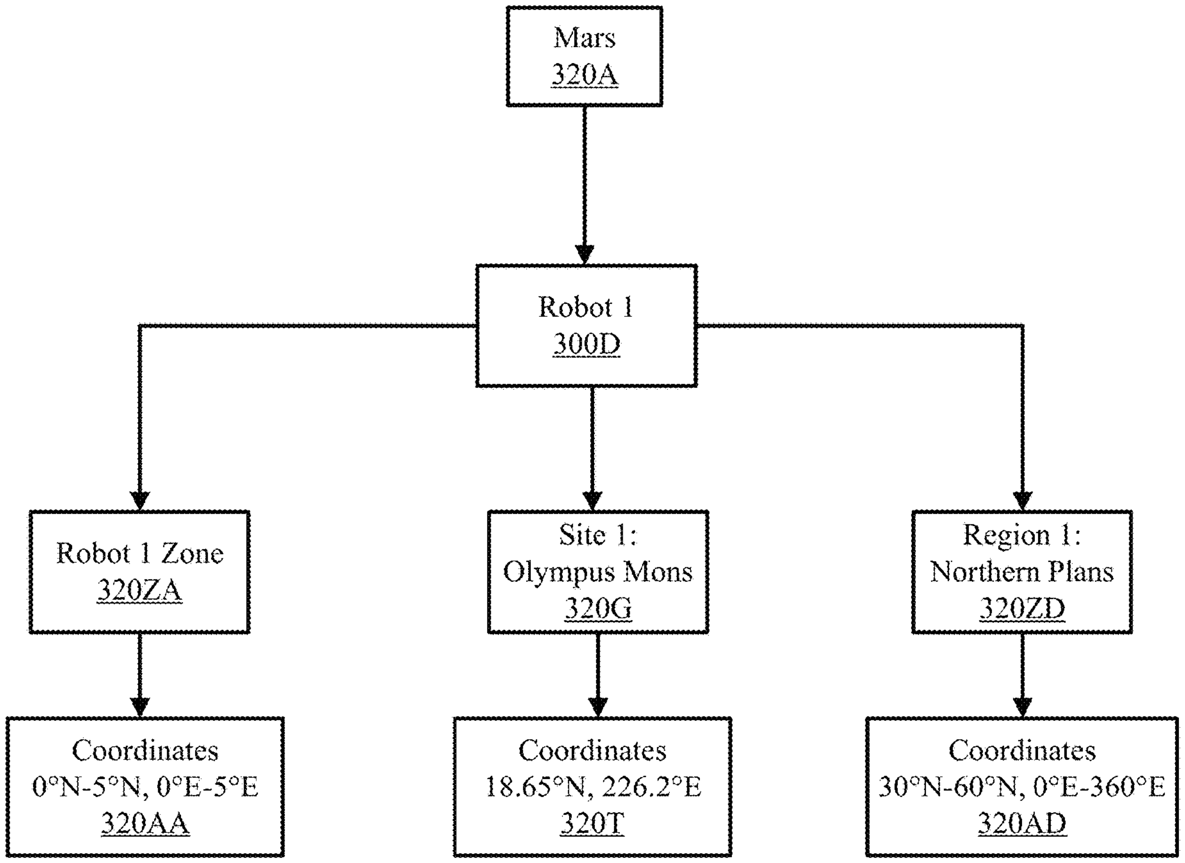
Figure 3K:
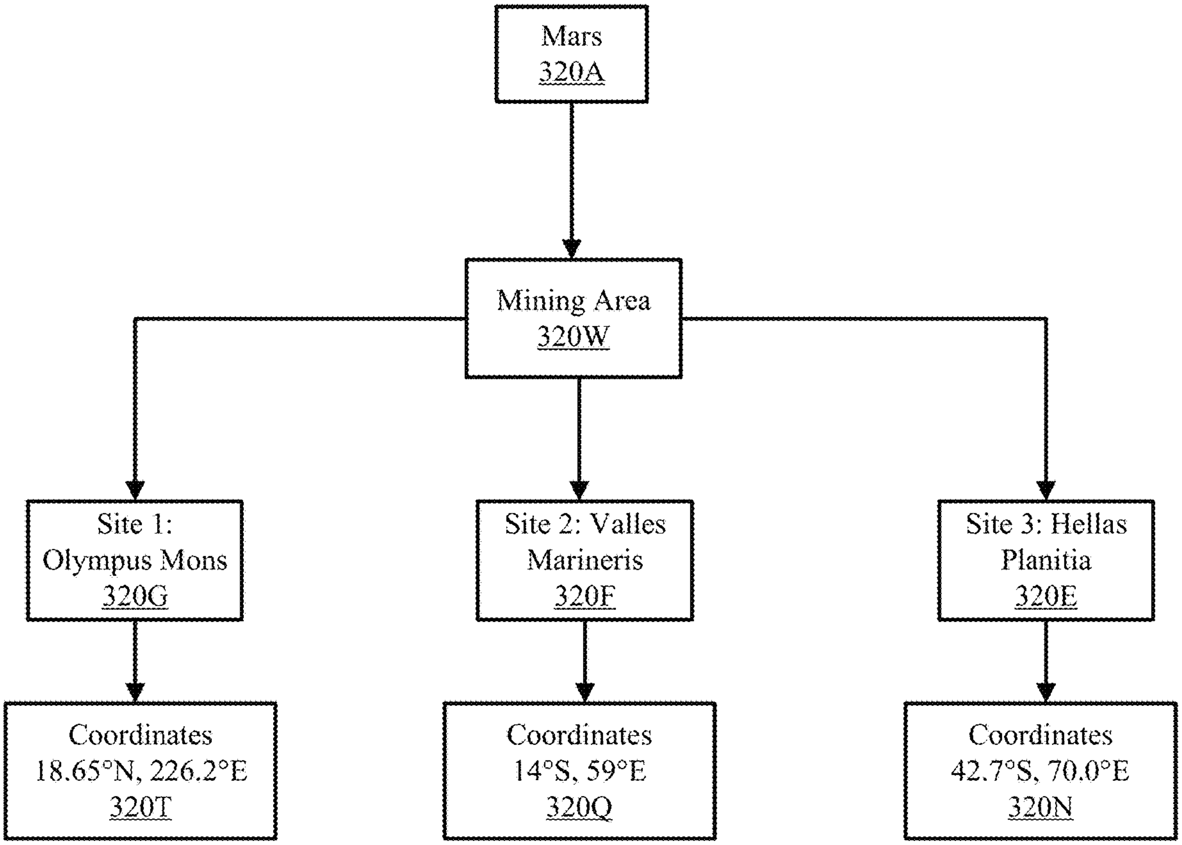
Figure 3L:
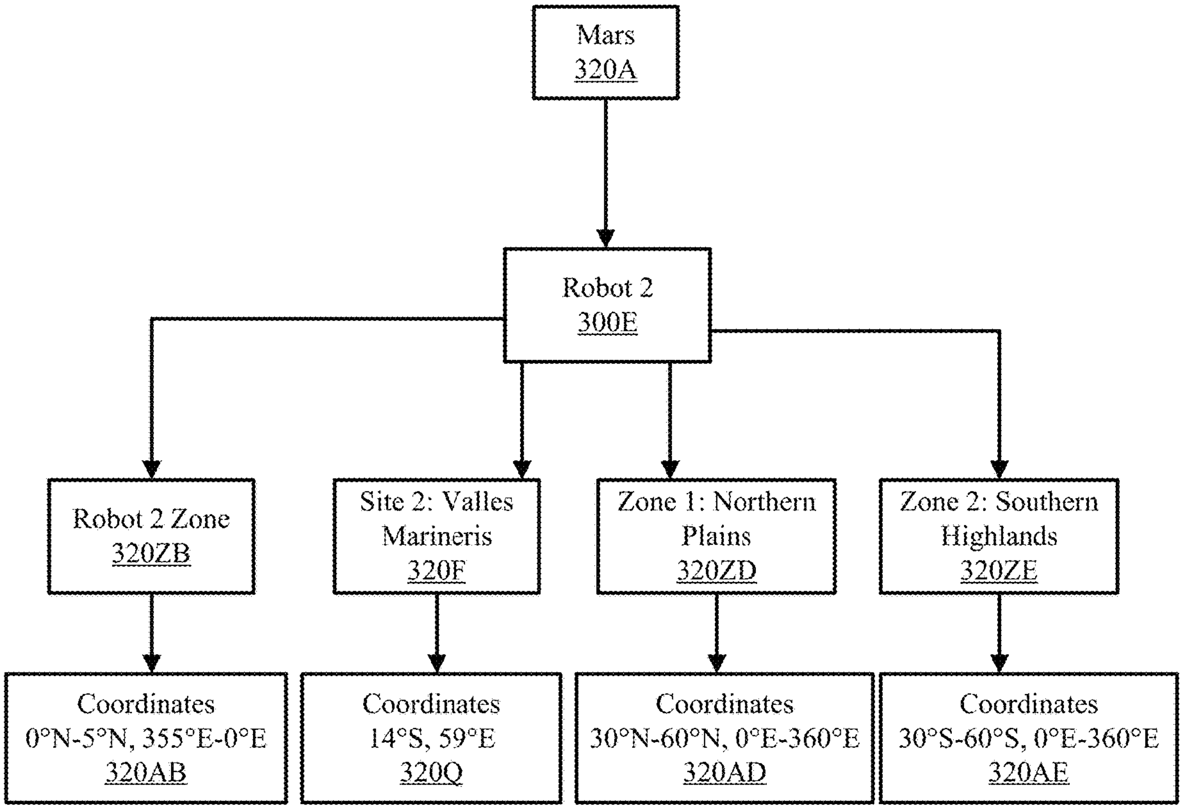
Figure 3M:
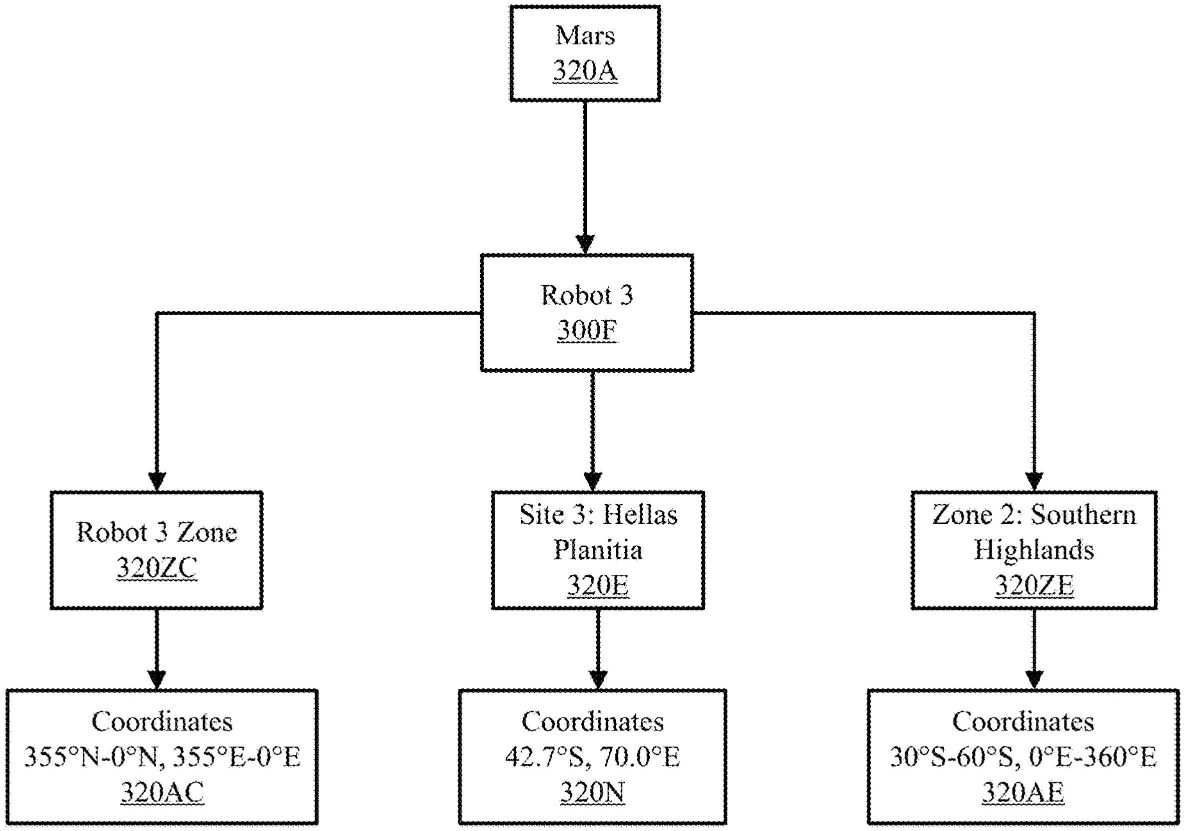
Figure 3N:
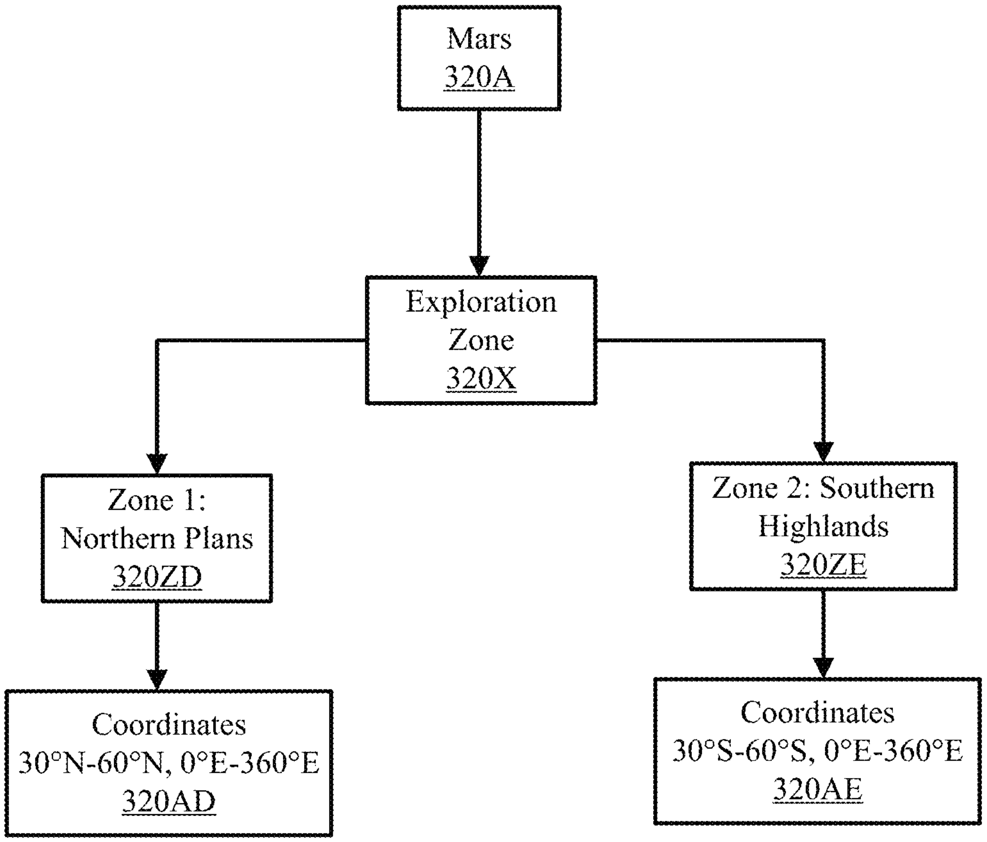

The plurality of subsystems 114 further includes the network information subsystem 208. The subsystem 208 is configured to communicatively connect to, or be implemented by, the one or more hardware processors 110A. In some examples, the subsystem 208 maintains network data in one or more ontological databases that include associations between nodes and domains of knowledge or other information. This network data may specify one or more capabilities, one or more availabilities, one or more locations, one or more geofences, and one or more subject matter areas of the nodes 116. Some example ontologies maintained by the subsystem 208 within a graph database are illustrated with reference to FIGS. 3B-3N. As shown in FIGS. 3B-3D, entities 300D-300F representing nodes (e.g. robots) are associated with schedule information entities 308A-308C, capability information entities 312A-312D, and subject matter entities 302D-302I via relational edges-FOLLOWS, CAN_PERFORM, and KNOWS_ABOUT or HAS_DATA_ON. As shown in FIGS. 3E-3H, entities 320A-320T representing geospatial objects are related to one another and node (e.g., robots) entities 300D-300F. As shown in FIGS. 3I-3N, entities 320A-320T representing geospatial objects are related to one another and node (e.g., robots) entities 300D-300F. The geospatial objects illustrated in FIGS. 3I-3N include entities 320ZA-320ZE representing geofences or zones in which nodes are allowed to travel. One example of the subsystem 208 is described further below with reference to FIG. 11.

In some examples, the subsystem 208 interoperates with other subsystems (e.g., via an API exposed and implemented by the subsystem 208) to utilize or maintain these ontological databases. In these examples, the subsystem 208 is configured to receive queries via API calls, parse the queries to extract a data manipulation request specified therein and process the request. These data manipulation requests may include requests to search one or more ontologies and/or requests to modify information stored in the ontologies. To process these requests, the subsystem 208 may traverse a graph database to find nodes with attributes specified in the request or to find points at which to insert information.

The plurality of subsystems 114 further includes the task logistics subsystem 210. The task logistics subsystem 210 is configured to communicatively connect to, or be implemented by, the one or more hardware processors 110A. In some examples, the task logistics subsystem 210 is configured to create a plan to respond to a user-originated prompt, distribute tasks within the plan to nodes, and combine responses associated with the tasks to generate an overall response to the user-originated prompt. One example of the task logistics subsystem 210 is described further below with reference to FIG. 12.

In some examples, the task logistics subsystem 210 includes one or more AI agents that access one or more AI models to generate a plan including one or more tasks. In some examples, the plan is stored as an acyclic graph within one or more data structures (e.g., within one or more of the data structures described below with reference to FIG. 8). In certain examples, the subsystem 210 includes an AI agent configured to generate tasks and record the tasks in a task plan. In these examples, this decomposition agent may access an AI model fine-tuned or otherwise trained to decompose user-generated prompts into a sequence of inter-dependent tasks. As one example, the decomposition agent may apply NLP and the AI model to identify tasks necessary or helpful to mine aluminum in a hostile environment, such as Mars. In this example, the decomposition agent may analyze the user-generated prompt using NLP to identify key topics (e.g., mine, aluminum) and context (Mars). The decomposition agent may then utilize the key topics to search a knowledge base or access the AI model to identify tasks, such as surveying potential mining locations, extracting aluminum ore, transporting the ore, and refining the ore.

In some examples, the subsystem 210 is configured to interoperate with the network information subsystem 208 to identify nodes with capabilities to perform the tasks. For instance, in certain examples, for each task the subsystem 210 sends a query to the network information subsystem 208 requesting identification of one or more nodes capable of executing the task. The network information subsystem 208, in turn, may receive the query and search for a capability specified therein within a consolidated capability ontology stored in a graph database. More specifically, in some examples, the network information subsystem 208 may traverse the graph database to find nodes that match the capability specified in the query and return, to the subsystem 210, a list of nodes with the capability.

In some examples, the subsystem 210 is configured to receive lists of nodes capable of performing tasks from the network information subsystem 208, assign the nodes to tasks based on the nodes capability and availability, and record the assignments in the task plan. For instance, in certain examples, the subsystem 210 interoperates with the network information subsystem 208 to determine whether at least one of the nodes capable of performing each task is available according to schedule information. For instance, in certain examples, for each task the subsystem 210 sends a query to the network information subsystem 208 requesting identification of, and schedule information for, one or more capable nodes that have a specified availability. The network information subsystem 208, in turn, may receive the query and search a consolidated schedule ontology stored in a graph database for capable nodes having the specified availability. More specifically, in some examples, the network information subsystem 208 may traverse the graph database to find nodes that match the availability specified in the query and return, to the subsystem 210, a list of capable nodes with the availability and scheduling information for the capable, available nodes. The subsystem 210, in turn, receives the list of capable, available nodes and the schedule information and, in some examples, assesses the schedule information to determine the individual loads on the nodes. For instance, in some examples, the subsystem 210 analyzes a number of tasks queued for each capable node (i.e., an amount of work to complete). In some examples, the task logistics subsystem 210 executes an optimization process that balances workload and efficiency across capable, available nodes prior to adding node assignments to the task plan. It should be noted that, in some examples, the subsystem 210 is configured to include dependencies between tasks in the task plan.

In some examples, the subsystem 210 is configured to initiate execution of the task plan. For instance, in some examples, the subsystem 210 generates a prompt for each task in the plan. These agent-generated prompts may be human language constructs that specify task details, context, and information about task dependencies. After completing each prompt, the subsystem 210 may communicate the prompt (e.g., via a secure API) to a task processor subsystem 214 included in a node to which the task is assigned.

In some examples, the subsystem 210 is configured to manage task dependencies during plan execution. For instance, in certain examples, the subsystem 210 maintains a graph of task dependencies and updates the graph as each task is completed. In these examples, the subsystem 210 identifies tasks with satisfied dependencies and monitors nodes assigned to the dependent, but now satisfied, tasks. If a monitored node does not begin execution of a dependent tasks (e.g., the monitored node does not recognize dependencies of the task are now satisfied via interoperation between task processor subsystems of the nodes), the subsystem 210 intervenes by signaling the monitored node to begin the dependent task. If the monitored node does not recover and begin processing the dependent task, the subsystem 210 may further intervene by initiating execution of the dependent task via a new node and cancelling execution of the dependent task by the monitored node.

In some examples, the subsystem 210 is configured to further monitor and adapt plan execution. For instance, in certain examples, the subsystem 210 receives messages from nodes executing tasks. These messages may specify a task or nodes status and/or updates thereto. In an example, the state or status of a task may include not started, in-progress, or completed. The status messages may be communicated and received in real time, near real time, or periodically. In some examples, the subsystem 210 is configured to re-plan and reassign tasks as needed to optimize plan execution. In certain examples, the subsystem 210 includes an AI agent configured to receive the messages and pass the messages to an AI model fine-tuned or otherwise configured to generate adjusted task plans based on an existing plan and the messages. In these examples, the AI agent creates a prompt including the messages and the current task plan, passes the agent-generated prompt to the AI model, receives the adjusted task plan from the AI model, and passes the adjusted task plan back to the subsystem 210. Other examples of fault tolerance configurations facilitated by the subsystem 210 will be apparent in view of this disclosure.

In some examples, the subsystem 210 is further configured to communicate output to users via the interface subsystem 206 of the node including the task logistics subsystem 210. This output may specify information regarding task plan development, execution, and/or adjustment. Additionally or alternatively, the subsystem 210 may be configured to keep track of the state of the tasks, store activity associated with the tasks, and communicate this information to the event tracking subsystem 222.

For instance, in one example, upon receiving a user-originated, high-level prompt, such as "Mine aluminum on Mars," an AI agent within the subsystem 210 decomposes the prompt into a sequence of interdependent tasks that are distributed among the available nodes (robots), each equipped with a node system. The AI agent first identifies the specific capabilities of each node using the network information service and then assigns tasks based on these capabilities. In this example, a first node, specialized in geological surveying, is tasked with identifying an optimal location for mining. A second node, capable of drilling, is then assigned to extract the aluminum ore from the identified location. Finally, a third node, equipped for transport and processing, collects the extracted ore, transports it to a processing unit, and processes it into a usable form. Each task is designed to depend on the completion of preceding tasks, ensuring a logical and efficient sequence of operations to achieve the overall objective.

Figure 15:
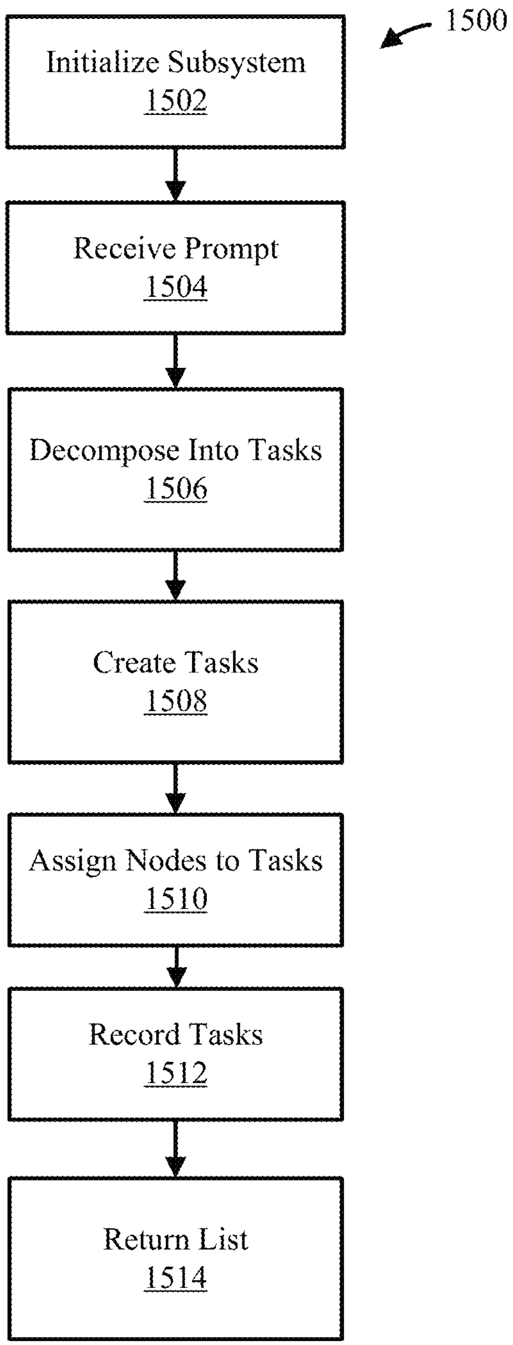
FIG. 15 is a flow diagram of a particular implementation of a task logistics process, in accordance with an example of the present disclosure.

FIG. 15 is a flow diagram of a particular implementation of a task logistics process 1500, in accordance with an example of the present disclosure. The process 1500 may be executed, in some examples, by the system 102 described herein. As shown, in FIG. 15, the process 1500 starts with initialization of a task logistics subsystem (e.g., the task logistics subsystem 214 of FIG. 2). For instance, in some examples, the task logistics subsystem initializes 1502 an AI model (e.g., OpenAI's GPT-3.5-turbo), along with a decomposition AI agent (e.g., a ReActAgent).

Continuing with the process 1500, the task logistics subsystem receives 1504 a user-originated prompt. For instance, in one example, the task logistics subsystem receives the following human language prompt, "Analyze the sentiment of customer reviews for our new product, create a visualization of the results, and generate a summary report."

Continuing with the process 1500, the task logistics subsystem decomposes 1506 the user-originated prompt into a set of tasks organized within a plan. For instance, in some examples, the task logistics subsystem passes the prompt to the decomposition AI agent. In these examples, the decomposition AI agent accesses one or more ontologies (e.g., availability and capability ontologies) via a network information service (e.g., the network information subsystem 208 of FIG. 2) in formulating a task plan.

Continuing with the process 1500, the task logistics subsystem creates 1508 tasks to be distributed to one or more nodes. For instance, in some examples, the decomposition AI agent parses the task plan and creates tasks (e.g., task objects) that have unique identifiers and descriptions. In some examples, each task object includes an expression of the task as an agent-generated, human language prompt.

Continuing with the process 1500, the task logistics subsystem assigns 1510 the tasks to the nodes. For instance, in some examples, the decomposition AI agent determines, based on the task object content (e.g., task description) and node capabilities, which nodes are best suited for each task. Next, the task logistics subsystem assigns each task based on the AI agent's determinations. For instance, the task logistics subsystem may transmit the task objects to task processors (e.g., the task processor subsystem 214 of FIG. 2) of the assign nodes via one or more API calls.

Continuing with the process 1500, the task logistics subsystem records 1512 the tasks in a task list and updates their status to "assigned" in some examples.

Continuing with the process 1500, the task logistics subsystem returns 1514 the list to the system 102, potentially for further processing by, and/or distribution to, other subsystems.

The process 1500 showcases how AI can be leveraged to automate and optimize task distribution in a distributed system, potentially improving efficiency and resource utilization. The process 1500 uses an AI agent to intelligently decompose complex prompts into manageable tasks and considers node capabilities when assigning tasks, ensuring efficient use of resources. In some examples, Pydantic is used for structured data handling, improving type safety and data validation. In some implementations, the process 1500 demonstrates a modular approach, allowing for easy expansion and modification.

The plurality of subsystems 114 further includes the task processor subsystem 214 that is communicatively connected to, or implemented by, the one or more hardware processors 110A. The task processor subsystem 214 is configured to process tasks and to communicate task processing status to other subsystems on the node incorporating the subsystem 214 and to other subsystems on other nodes. For instance, in some examples, the subsystem 214 receives a message specifying an agent-generated prompt to process a task from a task logistics subsystem 210 resident on the same node as the subsystem 214 or resident on a different node. In certain examples, the subsystem 214 implements as AI agent configured to process the prompt and complete the task specified therein. For instance, in one example, the AI agent accesses a first AI model to select tools suitable to process the prompt. For instance, in at least one example, the AI agent passes the prompt to an AI model fine-tuned or otherwise trained to generate instructions to select and use one or more tools to process the prompt. These tools may include, for example, a tool that interoperates with the data retriever subsystem 216 or the multi-node data retriever subsystem 218. The tools selected by the AI model may further include tools that control physical actions, such as surveying, drilling, transporting ore, and the like. The tools selected by the AI model may further include tools that interoperate with a local data security subsystem 224 to store encrypted data in a local data store. This data may be private or public. The tools selected by the AI model may further include tools that interoperate with a network information subsystem 208 to modify ontologies maintained thereby.

In some examples, upon receipt of a response specifying the selected tools and instructions from the AI model, the AI agent parses the response into separate instructions for each selected tool, and passes the instructions to other AI models trained to operate the selected tools. In this way, the AI agent completes the task specified in the prompt received from the task logistics subsystem 210. In at least some examples, the AI agent is configured to monitor tool usage and report progress back to the task logistics subsystem 210. It should be noted that, in examples where the prompt includes task dependencies, the AI agent may identify the dependencies and either delay execution of the task (e.g., if its assigned task depends on another task) or notify other subsystems 214 on other nodes of task completion (e.g., if tasks assigned to other nodes are dependent on its task).

Figure 18:
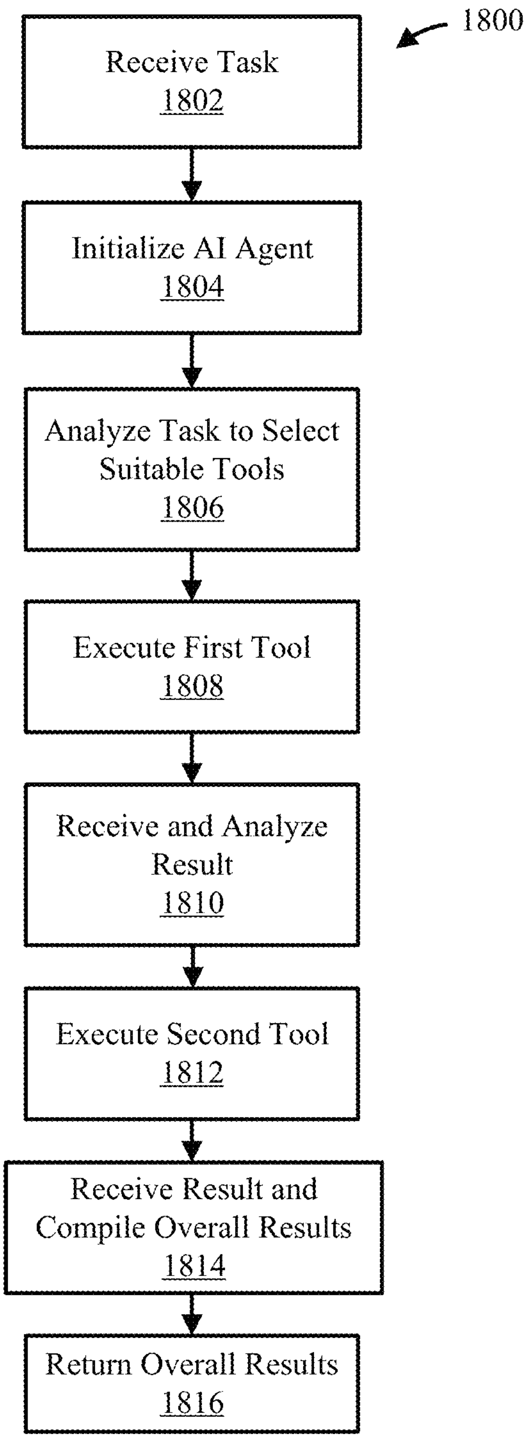
FIG. 18 is a flow diagram of a particular implementation of a task execution process, in accordance with an example of the present disclosure.

FIG. 18 is a flow diagram of a particular implementation of a task execution process 1800, in accordance with an example of the present disclosure. The process 1800 may be executed, in some examples, by the system 102 described herein. As shown, in FIG. 18, the process 1800 starts with a task processor (e.g., the task processor subsystem 214 of FIG. 2) receiving 1802 a task to execute. For instance, in one example, the task processor receives a task "Analyze the sentiment of the text in this image: path/to/image.jpg".

Continuing with the process 1800, the task processor initializes 1804 an AI agent. For instance, in some examples, the task processor initializes an AI agent.

Continuing with the process 1800, the AI agent analyzes 1806 the task to select tools suitable to process the task. For instance, in some examples, the AI agent uses an AI model (e.g., an LLM) to understand the task and determine which tool(s) to use to process the task. In one example, the AI model returns a response to the AI agent that indicates two tools (e.g., an image analysis tool and a text analysis tool) are needed to process the task received in the operation 1802. In this example, the response further indicates that the image analysis tools should be used first (to extract text) and the text analysis tool should be used second (to analyze sentiment expressed in the extracted text).

Continuing with the process 1800, the AI agent executes 1808 the first tool. For instance, in one example, the AI agent transmits an API call to the image analysis tool to initiate analysis of the image. The image analysis tool, in turn, analyzes the image and extracts text therefrom.

Continuing with the process 1800, the AI agent receives results from execution of the first tool and determines 1810 to execute the second tool. For instance, in some examples, the AI agent receives the extracted text from the image analysis tool and determines that execution of the second tool is now appropriate.

Continuing with the process 1800, the AI agent executes 1812 the second tool. For instance, in some examples, the AI agent transmits, to the text analysis tool, an API call to initiate analysis of the text. The API call may include the extracted text or a pointer thereto. The image analysis tool, in turn, analyzes the text and returns sentiment analysis results.

Continuing with the process 1800, the AI agent receives results from execution of the second tool and compiles 1814 overall results. For instance, in some examples, the AI agent receives the sentiment analysis from the second tool and compiles results from both tools. In certain examples, the AI agent uses the AI model to generate a human-readable summary of the results.

Continuing with the process 1800, the AI agent returns the overall results to a task logistics subsystem (e.g., the task logistics subsystem 210 of FIG. 2).

The process 1800 uses an AI agent (e.g., ReActAgent) to dynamically select and use appropriate tools based on the task at hand. The AI agent's understanding of the task and the available tools' capabilities allows for flexible and intelligent tool selection.

The plurality of subsystems 114 further includes the data retriever subsystem 216 that is communicatively connected to, or implemented by, the one or more hardware processors 110A. In some examples, the subsystem 216 is configured to process queries received from other subsystems or processes. For instance, in certain examples, the subsystem 216 is configured to receive a query from an origin subsystem, process the query, and return information requested by the query to the origin subsystem. The queries may include one or more keywords, metadata, and/or other filters. In at least one example, the subsystem 216 analyzes ontological information stored locally on the node including the subsystem 216. An example of ontological information traversed and analyzed by the subsystem 216 in this operation is illustrated with reference to FIG. 3A. In this example, if the subsystem 216 identifies a local data store housing the information requested in the query, the subsystem 216 proceeds to determine whether the origin subsystem is permitted to access the requested data. For instance, the subsystem 216 may determine whether the requested information is public or private data and, if the requested information is private, only allow access if the origin subsystem is local to the subsystem 216. Next, in some examples, if the subsystem 216 determines that the origin subsystem is authorized to access the requested information, the subsystem 216 retrieves the data from the local data store. This retrieval operation may require the subsystem 216 to interoperate with various types of data stores, such as SQL databases, NoSQL databases, graph databases, stored vectors, and the like (e.g., any of the data stores of FIG. 8). Next, in some examples, the subsystem 216 interoperates with a local instance of the data security subsystem 224 to decrypt the requested information and returns the requested information to the origin subsystem. The decrypted, requested data may include text, images, video, geospatial data, CSV, vector nodes, or any other content. It should be noted that, in some examples, the decrypted, requested information is re-encrypted prior to communication of the requested information from the subsystem 216 to the origin subsystem.

It should be noted that, in some examples, if the subsystem 216 is unable to locate the requested data via local ontological information, the subsystem 216 passes the query to the multi-node data retriever subsystem 218 for processing. In these examples, the subsystem 216 may receive a response from the multi-node data retriever subsystem 218 and return the response to the origin process.

Figure 17:
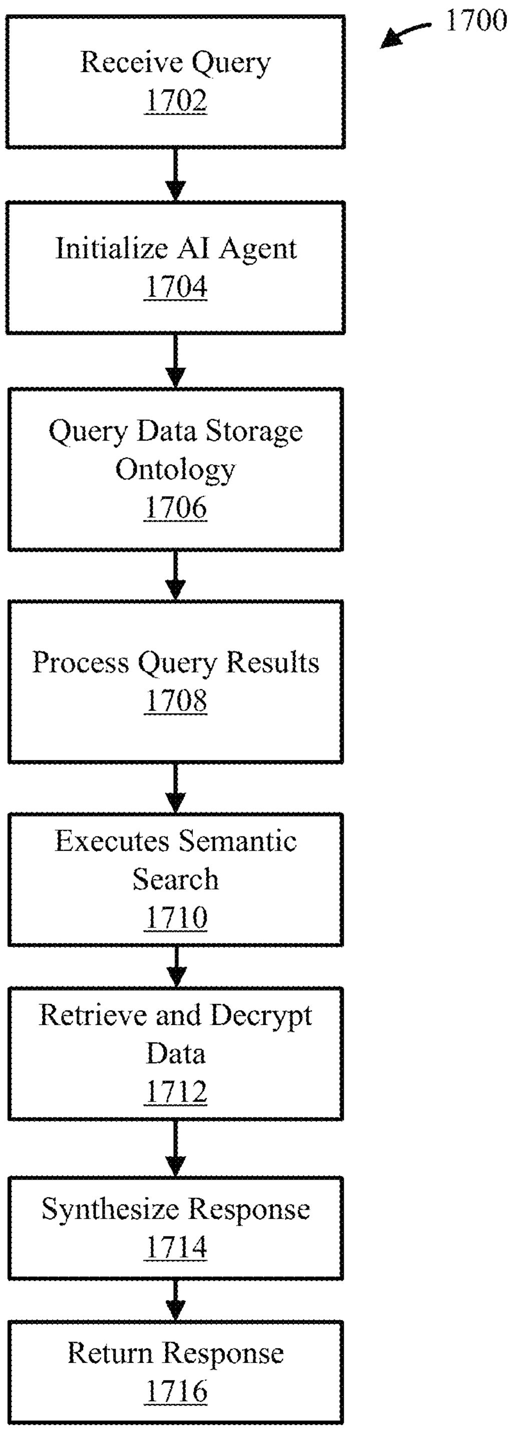
FIG. 17 is a flow diagram of a particular implementation of a data retrieval process, in accordance with an example of the present disclosure.

FIG. 17 is a flow diagram of a particular implementation of a data retrieval process 1700, in accordance with an example of the present disclosure. The process 1700 may be executed, in some examples, by the system 102 described herein. As shown in FIG. 17, the process 1700 starts with a data retriever (e.g., the data retriever subsystem 216 of FIG. 2) receiving 1702 a query from an origin process. For instance, in one example, the data retriever receives "Provide data on aluminum deposits on the Martian surface."

Continuing with the process 1700, the data retriever initializes 1704 an AI agent. For instance, in some examples, the data retriever initializes an AI agent using LlamaIndex to process the query and interact with one or more ontologies.

Continuing with the process 1700, the AI agent queries 1706 a data storage ontology. For instance, in some examples, the AI agent analyzes the query received in the operation 1702 and formulates a graph database query to search the data storage ontology for locations of data store with information relevant to the query. Next, the AI agent receives results from the graph database and passes the results to the data retriever. The data retriever, in turn, executes the query received from the AI agent to retrieve ontological information from the data storage ontology, receives the results of this ontological query, and passes the results to the AI agent.

Continuing with the process 1700, the AI agent processes 1708 results of the ontology query. For instance, in some examples, the AI agent analyzes (e.g., using factors like data type, creation date, and author reputation) the results of the ontological query to identify the most relevant data sources. The AI agent passes analysis results to the data retriever.

Continuing with the process 1700, the data retriever executes 1710 a semantic search. For instance, in some examples, for unstructured data the data retriever prepares a semantic search query. In certain examples, this operation includes vectorizing portions of the query received in the operation 1702. It should be noted that the operation 1710 is optional in some examples. As such other examples may omit the operation 1710 (e.g., when retrieving files as such video, data from databases, and the like.).

Continuing with the process 1700, the data retriever retrieves and decrypts 1712 data identified by the semantic search of the operation 1710. For instance, in some examples, the data retriever searches a vector database (e.g., a pinecone database) using the vectorized query. Next, the data retriever receives the semantic search results, retrieves data based on the ontological query results and the semantic search results, and interoperates with a data security subsystem (e.g., the data security subsystem 224 of FIG. 2) to decrypt the retrieved data.

Continuing with the process 1700, the data retriever synthesizes 1714 a response. For instance, in some examples, the data retriever uses an AI agent to synthesize a response to the query received in the operation 1702. In certain examples, the data retriever passes a prompt including the decrypted data to an AI agent in this operation. An example of such a prompt is "Synthesize information about aluminum deposits on Mars" along with the decrypted data.

Continuing with the process 1700, the data retriever returns 1716 the synthesized response to the origin process as a response to the query received in the operation 1702. For instance, in one example, the data retriever returns the synthesized response to the multi-node data retriever described with reference to the process 1400 of FIG. 14.

The process 1700 demonstrates how the data retriever leverages its data storage location ontology, semantic search capabilities, and an AI agent to efficiently locate and retrieve relevant data from various storage systems while maintaining data security. In some examples, the process 1700 is implemented as a Python class that interoperates with an AI agent implemented using the LlamaIndex framework, accesses ontologies stored in a Neo4j graph database using Neo4j's Python driver, and retrieves data stored in one or more local data stores. In certain examples, the Python class also interoperates with a vector database (e.g., Pinecone or Weaviate) to execute semantic searches. The one or more local data stores may store the data (text, images, etc.) using appropriate storage formats and systems (e.g., a BLOB for storage of large files, PostgreSQL for structured data, etc.)

The plurality of subsystems 114 further includes the multi-node data retriever subsystem 218 that is communicatively connected to, or implemented by, the one or more hardware processors 110A. In some examples, the subsystem 218 is configured to process queries received from other subsystems or processes. For instance, in certain examples, the subsystem 218 is configured to receive a query from an origin subsystem, process the query, and return information requested by the query to the origin subsystem. In at least one example, the subsystem 218 interoperates with the network information subsystem 208 to identify nodes that may contribute to the requested information. Next, the subsystem 218 communicates a query for the requested information to one or more data retriever subsystems 216 local to the one or more data stores. Next, the subsystem 218 compiles and integrates requested information returned by the one or more data retriever subsystems 216 and returns the compiled and integrated information to origin subsystem. It should be noted that, in some examples, the compiled and integrated information is re-encrypted prior to communication of the requested information from the subsystem 218 to the origin subsystem.

Figure 14:
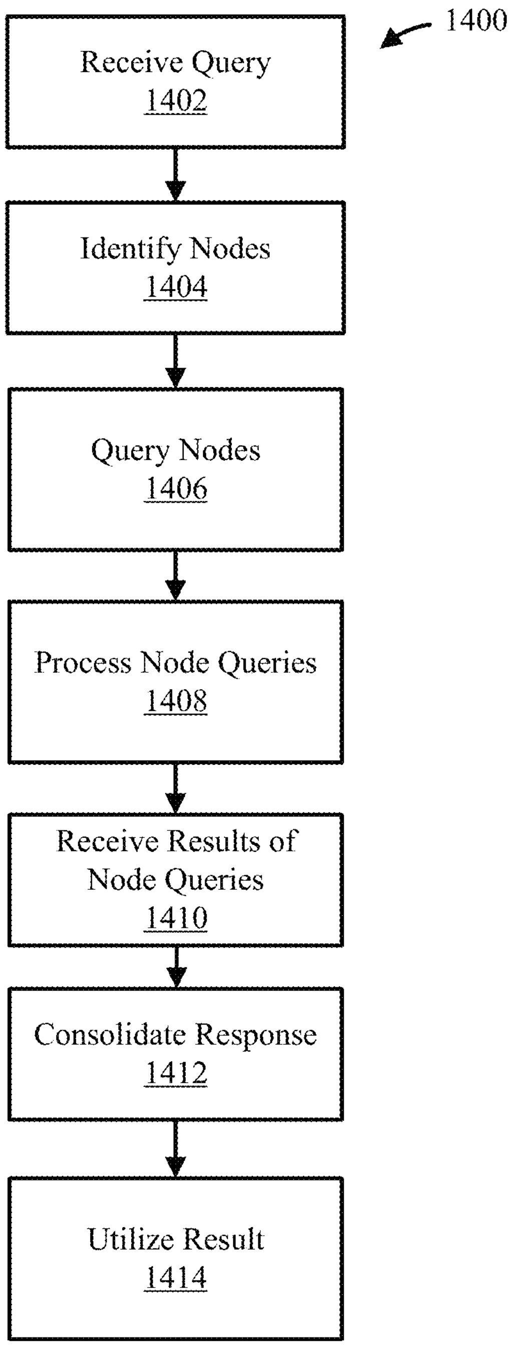
FIG. 14 is a flow diagram of a particular implementation of a multi-node data retrieval process, in accordance with an example of the present disclosure.

FIG. 14 is a flow diagram of a particular implementation of a multi-node data retrieval process 1400 in accordance with some examples described herein. The process 1400 may be executed, in some examples, by the system 102 described herein. As shown, in FIG. 14, the process 1400 starts with an task processor (e.g., the task processor subsystem 214 of FIG. 2) receiving 1402 an agent-generated query from an origin process. For instance, in one example, the task processor receives a task formed as a prompt, such as "Provide information on aluminum deposits and efficient mining techniques for the Martian surface." In this example, the task processor uses NLP techniques to extract the intent and topics from the prompt, determines that it needs more information regarding the topics, and passes the query to a multi-node data retriever (e.g., the multi-node data retriever subsystem 218 of FIG. 2) for processing.

Continuing with the process 1400, the multi-node data retriever identifies 1404 nodes. For instance, in some examples, the multi-node data retriever receives the query and sends a request to a network information service (e.g., the network information subsystem 208 of FIG. 2) to determine which nodes have information regarding the intent and topics specified in the query. In some examples, the multi-node data retriever uses an AI agent to formulate queries to a database (e.g., a graph database) that houses subject matter, geospatial, geofence, capability, and availability ontologies and communicates these queries to the network information service. The network information service, in turn, executes the queries on the graph database and returns a list of nodes that match the query criteria, along with relevance scores.

Continuing with the process 1400, the multi-node data retriever queries 1406 the nodes identified in the operation 1404. For instance, in some examples, the multi-node data retriever receives the list of nodes and the relevance scores and uses an AI agent to determine the best nodes to query (e.g., the most relevant nodes). For instance, the multi-node data retriever might determine that a first node has extensive geological data about Mars, and a second node has information about mining techniques. Next, the multi-node data retriever sends queries for specific information to the nodes identified by the AI agent. For example, a query sent to the first node may read "Provide data on aluminum deposits on the Martian surface." A query sent to the second node may read "Describe efficient mining techniques for extracting aluminum on Mars." The nodes may process the queries using respective data retrievers (e.g., respective data retriever subsystems 216 of FIG. 2). This processing may include accessing respective data stores local to the nodes and utilizing AI agents to formulate respective responses. These respective responses may be in a human language.

Continuing with the process 1400, the nodes identified in the operation 1404 process 1408 the queries. For instance, in some examples, the nodes may process the queries using respective data retrievers (e.g., respective data retriever subsystems 216 of FIG. 2). This processing may include accessing respective data stores local to the nodes and utilizing AI agents to formulate respective responses and communicate the respective response to the multi-node data retriever. These respective responses may be in a human language.

Continuing with the process 1400, the multi-node data retriever receives 1410 the respective responses from the nodes.

Continuing with the process 1400, the multi-node data retriever consolidates 1412 the respective query results from the nodes into an overall response to the agent-generated query. For instance, in some examples, the multi-node data retriever uses an AI agent to consolidate and summarize the respective query results. It should be noted that the multi-node data retriever may use the AI agent by constructing a summarization prompt that includes the respective query results along with a human language request to consolidate and summarize the respective query results and sending the summarization prompt to the AI agent. Next, the multi-node data retriever receives the overall response from the AI agent and sends the overall response to the origin process (e.g., the task processor).

Continuing with the process 1400, the task processor utilizes 1414 the overall response. In one example, the task processor now has information necessary to complete a task about aluminum mining on Mars.

In some examples, the process 1400 is implemented as a Python class that interoperates with an AI agent implemented using the LlamaIndex framework and accesses ontologies stored in a Neo4j graph database using Neo4j's Python driver. In these examples, nodes communicate with one another using a secure API implemented using gRPC or REST framework. The process 1400 demonstrates how a multi-node data retriever leverages a node network's distributed data and capabilities to gather comprehensive information for complex queries.

Further details regarding the data retriever subsystem 216 and the multi-node data retriever subsystem 218 are described further below with reference to FIG. 7.

The plurality of subsystems 114 further includes the data ingestion subsystem 220 that is communicatively connected to, or implemented by, the one or more hardware processors 110A. In some examples, the data ingestion subsystem 220 is configured to generate and store metadata descriptive of data received, processed, and stored by the data ingestion subsystem 220. One example of the data ingestion subsystem 220 is described further below with reference to FIG. 6.

In some examples, the data ingestion subsystem 220 is configured to extract metadata from content being added and organize this information into one or more ontologies and data stores to facilitate efficient data classification and retrieval. For instance, in some examples, the subsystem 220 creates a data storage ontology of the data being ingested mapped to data storage locations and transmits this ontology to the data retriever subsystem 216 to store in its consolidated data storage ontology. FIG. 3A illustrates a data storage ontology including data store entities 304A-306C, user entities 306A and 306B, subject matter entities 302A-302C, and node entities 300A-300C that store public and private data. As shown in FIG. 3A, the various entities are associated with one another via relational edges—CONTAINS, HAS_ACCESS, AND RELATES_TO. In some examples, the subsystem 220 creates a subject matter ontology of the data being ingested mapped to the local node and transmits this ontology to the network information subsystem 208 to store in its consolidated subject matter ontology. In some examples, the subsystem 220 creates a geospatial ontology of the data being ingested mapped to the local node and transmits this ontology to the network information subsystem 208 to store in its consolidated geospatial ontology.

In one example, when a CSV file containing mineral analysis results is uploaded, the data ingestion subsystem 220 extracts, determines, or otherwise obtains key metadata, including the file type (CSV), content subject (mineral analysis), mineral types (e.g., aluminum, iron, silicon), location coordinates, analysis date, analysis method (e.g., spectroscopy), author/source (e.g., Robot 1), privacy setting (private), and storage location (e.g., Node 1, Folder:/geology/mineral_analysis/). This metadata is then structured into an ontology under relevant categories such as "Geological Data" and "Mineral Analysis." The resulting ontology allows the system to efficiently categorize the content within a data storage ontology, enabling quick retrieval and use in future tasks or queries. In some examples, the data ingestion subsystem 220 is further configured to interoperate with the network information subsystem 208 to add the local ontological information to the various ontologies maintained by the network information subsystem 208. It should be noted that, in some examples, the data ingestion subsystem 220 interoperates with the data security subsystem 224 to encrypt data and metadata prior to storage of the data in a local data store.

In some examples, the subsystem 220 is further configured to generate one or more vector embeddings for ingested data and metadata using a vector embedding model. The generated one or more vector embeddings are stored for adapting one or more semantic searches for retrieving the one or more data. The subsystem 220 is further configured to index, add, update, or delete data in a local data store. In an example, the data and metadata may be text, images, files, tabular data, graph data, JavaScript Object Notation (JSON), CSV, videos, streaming content, or the like. The subsystem 220 facilitates secure semantic search by generating vectors using a vector embedding model for multi-modal search. These embeddings are created by the subsystem 220 using the vector embedding model, which maps key concepts from the data and represents them in a numerical format that captures their semantic meaning. In some examples, the subsystem 220 interoperates with the data security subsystem 224 to encrypt the multi-modal data represented by the vector embeddings prior to storage. When a node needs to retrieve specific data, such as optimal mining locations, the data retriever subsystem 216 can perform a secure semantic search by generating a query embedding and comparing it with the vector embeddings with are stored as plaintext. This process ensures that all data remains encrypted and secure during both storage and retrieval, enabling the nodes to collaborate effectively while maintaining the confidentiality and integrity of their data.

Continuing with FIG. 2, the plurality of subsystems 114 further includes the event tracking subsystem 222 that is communicatively connected to, or implemented by, the one or more hardware processors 110A. The event tracking subsystem 222 is configured to receive and process information associated with one or more activity logs. The event tracking subsystem 222 may be further configured to store the one or more activity logs in one or more local data stores. The one or more activity logs may include one or more task identifiers, one or more identifications of one or more users, one or more systems, one or more event types, one or more prompts, one or more node identifiers, one or more task identifiers, one or more parent task identifiers, time created, status, time updated, one or more error messages, one or more status messages, or other data associated with one or more activities. One example of the event tracking subsystem 222 is described further below with reference to FIG. 9.

Figure 16:
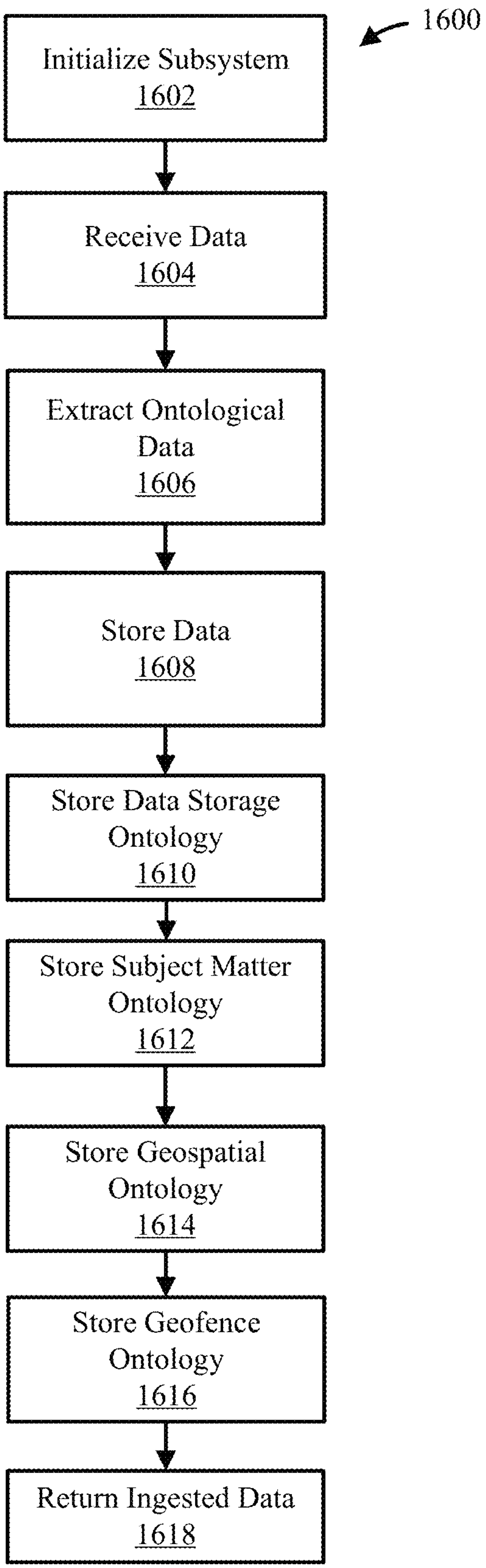
FIG. 16 is a flow diagram of a particular implementation of a data ingestion process, in accordance with an example of the present disclosure.

FIG. 16 is a flow diagram of a particular implementation of a data ingestion process 1600, in accordance with an example of the present disclosure. The process 1600 may be executed, in some examples, by the system 102 described herein. As shown, in FIG. 16, the process 1600 starts with initialization 1602 of a data ingestion subsystem (e.g., the data ingestion subsystem 220 of FIG. 2). For instance, in some examples, the data ingestion subsystem initializes an AI model (e.g., OpenAI's GPT-3.5-turbo), an AI agent (e.g., a ReActAgent) fined-tuned or otherwise trained to create ontologies, an AI agent tool configured to extract topics and relationships from ingested data, and a connection to a graph database.

Continuing with the process 1600, the data ingestion subsystem receives 1604 data to be stored in the system 102. For instance, in one example, the data ingestion subsystem receives content (e.g., "The Eiffel Tower is an iconic landmark in Paris, France."); metadata {"type": "tourist_attraction", "location": "Paris"}; and privacy setting "public".

Continuing with the process 1600, the data ingestion subsystem extracts 1606 ontological data from the data received in the operation 1604. For instance, in some examples, the data ingestion subsystem uses the AI agent to complete this operation. In these examples, the AI agent uses the Agent tool to extract topics and relationships from the data and organizes the data into the ontology. Continuing with the previous example, the Agent tool extracts topics such as "Eiffel", "tower", "iconic", "landmark", "Paris", and "France".

Continuing with the process 1600, the data ingestion subsystem stores 1608 the data received in the operation 1604. For instance, in some examples, the data ingestion subsystem interoperates with a data security subsystem (e.g., the data security subsystem 224 of FIG. 2) to store the data as cyphertext and according to a security schedule.

Continuing with the process 1600, the data ingestion subsystem stores 1610, within a data storage ontology, ontological data extracted in the operation 1606. For instance, in some examples, the AI agent interoperates with the graph database to create and store entities and relationships therebetween in the graph database. In certain examples, a data entity is created to store an identifier and privacy setting attributed to the data being ingested, a subject matter entity is created for each new topic, and existing topics are merged into a corresponding, existing subject matter entity. Next, the AI agent interoperates with the graph database to create relationships between the data entities and the subject matter entities. It should be noted that the term "entity" as used herein refers to a graph database "node". The term "entity" and its variants are used to avoid confusion between a graph database node and one of the nodes 116.

Continuing with the process 1600, the data ingestion subsystem stores 1612, within a subject matter ontology, ontological data extracted in the operation 1606. For instance, in some examples, the AI agent interoperates with the graph database to create and store entities and relationships therebetween in the graph database. In certain examples, a new subject matter entity is created for each new topic, and existing topics are merged into a corresponding, existing subject matter entities. Next, the AI agent interoperates with the graph database to create relationships between the subject matter entities and the local node.

Continuing with the process 1600, the data ingestion subsystem stores 1614, within a geospatial ontology, ontological data extracted in the operation 1606. For instance, in some examples, the AI agent interoperates with the graph database to create and store entities and relationships therebetween in the graph database. In certain examples, a new location entity is created for each new location, and existing topics are merged into a corresponding, existing location entities. Next, the AI agent interoperates with the graph database to create relationships between the location entities and the local node.

Continuing with the process 1600, the data ingestion subsystem stores 1616, within a geofence ontology, ontological data extracted in the operation 1606. For instance, in some examples, the AI agent interoperates with the graph database to create and store entities and relationships therebetween in the graph database. In certain examples, a new zone entity is created for each new geofence identified, and existing topics are merged into a corresponding, existing zone entities. Next, the AI agent interoperates with the graph database to create relationships between the zone entities and the local node.

Continuing with the process 1600, the data ingestion subsystem returns 1618 the ingested data to the system 102, potentially for further processing by, and/or distribution to, other subsystems, such as the network information subsystem 208 of FIG. 2.

At least some implementations of the process 1600 showcase how AI can be leveraged to automate the process of extracting meaningful information from raw data and organizing it into ontologies. These ontologies can then be used by other subsystems (like the data retriever subsystem 216 of FIG. 2 and network information subsystem 208 of FIG. 2) to efficiently locate and retrieve relevant data across the nodes 116 of FIG. 1. The process 1600 uses AI to automatically extract meaningful ontologies from incoming data. In some examples, four types of ontologies are created and stored in a graph database: a data ontology that links the ingested data to its subject matter area, a subject matter ontology that associates the local node with new subject matter areas, a geospatial ontology that associates the local node with locations, and a geofence ontology that associates the local node with allowed zones. In some examples, Pydantic is used for structured data handling, improving type safety and data validation. In some implementations, the process 1600 demonstrates a modular approach, allowing for easy expansion and modification.

In some examples, the event tracking subsystem 222 is further configured to detect one or more threats by monitoring one or more system activities or one or more user activities as documented within the activity logs. The event tracking subsystem 222 is further configured to transmit one or more alerts including information indicating severity of the one or more threats, to the node manager system 226 or the key vault system 228, upon detection of the one or more threats. The event tracking subsystem 222 is further configured to analyze one or more logs associated with one or more anomalies against one or more analyzed patterns. The one or more analyzed patterns are based on usage of the system, by the one or more users with the one or more electronic devices 104 connected to the nodes 116. In some examples, the one or more logs associated with the one or more anomalies are analyzed using an AI model trained on historical data. The AI model may include, for example, a decision tree based machine learning model or a random forest based machine learning model.

In some examples, the event tracking subsystem 222 monitors user and system activities to detect potential security threats by identifying deviations from established patterns and protocols. For example, the event tracking subsystem 222 may detect unauthorized access attempts if a user tries to access data stored locally on a first node outside of the first node's scheduled security window. The event tracking subsystem 222 may also identify unusual data transfer activities, such as an unexpected large data transfer from a second node to an unknown external device. Additionally, in some examples, the event tracking subsystem 222 monitors user behavior for irregularities, such as a user making repeated, atypical requests for sensitive data on a third node. The event tracking subsystem 222 may utilize advanced analytical techniques, including machine learning models, to recognize these anomalies and potential threats, such as invalid commands or unauthorized access attempts. When a threat is detected, the event tracking subsystem 222 may trigger alerts, block access via interoperations with the data security subsystem 224, or notify the node manager system 226, thereby enhancing the security of the network.

For instance, in at least one example, the event tracking subsystem 222 is configured to track the location of its host and to interoperate with the data security subsystem 224 to restrict access to the data security key if a node associated with the data security key or one or more electronic devices 104 connected to the node leaves a geographic location. In this example, the event tracking subsystem 222 interoperates with the network information subsystem 208 to identify allowable zones of travel within a geofence ontology. In this situation, the event tracking subsystem 222 may communicate one or more messages to the data security subsystem 224 local to the node. The messages may request discontinuation of encryption/decryption services, invoke immediate expiration of the data security key, and/or request the data security subsystem 224 to contact the key vault system 228 to receive a newly validated key.

Continuing with FIG. 2, the plurality of subsystems 114 further includes the data security subsystem 224 that is communicatively connected to, or implemented by, the one or more hardware processors 110A. In some examples, the subsystem 224 is configured to receive and process encryption/decryption requests from other subsystems local to the subsystem 224. The subsystems may include a data ingestion subsystem, a network information subsystem, and an event tracking subsystem, to name a few. In some examples, the subsystem 224 receives a request from a node manager system, a key vault system, and an event tracking system. The request may be to deny access to the data security key. This may be done on a scheduled basis or immediately in cases where there is a security threat includes unusual user behavior. In an example, the subsystem 224 receives a data security configuration including a key and an access schedule and stores the data security configuration in a local data store. For instance, the subsystem 224 may receive a message (e.g., an API call) from the node manager system 226 of FIG. 2 and may parse the message to extract the data security configuration prior to storage of the same.

For instance in some examples, the subsystem 224 is configured to receive an encryption or decryption request, determine whether the node is currently authorized to execute encryption or decryption operations, and if so, encrypt or decrypt information targeted by the encryption or decryption request using a data security key specific to, and locally stored in (e.g., volatile memory) on, the node. In at least some examples, the subsystem 224 is configured to check a local copy of the node's security schedule to determine whether the node is currently authorized to execute encryption/decryption operations. Alternatively or additionally, the subsystem 224 may be configured to check one or more flags maintained by the subsystem 224 that indicate whether encryption/decryption operations are authorized. These flags may be set or unset based on messages received by the subsystem 224, such as a message received from the event tracking subsystem 222, the node manager system 226, or some other process. Additionally or alternatively, the subsystem 224 may check the current time to ensure that the security schedule for the node including the subsystem 224 allows for encryption or decryption operations at the current time.

In some examples, the subsystem 224 is configured with one or more network locations (e.g., internet protocol (IP) address, host name, universal resource identifier, etc.) of the key vault system 228. In these examples, the subsystem 224 is configured to retrieve one or more data security keys from, and otherwise interoperate with, the key vault system 228. In another example, the subsystem 224 can verify a data security key by decrypting a data value and validating its decrypted value by matching with a pre-configured value.

Continuing with FIG. 2, in some examples, the node manager system 226, the key vault system 228, and the project management system 230 are each communicatively connected to, or implemented by, the one or more hardware processors 110B. In an example, key vault system 228 may provide or deny access (e.g., based on a predetermine schedule) to data security keys and encrypt each data security key of each node 116 with a master encryption key. One example of the key vault system 228 is described further below with reference to FIG. 4. In some examples, the project manager system 230 is configured to interact with a user to plan and execute one or more projects. One example of the project management system 230 is described further below with reference to FIG. 5. In some examples, the node manager system 226 is configured to interact with a user to configure one or more of the nodes 116.

In certain examples, node manager system 226 implements an interface for users to manage one or more of the nodes 116. In an example, the system 226 is configured to allow the one or more users to setup, via the user interface, a node network (e.g., a subset of the nodes 116) and/or to select an individual node to configure. In an example, the system 226 may maintain and administer different configurations for each of the nodes 116. Furthermore, in some examples, the node manager system 226 may be configured to perform one or more operations such as shutdown, start, restart, or wipe and destroy of all data in the nodes 116. The system 226 may initiate these operations via one or more API calls to subsystems of the nodes 116.

In an example, the system 226 is configured to transmit configuration information to nodes. In this example, the system 226 transmits the configuration information via one or more messages to subsystems of the nodes. These messages comply with the API introduced above. The configuration information transmitted by the system 226 may specify capabilities of, or otherwise configure, the nodes. In some examples, the user interface implemented by the system 226 is further configured to allow the users to deactivate the nodes 116. Further, in some examples, the system 226 is configured to assign one or more node networks to the nodes 116. The system 226 may be further configured to present an interface to configure a data security access schedule specifying when the nodes 116 are denied use of their individual data security key (e.g., encryption key). For example, when a node is used on a team within an organization, a schedule may be created with information descriptive of one or more days and time slots during the day when the security key is accessible by the node 116. In some examples, the system 226 may communicate the schedule to other systems or subsystems for subsequent processing. For instance, the system 226 may communicate the schedule to the network information subsystem 208 for inclusion in ontological information. The system 226 may be further configured to present an interface to receive information specifying one or more geofences that define zones in which the nodes 116 are allowed to travel. As explained herein, nodes 116 that travel outside of allowed zones may be subject to corrective actions, such as denial of data security keys and instructions to return to an allowed zone, among other actions.

According to a specific example, each node in a Mars aluminum mining system is configured with a specific data security schedule to manage access to encrypted data based on operational requirements and security protocols. A Surveyor Node operates from 06:00 AM to 08:00 PM (Mars Local Time) on weekdays, with high-security access during mapping operations and restricted access during daily maintenance periods. An Excavator Node is designed for continuous 24/7 operation from Monday to Saturday, with a daily restricted period from 06:00 PM to 08:00 PM for maintenance, and it implements emergency shutdown protocols that restrict data access in case of equipment failure. A Processing Node is active from 08:00 AM to 10:00 PM on weekdays, with full access to encrypted data during refinement operations and restricted access during quality assurance periods, while remaining inactive on Sundays to allow for system maintenance. These schedules ensure that data access is tightly controlled and aligned with the operational needs of each node while safeguarding against unauthorized access and potential security threats.

Figure 4:
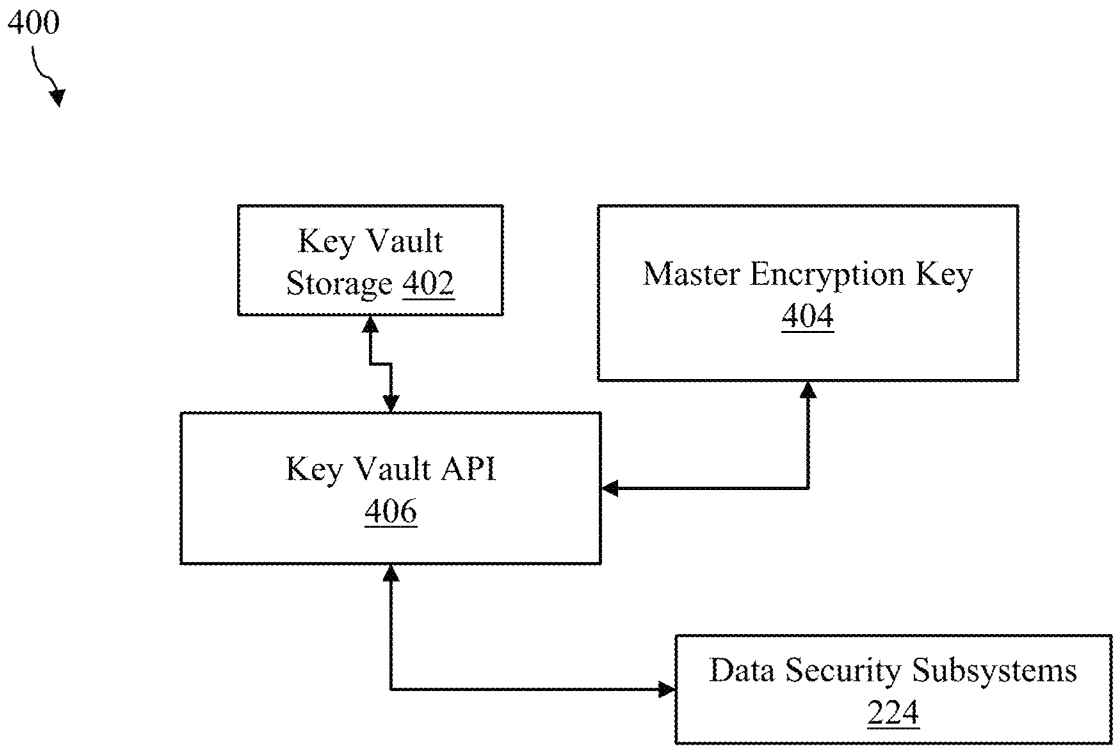
FIG. 4 is a block diagram of a key vault system, in accordance with an example of the present disclosure.

FIG. 4 is a block diagram 400 of the key vault system 228, in accordance with an example of the present disclosure. The system 228 is independent of, but accessible by, the nodes 116 (e.g., via an API 406 exposed and implemented by the system 228). As shown in FIG. 4, the system 228 includes a key vault storage 402, a master encryption key 404, and the key vault API 406 that is configured to interoperate with data security subsystems 224 of the nodes 116. The system 228 is configured to encrypt security configuration of the nodes 116, including the one or more data security keys, location (i.e., hostname, IP address), and one or more API keys and store these security configuration elements in the storage 402.

In some examples, the system 228 is configured with the encryption key 404 (e.g., a master encryption key or master security key) and is responsible for encrypting one or more data security keys of one or more of the nodes 116 using the master encryption key and storing the encrypted data security keys in the storage 402. The encrypted data security keys may be stored in association with identifiers (e.g., a host name or IP address) of nodes to which the keys are assigned. In an example, the system 228 is configured to generate the data security keys for the one or more nodes 116. In an example, the system 228 may transmit the data security keys to the one or more nodes 116. In an example, the system 228 has its own storage 402 separate from the other systems (e.g., the node manager system 226 and the project management system 230 of FIG. 2).

In some examples, the system 228 is configured to receive (e.g., from the node manager system 226) a data security key access schedule with information specifying when one or more of the nodes 116 are denied access to, or usage of, data security keys. For example, if a node is being used on the team within the organization, a schedule may be received with information descriptive of one or more days and time slots during the day when the data security key is accessible by the node 116. In an example, the schedule information is transmitted to one or more associated nodes 116 and received at the one or more data security subsystems and then transmitted to a network information subsystem 208 of the one or more associated nodes 116.

In an example, the system 228 is configured to receive or generate a value of the master encryption key 404. For instance, in some examples, the master encryption key 404 is received or generated in response to input received from a user via an interface implemented by the system 228 (e.g., in collaboration with the interface subsystem 206). In these examples, the system 228 stores the master encryption key 404 in local memory. This local memory may be volatile memory or non-volatile memory.

In some examples, the system 228 is configured to receive one or more messages from the event tracking subsystem 222 and/or the node manager system 226 in the event of a security threat to the one or more nodes 116. In these examples, the system 228 may, in response to these messages, instruct one or more of the data security subsystems 224 to cease provision of encryption/decryption service and or deny access to data security keys stored in the storage 402 until further notice.

Figure 5:
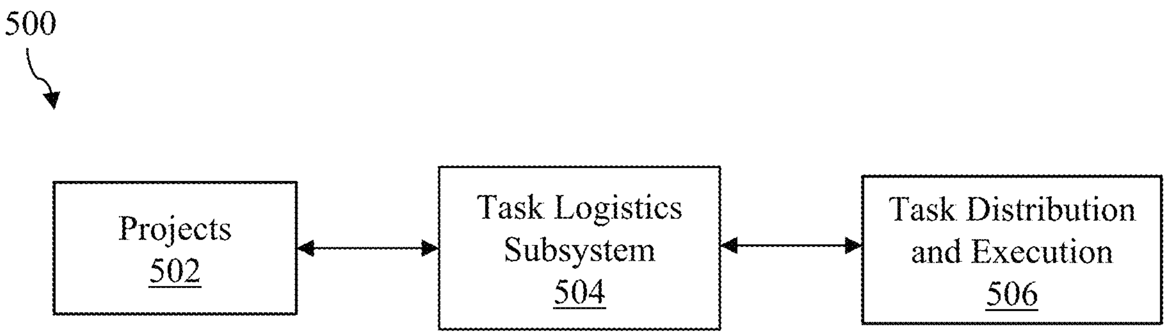
FIG. 5 is a block diagram of a project management system, in accordance with an example of the present disclosure.

FIG. 5 is a block diagram 500 of the project management system 230, in accordance with an example of the present disclosure. As shown in FIG. 5, the system 230 includes a dedicated task logistics subsystem 504. The system 230 is configured to allow the one or more users to plan one or more projects 502 and to view the status of the one or more projects 502. In an example, the system 230 is configured to facilitate planning of long term projects. The system 230 is configured to communicate with the nodes 116 to initiate execution 506 of one or more tasks via the nodes 116.

In an example, the system 230 operates separately from any node to simulate decomposition of a prompt into the one or more tasks of a task plan. The system 230 is configured to allow the one or more users to create the one or more projects 502 associated with the one or more prompts. In an example, the one or more users may create the one or more projects 502 associated with a natural language prompt. The system 230 is configured to transmit tasks 508 associated with task plans for the one or more projects 502 to task processor subsystems (e.g., the task processor subsystem 214 of FIG. 2) of the nodes 116.

A description of one example in which the system 230 is used to manage a mining project on Mars follows. Other examples will be apparent in view of this disclosure. This example begins with the system 230 receiving an initial prompt "Initiate a 30-day aluminum mining operation on Mars using three robots. Robot A will survey and map potential mining sites. Robot B will extract aluminum. Robot C will process and store the extracted aluminum. Coordinate their activities for maximum efficiency." Upon receipt of this prompt the system 230 uses an AI agent to decompose the prompt into multiple tasks. More specifically, in this example, the AI agent generates the following tasks.

TABLE 1

| Tasks |
|---|
| Survey and map potential mining sites (assigned to Robot A) |
| Develop an extraction plan based on survey data (assigned to Robot B) |
| Set up processing and storage facilities (assigned to Robot C) |
| Execute mining operations (coordinated effort) |
| Monitor and report progress (all robots) |

Continuing with this example, the system 230 communicates with the network information subsystem 208 to determine which robot (node) is best suited for each task and assigns tasks to the appropriate robots based on their capabilities and the task requirements. Next, the system 230 sends each task to a task processor subsystem 214 of an assigned robot.

Continuing with this example, the task processor subsystem 214 of Robot A receives the survey task for processing. The task processor subsystem 214 selects appropriate tools for surveying (e.g., spectral analysis and ground-penetrating radar). Next, the data retriever subsystem 216 accesses existing Mars geological data and the Robot A performs a survey and generates a map of potential mining sites. Next, the data ingestion subsystem 220 stores the new survey data in a local data store. The task processor subsystem 214 compiles a report of findings and communicates the report to system 230.

Continuing with this example, the task processor subsystem 214 of Robot B receives the extraction planning task for processing. The task processor subsystem 214 interoperates with the multi-node data retriever subsystem 218 to obtain the survey data from Robot A. Next, the task processor subsystem 214 analyzes the survey data and interoperates with the data retriever subsystem 216 to obtain information on aluminum extraction techniques. The task processor subsystem 214 next develops an optimal extraction plan using the obtained information, compiles the extraction plan, and communicates the plan to the system 230.

Continuing with this example, the task processor subsystem 214 of Robot C receives the task to setup processing and storage facilities. The task processor subsystem 214 determines requirements based on expected extraction volumes and interoperates with the data retriever subsystem 216 to obtain information on aluminum processing techniques and storage requirements. Next, the task processor subsystem 214 identifies suitable locations, sets up facilities, and compiles a report on the setup. The task processor subsystem 214 next communicates the report back to the system 230.

Continuing with this example, the system 230 receives the reports from the three robots and uses an AI agent to create a coordinated mining operation plan. The system 230 distributes specific instructions to each robot for the execution phase.

Continuing with this example, each robot receives its specific instructions and performs assigned tasks. Robot A continues to survey and update maps. Robot B extracts aluminum following the developed plan. Robot C processes and stores the extracted aluminum. Each of the robots regularly updates the system 230 regarding progress.

Continuing with this example, each robot's event tracking subsystem 222 logs all activities. At regular intervals, each robot's task processor subsystem 214 compiles a progress report and sends the report to the system 230. The system 230 aggregates the data and provides overall project status updates.

Continuing with this example, after 30 days, the system 230 signals the end of the operation. Final reports are generated by each robot and compiled by system 230 into a comprehensive project summary. This summary specifies total aluminum extracted, processed, and stored.

Throughout this process, all data transmissions between robots and the system 230 are encrypted using the data security subsystems (e.g., the data security subsystem 224 of FIG. 2) of the robots and the keys provided by the key vault system 228. The network information subsystem 208 continually updates the subject matter ontology regarding each robot's capabilities and available data, ensuring optimal task distribution and coordination.

Figure 6:
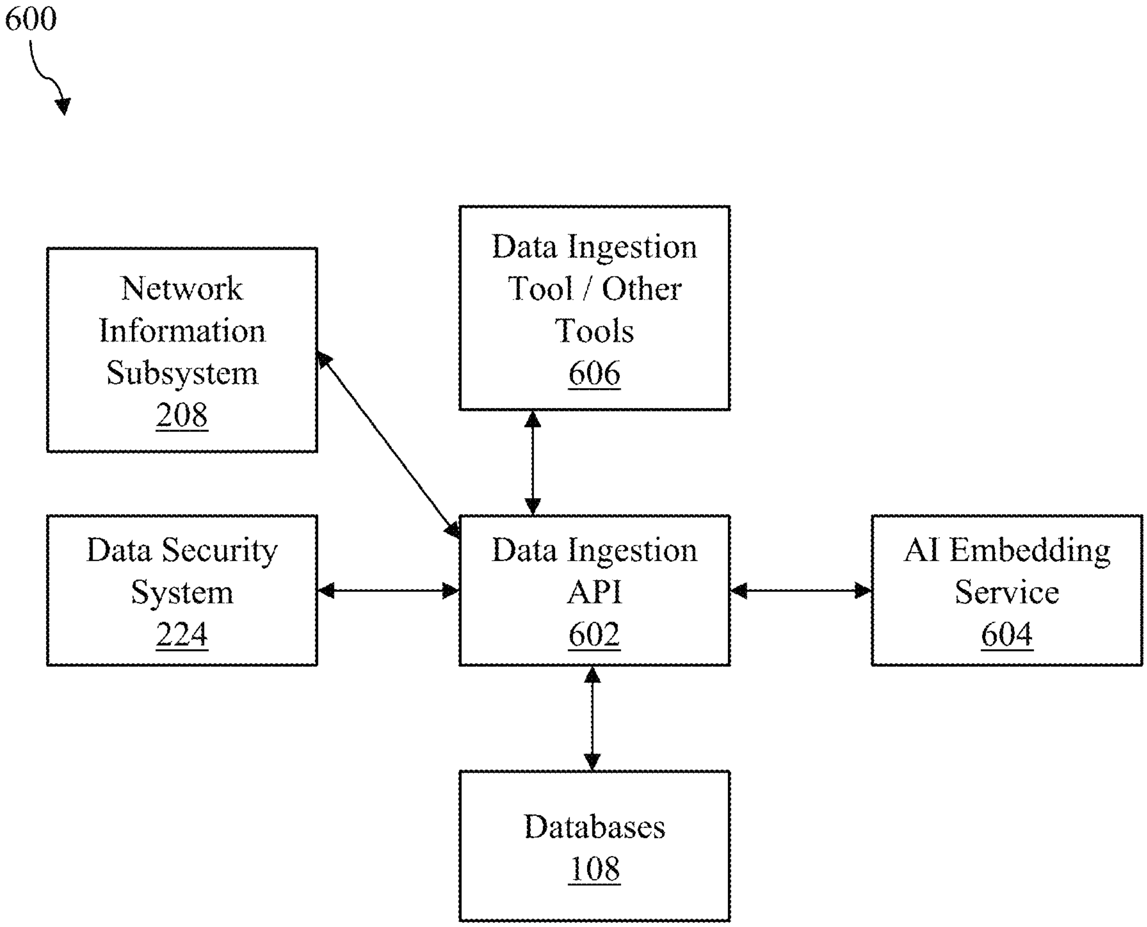
FIG. 6 is a block diagram of a data ingestion subsystem in one or more nodes, in accordance with an example of the present disclosure.

FIG. 6 is a block diagram 600 of the data ingestion subsystem 220 in the nodes 116, in accordance with an example of the present disclosure. As shown in FIG. 6, the subsystem 220 includes a data ingestion API 602 and an AI embedding service 604. The API 602 interoperates with the databases 108 of FIG. 1, the data security subsystem 224 of FIG. 2, the network information subsystem 208 of FIG. 2, other tools (e.g., described above with reference to FIG. 2) and the AI embedding service 604. In some examples, the data ingestion subsystem 220 is configured to use an AI model to extract metadata or structured data from data targeted for ingestion. In an example, the data ingestion subsystem 220 is configured to extract the data and metadata to build one or more ontologies.

In an example, the data ingestion subsystem 220 is configured to transmit the extracted metadata to the one or more network information subsystems 208 included in nodes 116 to add the extracted metadata to one or more ontologies stored in the nodes 116. In an example, the data ingestion subsystem 220 is configured to select one or more optimized formats to store the extracted data and metadata using an AI model fine-tuned or otherwise trained to receive metadata descriptive of the underlying data and select a format therefor. The data ingestion subsystem 220 is configured to generate one or more vector embeddings (via the service 604) for the data using a vector embedding model. The generated one or more vector embeddings are stored for adapting one or more semantic searches for retrieving data.

In an example, the data ingestion subsystem 220 is configured to associate the extracted data and metadata with one or more data collections. A data collection may be any group, set, or other population of data having at least one commonality. The one or more data collections may be made public or private by default. Data and metadata associated with a public data collection is accessible by other nodes. In an example, privacy settings and private data collections may be requested by a subsystem interoperating with the data ingestion subsystem 220. For instance, in one example, an API call to the data ingestion subsystem 220 includes parameters specifying one or more fields of the extracted data and metadata to be encrypted. In an example, if no data collection is defined in an API call, the data ingestion API 602 may return an error response or automatically create a collection with a default privacy setting (e.g., private or public). In at least one example, the default privacy setting is private.

Figure 7:
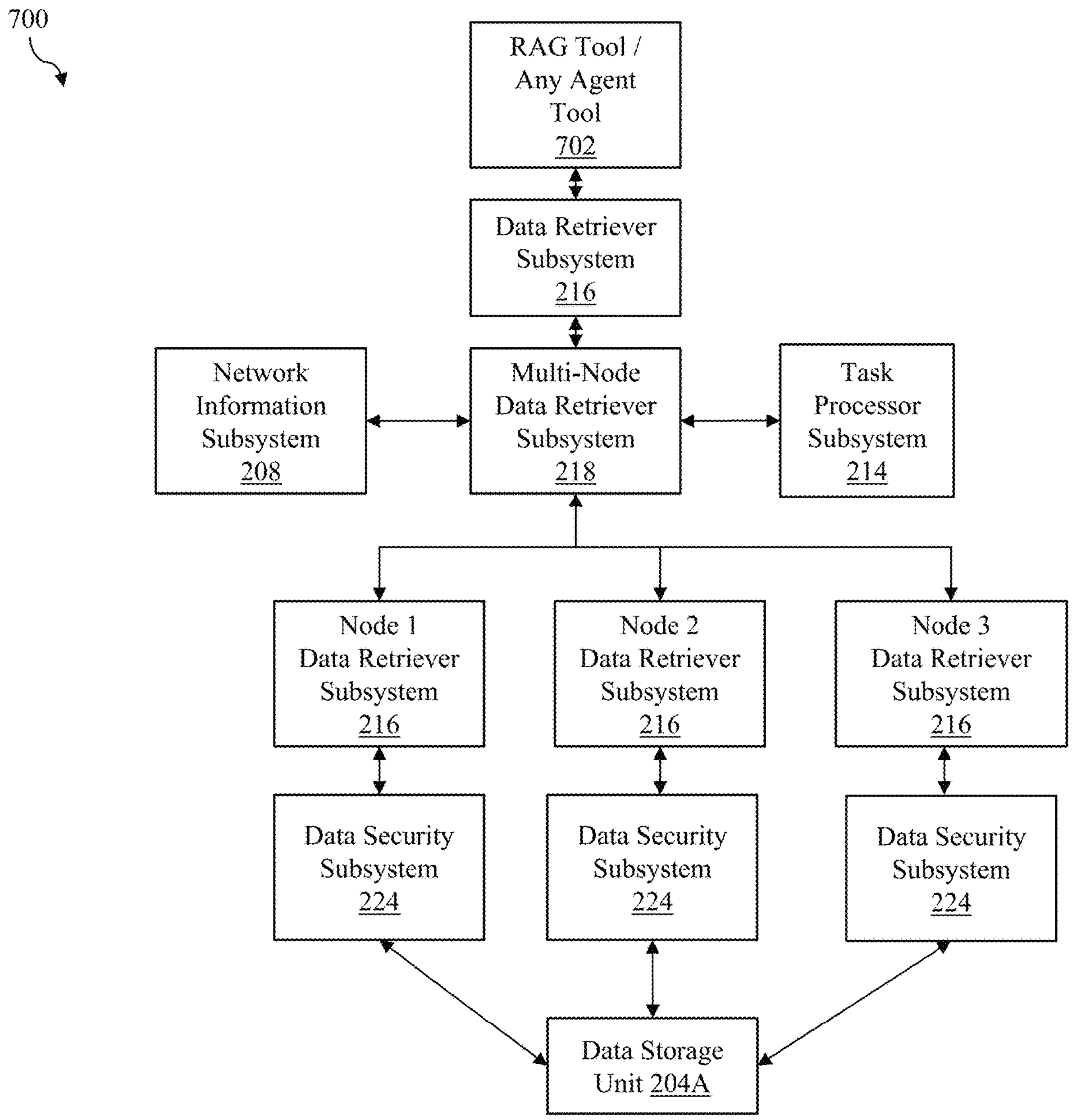
FIG. 7 is a block diagram of subsystems and process involved in data retrieval in the one or more nodes, in accordance with an example of the present disclosure.

FIG. 7 is a block diagram 700 of subsystems and process involved in data retrieval, in accordance with an example of the present disclosure. In some examples, these processes enable nodes to retrieve the public data from other nodes based on each node's public subject matter and location within various ontologies. As shown in FIG. 7, these systems and processes include an AI agent tool (e.g., a RAG tool) 702, several instances of the data retriever subsystem 216 of FIG. 2, the multi-node data retriever subsystem 218 of FIG. 2, a network information subsystem 208 of FIG. 2, 3 nodes 116 of FIG. 1 that include instances of data retriever subsystems 216, several instances of the data security subsystem 224 of FIG. 2, and the data storage unit 204A of FIG. 2. AI agent tools 702 are described above with reference to FIG. 2. The data retriever subsystems 216 of nodes 1-3 are configured to interoperate with the data security subsystems 224 to decrypt data retrieved from the data storage unit 204A based on one or more queries originating from the tool 702 or the task processor subsystem 214. In some examples, the data retriever subsystems 216 are configured to retrieve data including text, images, videos, and the like. In certain examples, the data retriever subsystem 216 is configured to retrieve public data or private data from one or more collections.

In some examples, the data retriever subsystems 216 and the multi-node data retriever subsystem 218 are configured to access an ontology of subject matter of the data stored in the data storage unit 204A. For instance, in some examples, the data retriever subsystems 216 access ontologies stored locally and the multi-node data retriever subsystem 218 access ontologies by interoperating with the network information subsystem 208. In these examples, the multi-node data retriever subsystem 218 is configured to determine on which nodes data requested by queries is stored, and the data retriever subsystems 216 is configured to determine in which data stores (in which database, table, etc.) data requested by queries is stored.

In some examples, the multi-node data retriever subsystem 218 receives a query from the task processor subsystem 214. This query specifies the type of information needed, which could be subject matter data, data storage location, or both. The multi-node data retriever subsystem 218 consults the consolidated ontologies stored in the network information subsystem 208. The multi-node data retriever subsystem 218 uses two primary ontologies, the consolidated subject matter data ontology, and the consolidated geospatial ontology. Both of these ontologies include information regarding all of the nodes 116. These ontologies are stored in a graph database like Neo4J, which allows for efficient querying of complex relationships. Using the ontologies, the multi-node data retriever subsystem 218 identifies which nodes have relevant public data. This operation involves traversing the graph structure of the ontologies; matching the query requirements with the metadata associated with each node's public data; and creating a list of nodes that potentially have relevant data. Next, for each identified node, the multi-node data retriever subsystem 218 refines the original query based on the specific data available at that node. In some examples, this operation includes adjusting query parameters to match the node's data structure; adding node-specific context to the query; and breaking down a complex query into simpler sub-queries if necessary. It should be noted that, in at least some examples, these operations are executed by an AI agent with access to an AI model fine-tuned or otherwise trained to refine queries. Next, the multi-node data retriever subsystem 218 sends the refined queries to the data retriever subsystem of each relevant node. This process involves establishing secure connections with each node; transmitting the refined queries; and potentially using parallel processing to query multiple nodes simultaneously for efficiency.

Continuing with the present example, the data retriever subsystems 216 at each node processes the refined queries. This processing may include use of semantic search capabilities. Such use includes converting the query into vector embedding and comparing the converted vector embedding to stored embeddings in a local vector database. Through this comparison, data relevant to the refined queries is identified via sematic similarity (e.g., cosine similarity). For geospatial data, the data retriever subsystems 216 may utilize geospatial indexing to quickly identify relevant geographical areas and geometric operations to find data within specified regions or meeting certain geospatial criteria. Once the data retriever subsystems 216 have identified relevant data, the data retriever subsystems 216 interoperates with the local data security subsystem 224 to decrypt the data, provided that the identified data is public data. Next, the data retriever subsystems 216 package the identified data and transmit the packaged data back to the multi-node data retriever subsystem 218.

Continuing with the present example, the multi-node data retriever subsystem 218 collects packaged data sent by the data retriever subsystems 216; waits until all refined queries have been processed (e.g., waits until nacks or packaged data is received from all the data retriever subsystems 216; waits until expiration of a timeout period, etc.); extracts the relevant data from the packages; uses an AI agent to assemble and integrate the relevant data; resolves any conflicts or discrepancies in the relevant data; and formats the relevant data to the requirements of the original query received from the task processor subsystem 214. Next, in some examples, the multi-node data retriever subsystem 218 prepares a consolidated response to the original query that includes the formatted relevant data, metadata about the sources of the data, and any notes regarding data quality, completeness, or potential discrepancies. Finally, the multi-node data retriever subsystem 218 communicates the consolidated response back to the task processor subsystem 214. It should be noted that other processes, such as the task logistics subsystem 210 of FIG. 2, may interoperate with the multi-node data retriever subsystem 218 as does the task processor subsystem 214 in the example described above.

For example, in a Mars mining operation, the ontology may categorize data under headings such as "Geological Data," "Extraction Data," and "Processing Data." Node 1 might store geological survey reports and mineral composition data, while Node 2 stores drilling logs and ore extraction data, and Node 3 stores processed material records and efficiency reports. Each data type is associated with metadata, such as subject matter (e.g., rock composition, drilling operations), content type (e.g., text documents, tabular data), storage location, privacy settings, and creation date. This organized structure allows an AI agent within the subsystem 216 or 218 to efficiently locate and retrieve specific information in response to user queries or task requirements, ensuring quick and accurate access to the necessary data.

In some examples, the data retriever subsystem 216 is configured to utilize an embedding model to generate the one or more vector for the requested queries used to retrieve the data from the one or more vector databases. The data retriever subsystem 216 may be configured to utilize the AI model to extract the one or more metadata from the one or more queries to be used for retrieving the one or more data, filtering of the one or more data, from the one or more databases. In some examples, the data retriever subsystem 216 is configured to retrieve private data or public data from the one or more databases. In some examples, the data retriever subsystem 216 is configured to interoperate with the data security subsystem 224 of FIG. 2 to decrypt data using a data security key stored locally on the node.

Continuing with FIG. 7, in one example, the network information subsystem 208 maintains a subject matter ontology that categorizes and maps the data and capabilities of each node in the system. For example, in a Mars mining operation, the ontology might categorize data under topics such as "Geological Survey Data," "Drilling and Extraction Data," and "Material Processing Data." Node 1 may be associated with geological survey data, including rock composition analysis and mineral deposit locations. Node 2 may be linked to drilling and extraction data, such as drilling depth records and ore extraction volumes. Node 3 may be associated with material processing data, including refined aluminum output and processing efficiency reports. By organizing data and capabilities in this manner, the AI agent can efficiently identify which node possesses the relevant information or agent tools to answer a query or perform a specific task, ensuring optimal task execution.

Continuing with FIG. 7, in another example, the network information subsystem 208 maintains a geospatial ontology that categorizes and maps geospatial data across the nodes in the system. For example, in a Mars mining operation, the ontology may organize geospatial data under categories such as "Surveyed Locations," "Extraction Sites," and "Processing Facility Locations." Node 1 might contain geospatial data on mapped mineral deposits and geological features, including location coordinates and attributes like mineral type and concentration levels. Node 2 could be associated with active drilling sites and extraction zones, with data on depth, extraction volume, and transport routes. Node 3 might manage data related to processing facility locations and material storage areas, including facility capacity and operational status. By organizing geospatial data in this manner, the AI agent can efficiently identify and retrieve geospatial information necessary for tasks such as locating aluminum-rich sites or optimizing transport routes between extraction and processing facilities.

Continuing with FIG. 7, in another example, the network information system 208 maintains a capability ontology that maps the specific capabilities of each node (robot) to their respective tasks within the mining operation on Mars. For instance, Node 1, responsible for surveying, is associated with capabilities such as terrain mapping, geospatial data collection, and aluminum deposit detection. Node 2, tasked with mining, is linked to capabilities including drilling, soil analysis, and aluminum extraction. Node 3, which handles post-extraction processing, is mapped to capabilities like aluminum refinement, material storage, and data security management. This ontology structure enables the system to efficiently allocate tasks by matching the required capabilities to the appropriate nodes, optimizing the overall operation and ensuring that each robot is deployed according to its specialized functions.

Figure 8:
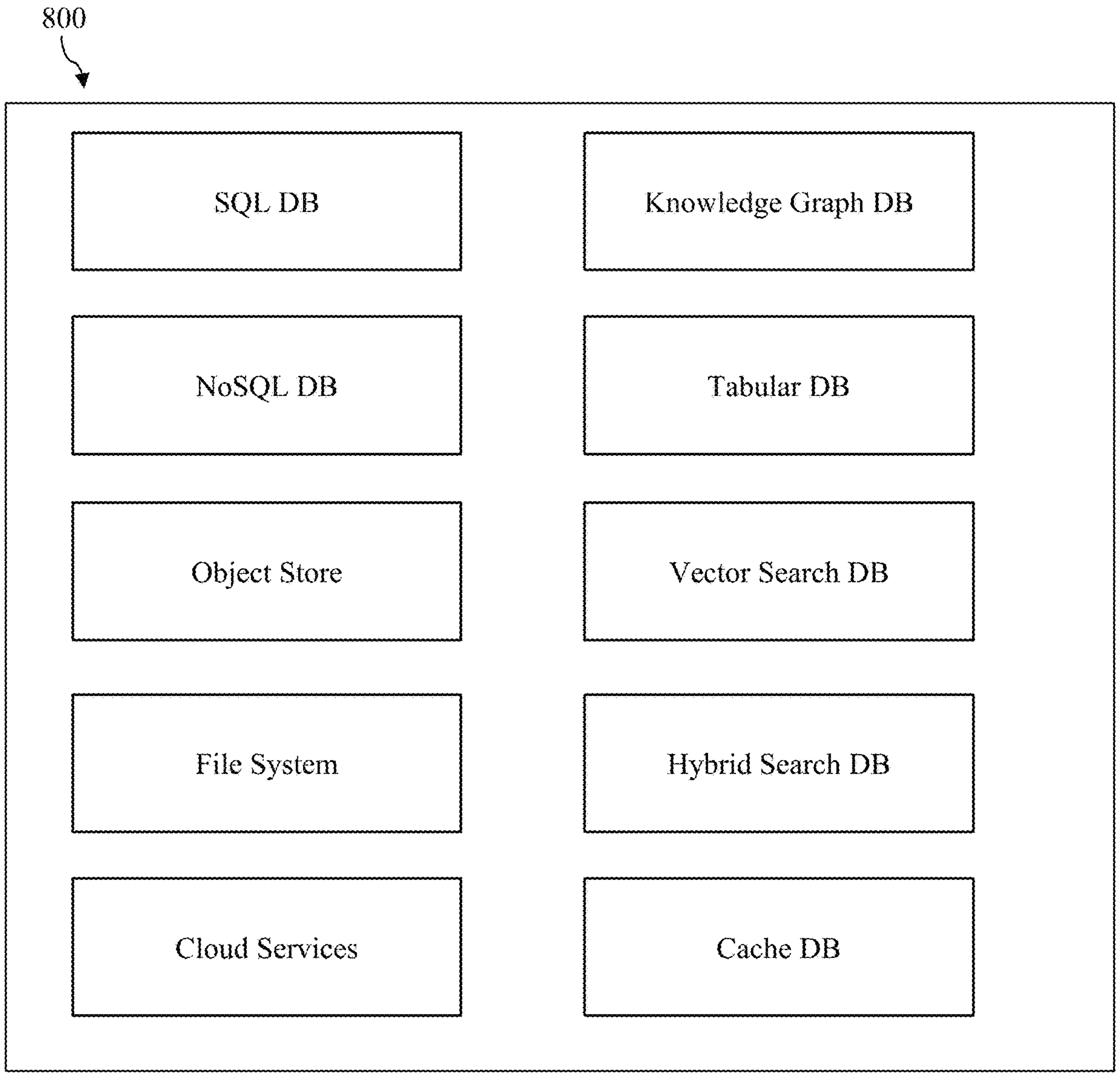
FIG. 8 is a block diagram of a various data store in the one or more nodes, in accordance with an example of the present disclosure.

FIG. 8 is a block diagram 800 of various data stores that may be allocated and populated with data in the nodes 116, in accordance with an example of the present disclosure. In an example, the data stores may be capable of storing any type of data. Examples of data types supported by the various data stores include text, images, videos, JSON, XML, HTML, and tabular data. Tabular data may include CSV, MS Excel, graph/connected data, one or more objects, and the like. In an example, the data stored in the various data stores may be encrypted. In an example, the various data stores may include a subject matter graph data store including Neo4J, and another database capable of storing data represented as a graph. In an example, the various data stores may include at least one data store capable of storing at least one type of data (e.g., the structured data, and the tabular data). In an example, each data store may provide a mechanism, such as an API, that allows the data ingestion subsystem 220 and data retriever subsystem 216 to store and retrieve the data to their respective data store.

In an example, the various data stores may include a data store (i.e., a database) capable of storing metadata (i.e., structured data). In an example, the various data stores may include a data store capable of storing tabular data. In an example, the various data stores may include a vector database capable of storing the one or more vector embeddings, metadata, and text, in order to perform vector similarity searching based on one or more vector embeddings. In an example, data (e.g., text) in a vector data store may be encrypted with a data security key associated with a node. In an example, the various data stores may include a hybrid text and keyword search data store. In an example, the various data stores may include a data store capable of storing objects including texts, images, videos data, other binary data, or a combination thereof. In an example, the various data stores may include a structured query language (SQL) database. In an example, the various data stores may include a key-value data store utilized for data caching purposes including Redis. In an example, the various data stores may include a data store configured to store user and system logs. In an example, the various data stores may include a file system storage data store. In an example, the various data stores are configured to store data in graph, tabular, SQL, NO-SQL, object data including files and images, vector embeddings in a vector database, text in a keyword search database, and key-value pairs. In an example, the data storage subsystem may be local on premises or cloud based data storage subsystem.

In an example, the various data stores may include a data store capable of storing blob data. In an example, the various data stores may include a data store capable of storing spatial data (e.g., the one or more geospatial data). In an example, the data stored in the various data stores is dependent on the capabilities assigned to the nodes 116.

Figure 9:
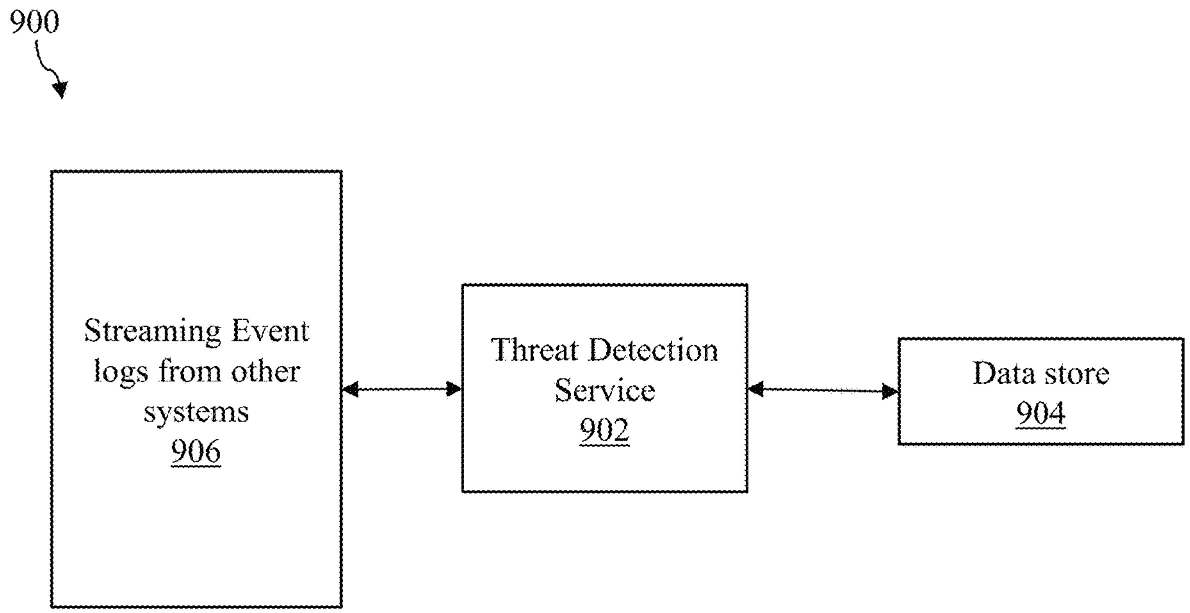
FIG. 9 is a block diagram of an event tracking subsystem in the one or more nodes, in accordance with an example of the present disclosure.

FIG. 9 is a block diagram 900 of the event tracking subsystem 222 in the one or more nodes, in accordance with an example of the present disclosure. As shown, the subsystem 222 includes a threat detection service 902, data store 904, and event logs 906. The subsystem 222 is configured to record one or more activity logs 906 including the one or more user activities and the one or more system activities. The subsystem 222 is configured to identify security threats by identifying irregular user behavior from the one or more activity logs or one or more invalid prompts. In an example, the subsystem 222 is configured to transmit an alert message to the node manager system 226 or the key vault system 228, with information indicating a severity of a threat when a security threat is detected. In an example, the subsystem 222 is configured with a message queue to transmit one or more messages to other subsystems and to receive one or more messages specifying one or more user activities and/or one or more system activities. The subsystem 222 may be further configured to utilize an APIs for communicating with the nodes 116 and the key vault system 228, and to add log data such as the one or more user activities and the one or more system activities.

In an example, the subsystem 222 is further configured for storing profiles in the data store 904 in which one or more transaction activities deviating from a user's historical behavior are flagged. In an example, the subsystem 222 may be further configured for location verification (e.g., highlighting potential threats based on transactions conducted by a user outside the user's regular geolocation). In an example, the subsystem 222 may track the location of a node by utilizing geolocation data obtained from a global positioning system (GPS) receiver/sender incorporated within the node.

Figure 19:
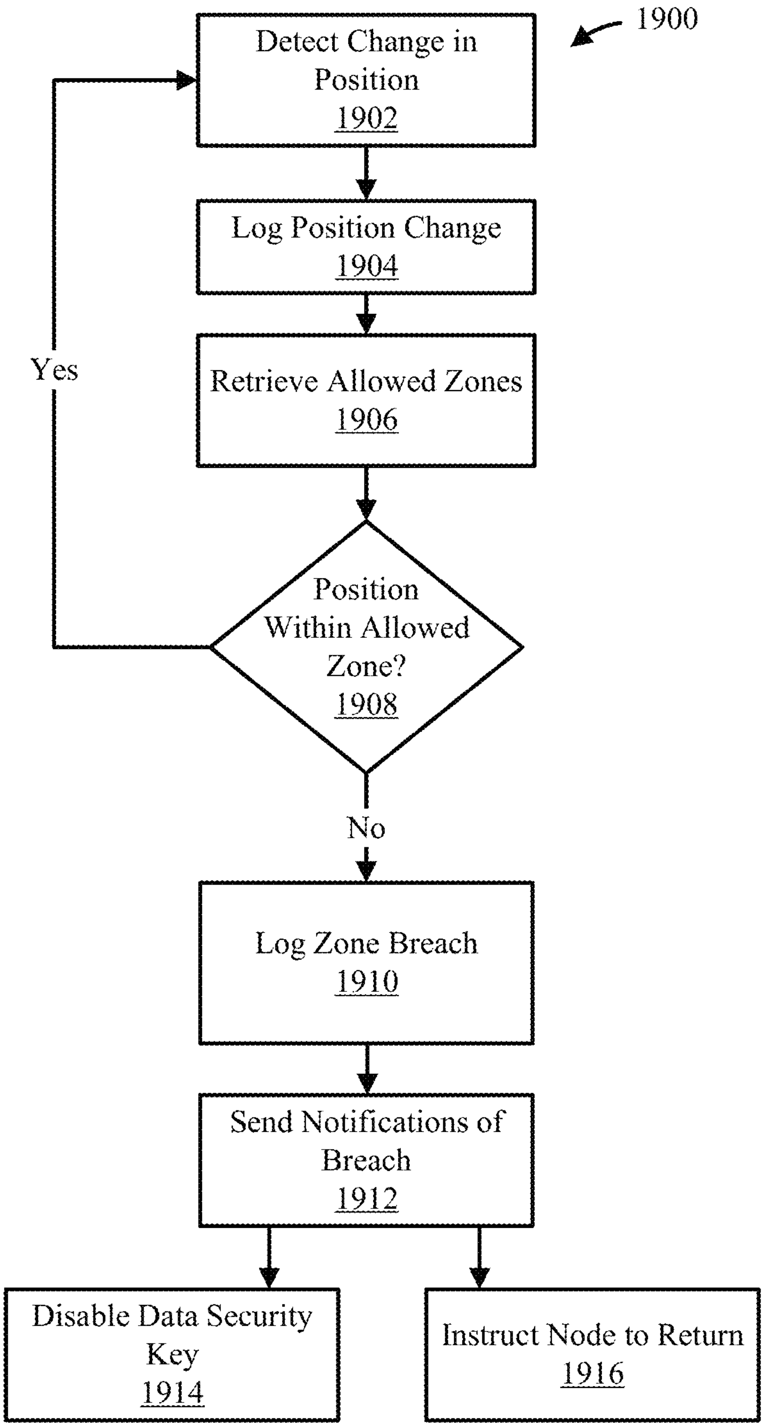
FIG. 19 is a flow diagram of a particular implementation of a geofence enforcement process, in accordance with an example of the present disclosure.

FIG. 19 is a flow diagram of a geofence enforcement process 1900, in accordance with an example of the present disclosure. The process 1900 may be executed, in some examples, by the system 102 described herein. As shown, in FIG. 19, the process 1900 starts with a position sensor (e.g., part of the interface subsystem 206 of FIG. 2) detecting 1902 a change in position of its host node and notifying a local event tracker (e.g., the subsystem 222) of the change.

Continuing with the process 1900, the event tracker logs 1904 the change in position.

Continuing with the process 1900, the event tracker interoperates with a network information subsystem (e.g., the network information subsystem 208 of FIG. 2) and/or a data retriever (e.g., the data retriever subsystem 216 of FIG. 2 or the multi-node data retriever subsystem 218 of FIG. 2) to obtain 1906 information specifying zones in which the node is allowed to travel.

Continuing with the process 1900, the event tracker determines 1908 whether the position of the node lies within the allowed zones. If the event tracker determines that the node lies within the allowed zones, the event tracker returns to the operation 1902. If the event tracker determines that the node lies outside the allowed zones, the event tracker continues to operation 1910.

Continuing with the process 1900, the event tracker logs 1910 a zone breach event.

Continuing with the process 1900, the event tracker sends 1912 notifications of the zone breach event to a local data security subsystem (e.g., the data security subsystem 224 of FIG. 2) and a node manager system (e.g., the node manager system 226 of FIG. 2).

Continuing with the process 1900, the data security subsystem disables 1914 the nodes local data security key.

Continuing with the process 1900, the node manager system instructs 1916 the node to return to an allowed zone.

The process 1900 allows for real-time monitoring of node positions and quick detection of any geographic fence breaches. The use of a graph database (Neo4j) for the geofence ontology allows for complex geospatial queries and relationships between nodes and their allowed zones. The append-only log in, for example, Redis ensures that all activities, including breaches, are recorded for future analysis and auditing.

In at least one example, the subsystem 222 monitors the activities of nodes involved in a Mars mining operation to detect potential security threats. In this example, Node 1 is normally used for geological surveys and data analysis. Node 2 is normally used for drilling and extraction. Node 3 is normally used for material processing and storage.

Continuing with this example, the subsystem 222 is configured to detect unauthorized access when a user attempts to access Node 2's data storage during a time period when it is supposed to be restricted according to its data security schedule. In this example, the subsystem 222 detects this anomaly by comparing the access attempt against the established security schedule, which indicates that access should not be allowed at that time.

Continuing with this example, the subsystem 222 is configured to detect an unusual data transfer where a large volume of data is suddenly transferred from Node 3 to an unknown external device, which is not typical for its operations. In this example, the subsystem 222 detects this anomaly by monitoring data transfer patterns and identifying this as unusual activity since Node 3 typically only transfers data internally or to specific, known devices.

Continuing with this example, the subsystem 222 is configured to detect irregular user behavior where a user connected to Node 1 begins making repeated requests for data that do not align with normal usage patterns, such as requesting sensitive data that is rarely accessed. In this example, the subsystem 222 detects this anomaly via an AI model fine-tuned or otherwise trained to analyze historical user behavior that flags this sudden change in behavior as a potential threat.

Continuing with this example, the subsystem 222 is configured to detect an invalid prompt or comment where a user attempts to execute a command on Node 2 that is not valid or is malformed, which could indicate a security probe or an attempted attack. In this example, the subsystem 222 detects this anomaly by checking the invalid prompt against a list of authorized commands. In this example, the subsystem 222 logs the event for further investigation.

As illustrated in the example described above, the subsystem 222 can continuously monitor user and system activities, and compare them against established patterns and security protocols. It uses advanced analytical techniques, such as AI models, to detect anomalies like unauthorized access attempts, unusual data transfers, irregular user behavior, and invalid commands. When a potential threat is identified, the system triggers alerts and may take actions such as blocking access or notifying the node manager, thereby enhancing the overall security of the operation. Moreover, this example illustrates how the subsystem 222 can detect various security threats by monitoring deviations from normal activity patterns and responding to them promptly.

Figure 10:
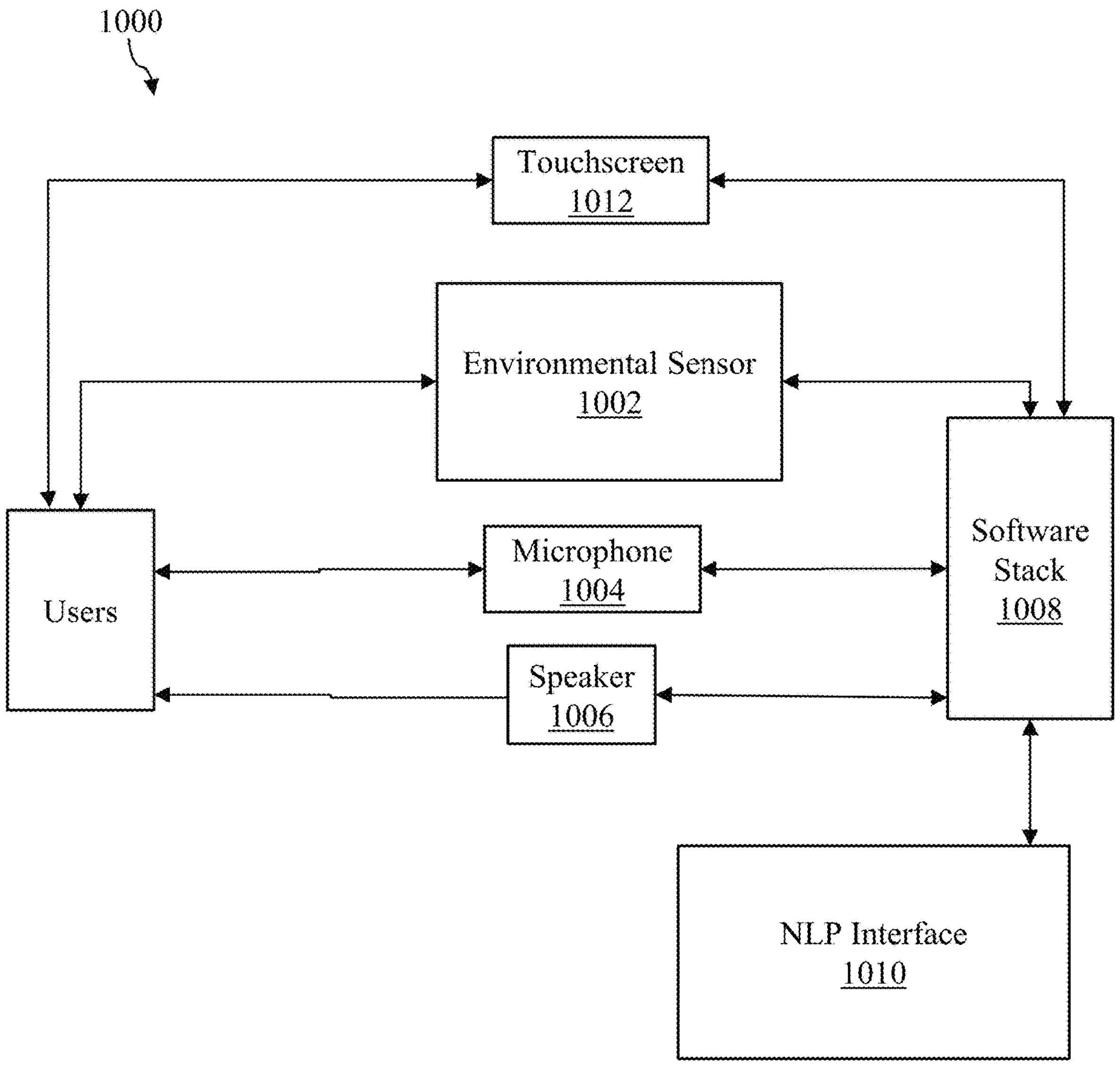
FIG. 10 is a block diagram of an interface subsystem in the one or more nodes, in accordance with an example of the present disclosure.

FIG. 10 is a block diagram 1000 of an interface subsystem 206 in the nodes 116, in accordance with an example of the present disclosure. As shown, the subsystem 206 includes one or more environmental sensors 1002, a microphone 1004, a speaker 1006, a touchscreen 1012, an NLP interface 1010, and a software stack (e.g., device drivers and associated programs) 1008 configured to drive operations of the devices 1002, 1004, 1006, and 1012. In some examples, the sensors 1002 may include, for example, an optical device, camera, thermal sensor, infrared sensor or the like.

In some examples, the subsystem 206 is configured to allow the one or more users to enter the one or more prompts or the one or more queries using natural language and generates one or more responses to the one or more prompts/queries provided by the one or more users. In an example, the interface subsystem 206 is configured to receive the one or more prompts via voice, audio through a microphone 1004, text, gestures via the touchscreen 1012, and combinations thereof. In an example, the interface subsystem 206 is configured to present an interface to allow the one or more users (e.g., one or more administrators) to upload one or more texts, files, and other contents.

In an example, the interface subsystem 206 is configured to receive a sensory input from the environmental sensor 1002 including a camera, a thermal camera, video recordings, or other optical devices. In an example, the interface subsystem 206 is configured to provide the output response using audio through the speaker 1006. In an example, the audio may be converted into text by the AI agent configured with the one or more agent tools. In an example, the NLP interface 1010 may implement a conversational chat interface allowing the one or more electronic devices 104 to connect to the interface subsystem 206 and for users to converse with the system 102 via the electronic devices 104.

Figure 11:
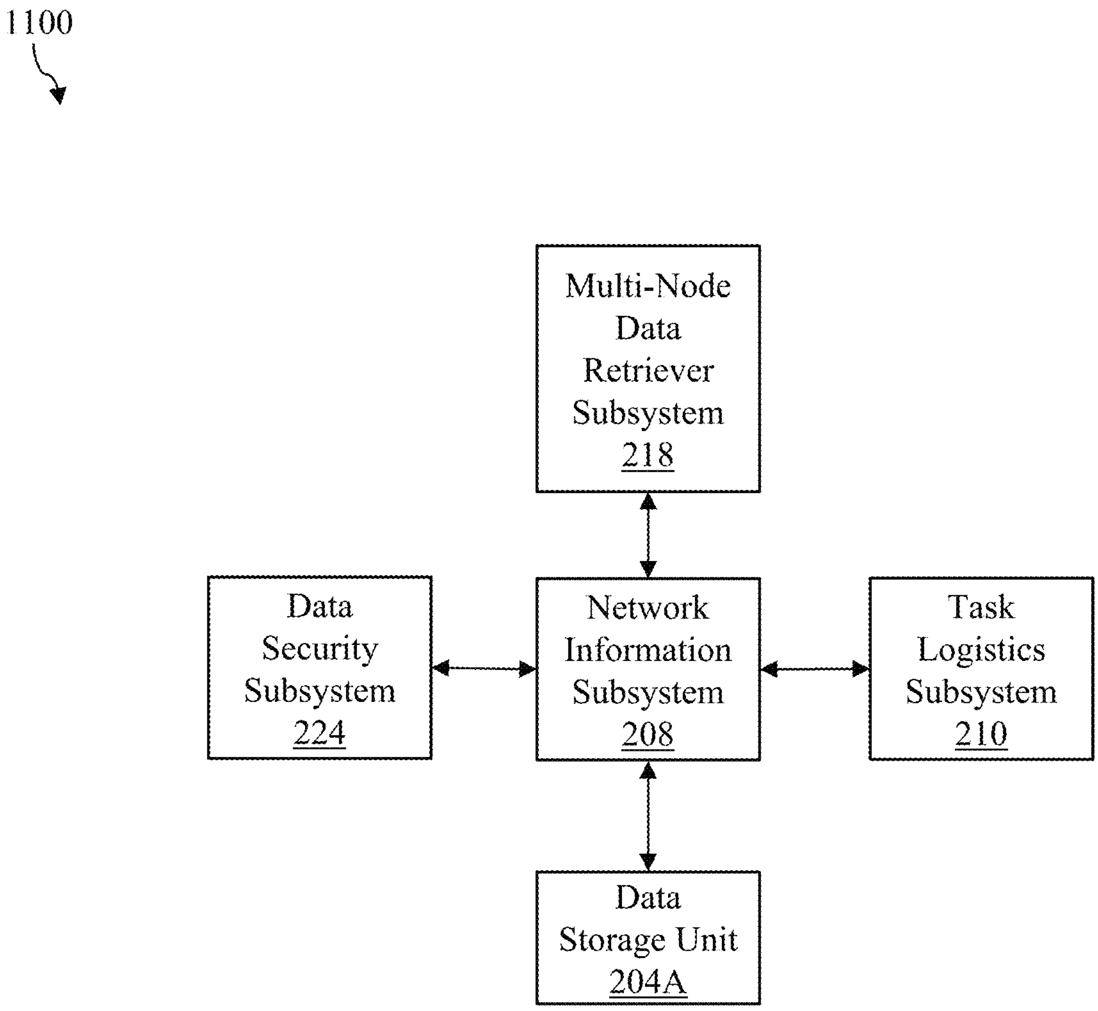
FIG. 11 is a block diagram of selected subsystems that interoperate with a network information subsystem in the one or more nodes, in accordance with an example of the present disclosure.

FIG. 11 is a block diagram 1100 of some subsystems that interoperate with the network information subsystem 208 in the nodes 116, in accordance with an example of the present disclosure. As shown, the diagram 1100 includes the multi-node data retriever subsystem 218, the network information subsystem 208, the data security subsystem 224, the task logistics subsystem 210, and the data storage unit 204A. The network information subsystem 208 stores a repository of network data comprised of information regarding the nodes 116. This information may include at least some data descriptive of each node 116. The other subsystems in the nodes 116 may use the network data to retrieve specific data from the nodes 116. For instance, the network data may be used to select the nodes 116 when creating task plans. The network data may be used to distribute the one or more tasks based on availability and load to other nodes for execution.

In some examples, the network information subsystem 208 maintains data specifying publicly available information stored on other nodes and capabilities of other nodes. Specific examples of the data maintained by the subsystem 208 include a data security schedule that provides information on times nodes are available (e.g., a work schedule of nodes); an ontology of capabilities of the nodes; an ontology of public subject matter concepts relating to the data stored on the nodes; an ontology including geospatial objects assembled from data from each node; and an ontology including geofence objects assembled from data from each node. The geospatial and geofence objects may include vector data modelled using point, line and polygon geometry types. Each of the geospatial and geofence objects may be attributed data that classifies the object into nominal, ordinal, interval or ratio measurement levels. In some examples, ontologies maintained by the network information subsystem 208 may include geospatial and geofence objects taxonomized in a vector data model using point, line and polygon geometry types. These ontologies may allow the geospatial and geofence data to be organized and analyzed based on both location and descriptive characteristics.

The network information subsystem 208 may be configured to perform a variety of functions. For instance, in some examples, the ontological setup described above allows the network information subsystem 208 to organize and analyze geospatial data based on both location and descriptive characteristics. In certain examples, the network information subsystem 208 maintains a consolidated geospatial ontology from each node's public geospatial data mapped to one or more nodes. This ontology can be utilized (e.g., via the network information subsystem 208) by the multi-node data retriever subsystem 218 and task logistics subsystem 210 to determine which nodes have certain geospatial data needed to accomplish a goal of a task. In certain examples, the network information subsystem 208 maintains a consolidated capability ontology of one or more capabilities mapped to one or more nodes. This ontology can be utilized by task logistics subsystem 210 to determine the nodes capable of performing a task. In certain examples, the network information subsystem 208 maintains a consolidated subject matter ontology from each node's public subject matter data mapped to one or more nodes. This ontology can be utilized (e.g., via the network information subsystem 208) by the multi-node data retriever subsystem 218 and task logistics subsystem 210 to determine which nodes have certain subject matter data needed to accomplish the goal of a task. In some examples, the network information subsystem 208 maintains a consolidated availability ontology of one or more data security schedules mapped to one or more nodes. This ontology can be utilized by task logistics subsystem 210 to determine the nodes available to perform a task. In some examples, the network information subsystem 208 maintains a consolidated geofence ontology of one or more data allowed zones mapped to one or more nodes. This ontology can be utilized by the event tracking subsystem 222 to determine geospatial zones in which nodes are allowed to travel. In some examples, the ontologies are stored in a graph database such as Neo4J.

In an example, the network information subsystem 208 is configured to receive the network data updates from the nodes 116 in a node network. In an example, the network information subsystem 208 is configured to receive node item updates from various subsystems (e.g. the task processor subsystem 214 of FIG. 2, the data ingestion subsystem 220 of FIG. 2, etc.) of the nodes 116 in the node network. These node item updates may include data specifying node capabilities and data security schedule, subject matter ontology information, geospatial ontology information, and geofence ontology information.

In some examples, the network information subsystem 208 is configured to process requests from other subsystems (e.g., the task logistics subsystem 210 and the multi-node data retriever subsystem 218 of FIG. 2). In some examples, this processing includes identifying nodes with certain types of public geospatial data, public subject matter data, public geofence data, and capabilities that match search criteria received from the other subsystems. In certain examples, the network information subsystem 208 includes an AI agent that is configured to process the requests from other subsystems. For instance, in some examples, the AI agent determines which nodes are capable of answering a query by leveraging consolidated ontologies that map public subject matter data and geospatial data to specific nodes. In these examples, upon receiving a query, the AI agent analyzes the query's requirements to identify the relevant data or information needed. The AI agent then queries the ontologies to match the query's requirements with the data and capabilities of various nodes, identifying those that store the necessary subject matter or geospatial data and have the tools to generate a response. The AI agent also considers each node's availability and access to its data security key to ensure that only nodes capable of securely and promptly responding are selected. This process allows the AI agent to direct the query to the nodes best suited to provide an accurate and comprehensive answer.

More specifically, in certain examples, the AI agent determines which nodes are able to answer a query by following a systematic process that involves querying the consolidated ontologies, analyzing node capabilities, and assessing data availability. In these examples, The AI agent first accesses the consolidated ontologies described herein. These ontologies map public and private subject matter data, geospatial data, and role data to specific nodes. The ontologies contain detailed metadata about the types of data stored on each node, including subject matter concepts, geospatial attributes, and the data's location within each node's storage. Next, the AI agent analyzes the query to understand the specific data or information needed to provide an accurate response. This analysis involves identifying the subject matter, data types, or geospatial information relevant to the query.

Continuing with the present example, the AI agent matches the requirements of the query with the data and capabilities described in the ontologies. The AI agent determines which nodes possess the relevant data or the ability to process and retrieve the necessary information. This involves checking which nodes have the appropriate subject matter data, geospatial data, or the necessary tools to generate a response. Next, the AI agent considers the availability of each node and whether it has access to its data security key at the time the query is to be executed. This ensures that only nodes capable of responding securely and promptly are considered. Based on the analysis, the AI agent identifies the nodes most capable of answering the query. If multiple nodes could potentially answer the query, the AI agent may select the nodes that are most likely to provide the most relevant or comprehensive response. Through this process, the AI agent ensures that the query is directed to the nodes that have the necessary data, capabilities, and availability to provide an accurate and timely answer.

Figure 12:
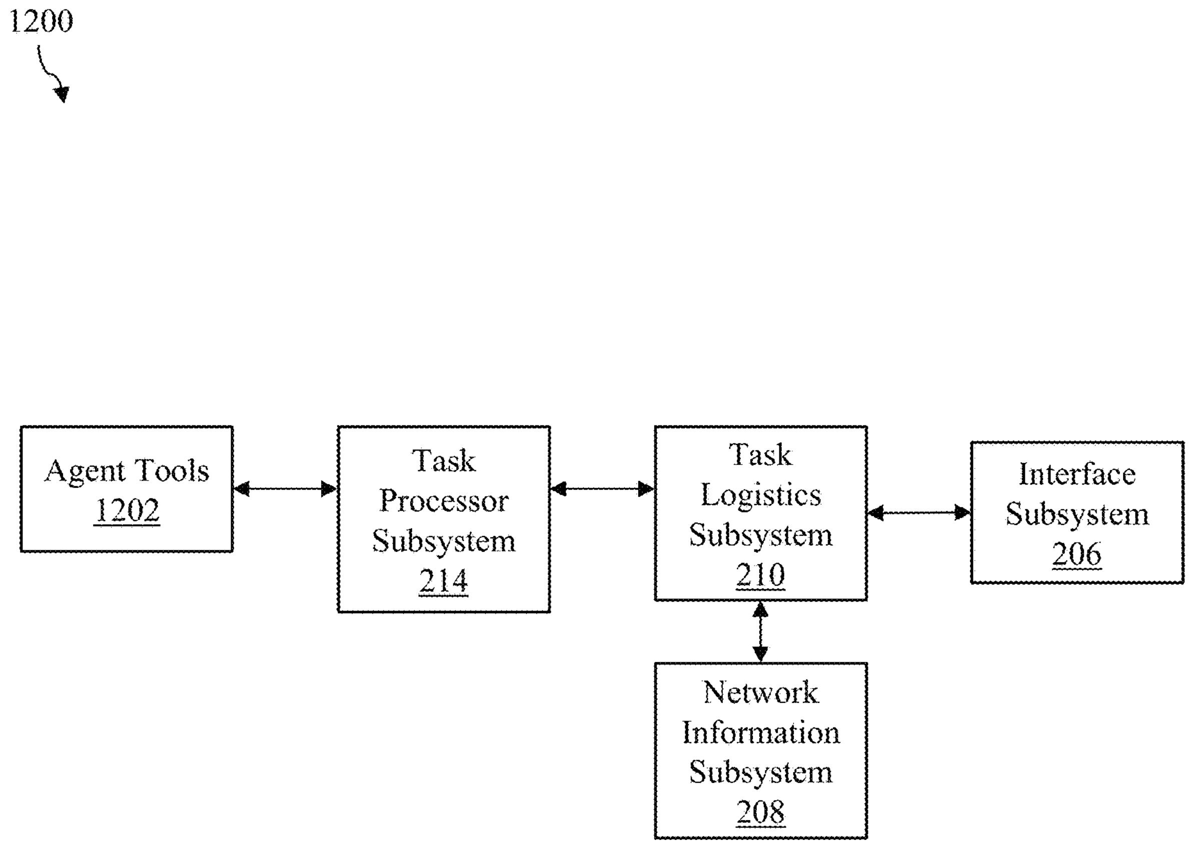
FIG. 12 is a block diagram of subsystems involved in task processing in the one or more nodes, in accordance with an example of the present disclosure.

FIG. 12 is a block diagram 1200 of subsystems involved in task processing, in accordance with an example of the present disclosure. As shown, these subsystems include the task logistics subsystem 210 and the task processor subsystem 214. The task logistics subsystem 210 is configured to generate the one or more tasks based on the one or more prompts received from the one or more users. The task logistics subsystem 210 is configured to break down the one or more prompts associated with each task using, for example, a decomposition AI agent configured with one or more agent tools to generate a task plan. The task logistics subsystem 210 is also configured to assign specific nodes (e.g., required and/or optional nodes) and to suggest the nodes 116 that may work on a task. When the task plan is generated, the task logistics subsystem 210 is configured to distribute each task to the task processor subsystem 214 of the assigned nodes.

In an example of the present disclosure, the task processor subsystem 214 is configured to receive the one or more tasks from the task logistics subsystem 210. The task processor subsystem 214 is responsible for completing the one or more tasks. In an example, the AI agent is configured with the AI model for selecting the one or more agent tools capable of processing the one or more tasks. Agent tools are specialized software and processes employed by the AI agents to accomplish certain operations. AI agents choose the most suitable agent tools based on the task requirements, the capabilities of the agent tools, and the context in which the task is performed. The selection process typically includes assessing the performance metrics of agent tools, compatibility of the performance metrics of the agent tools with existing systems, descriptions of the performance metrics of the agent tools, as well as required and optional parameters, and the specific demands of the task.

In some examples, upon receiving a task, an AI agent within the task processor subsystem 214 selects the appropriate tool to accomplish the task's goal by first analyzing the task's specific requirements. For instance, if the task involves analyzing a dataset to identify top-selling products, the AI agent reviews the available agent tools on the node, such as statistical analysis libraries, machine learning models, and visualization tools. The AI agent then selects the tool best suited to meet the task's objective, for example, a statistical analysis tool capable of processing and analyzing a dataset to identify patterns. The selected tool is executed to perform the task, and the results are returned to the task logistics subsystem for further processing. This method ensures that the tool chosen is optimally matched to the task's requirements, thereby enhancing efficiency and accuracy.

In an example, the task processor subsystem 214 is configured to contribute to one or more activity logs associated with the one or more tasks. These activity logs may specify task start time, selected agent tools, information regarding execution of the agent tools, completion time, and the like.

In some examples, the task processor subsystem 214 is configured to transmit the one or more activity logs associated with the one or more tasks upon a request by the task logistics subsystem 210 allowing the task logistics subsystem 210 to track the progress of the one or more tasks. The task processor subsystem 214 is configured to transmit the status of the one or more tasks, which may be started, in-progress, or completed, to the task logistics subsystem 210.

In an example, AI agents, such as the AI agent within the task processor subsystem 214 may be pre-configured with the one or more agent tools. For example, a search and retrieval tool (e.g., a retrieval augmented generation or RAG tool) may connect to the data retriever subsystem 216 to retrieve the data stored on the node 116 based on the one or more vector embeddings, a query, the one or more metadata, or one or more keywords. The one or more agent tools may utilize an embedding model to create the one or more vector embeddings representative of the query, the one or more metadata, the one or more keywords, or a combination thereof.

In an example, the one or more agent tools are configured to retrieve the data from the nodes 116 by interoperating (e.g., via an API) with the multi-node data retrieval subsystem 218. The one or more agent tools may be configured to provide information descriptive of a list of nodes. In an example, the one or more agent tools may be configured to provide access to the various data stores for storing the one or more data. For instance, the one or more agent tools may include tools to interact with text, images, and video data, or a combination thereof. The one or more agent tools may be configured to interoperate with, analyze, and retrieve, tabular data, graph databases (e.g., employee directory search tool), and third party systems (e.g., websites and APIs).

In an example, the one or more agent tools may be configured to control one or more mechanical devices. The one or more agent tools may be configured to interoperate with the data ingestion subsystem 220 to upload text, files, streaming video, images, and other content, supplied from the interface subsystem 206. The one or more agent tools may be configured to interoperate with the interface subsystem 206 to receive uploaded data including the files, the sensory information, the audio information, associated with the one or more prompts or requests. The one or more agent tools may be configured to interoperate with the task logistics subsystem 210 to generate the one or more tasks by processing and saving the data associated with the one or more tasks. The one or more agent tools may be configured to interoperate with the task logistics subsystem 210 to track the status of each task and to create a response to send to at least one of the interface subsystem 206. The above tool activity may be logged in the event tracking subsystem 222. The one or more agent tools may be configured to connect to a camera, mechanical devices, or one or more other custom tools.

For instance, in one example, upon receiving a user-originated, high-level prompt, such as "Mine aluminum on Mars," an AI agent within the task logistics subsystem 210 decomposes the prompt into a sequence of interdependent tasks that are distributed among the available nodes (robots), each equipped with a node system. The AI agent first identifies the specific capabilities of each node using the network information subsystem 208 and then assigns tasks based on these capabilities. In this example, a first node, specialized in geological surveying, is tasked with identifying an optimal location for mining. A second node, capable of drilling, is then assigned to extract the aluminum ore from the identified location. Finally, a third node, equipped for transport and processing, collects the extracted ore, transports it to a processing unit, and processes it into a usable form. Each task is designed to depend on the completion of preceding tasks, ensuring a logical and efficient sequence of operations to achieve the overall objective.

This system design allows for the flexible, intelligent decomposition of high-level prompts into executable tasks, efficient assignment of these tasks to capable nodes, and adaptive management of the overall process. The use of AI agents at multiple levels (task decomposition, network information querying, task processing) enables the system to handle complex, open-ended prompts and adapt to the challenges of operating in an environment like Mars.

Figure 13:
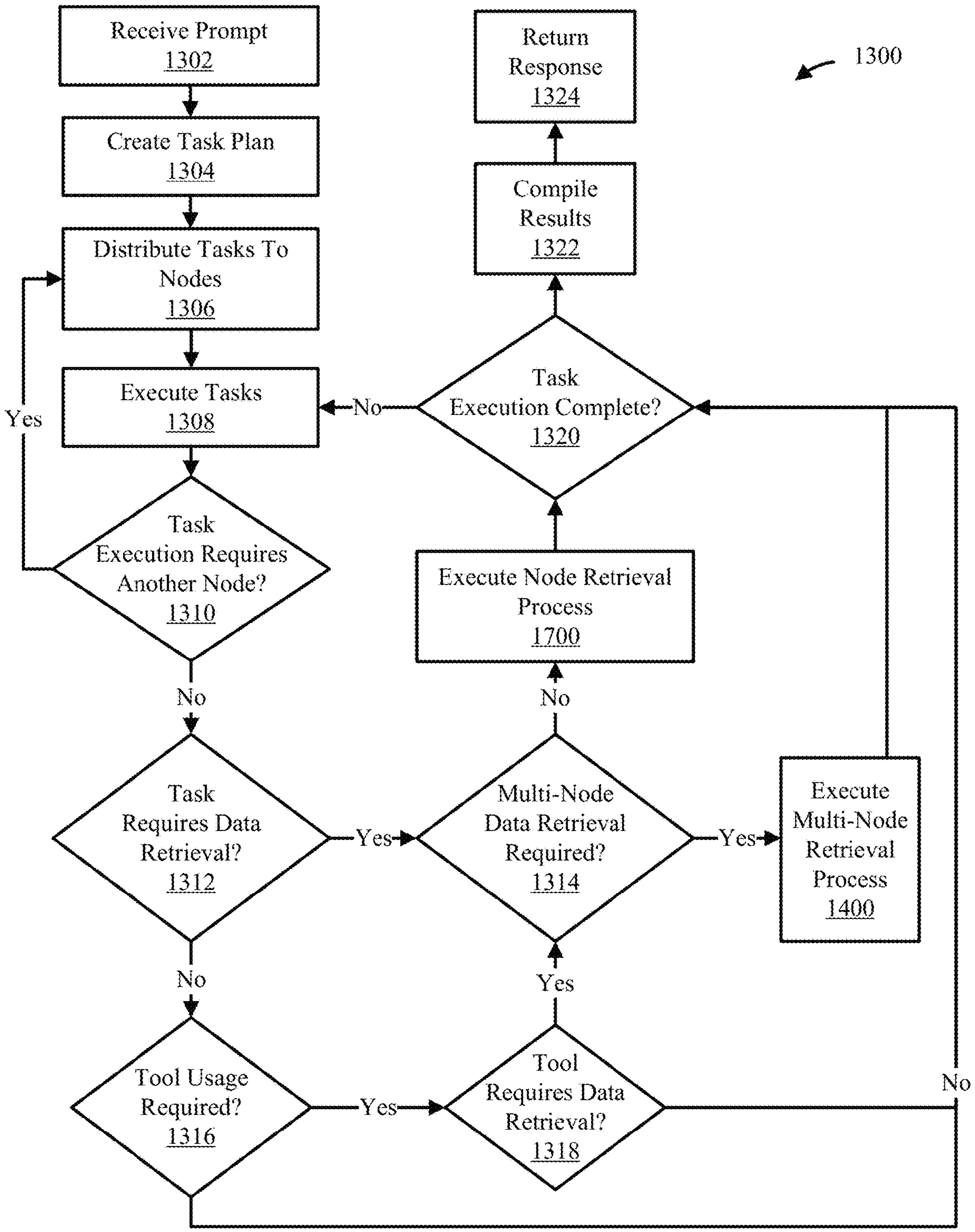
FIG. 13 is a flow chart illustrating a decentralized AI-based process for processing the one or more tasks based on the one or more prompts, in accordance with an example of the present disclosure.

FIG. 13 is a flow chart illustrating a decentralized AI-based method 1300 for processing the one or more tasks based on the one or more prompts, in accordance with an example of the present disclosure.

At step 1302, the data associated with one or more prompts are received from the one or more users through one or more interfaces of one or more nodes. In an example, the one or more prompts may include human language.

At step 1304, one or more tasks associated with the one or more prompts received from the one or more users, are generated using a task logistics subsystem (e.g., the task logistics subsystem 210 of FIG. 2). For instance, in some examples, the task logistics subsystem decomposes prompts into sets of tasks organized within plans. For instance, in some examples, the task logistics subsystem passes the prompt to the decomposition AI agent. In these examples, the decomposition AI agent accesses one or more ontologies (e.g., availability and capability ontologies) via a network information service (e.g., the network information subsystem 208 of FIG. 2) in formulating a task plan.

At step 1306, the task logistics subsystem distributes the tasks specified in the plan to a subset of the nodes 116 for execution. For instance, in some examples, the task logistics subsystem makes one or more API calls to task processors (e.g., the task processor subsystem 214 of FIG. 2) of the subset of nodes 116 assigned to the tasks in the task plan.

At step 1308, the task processors execute the tasks. Several examples of tasks may be executed by the task processors, as will be described in the subsequent steps of the process 1300.

At step 1310, if task execution requires execution of another task by another node, the task processor distributes 1306 the task to the other node for execution.

At step 1312, if the task requires data retrieval, the process 1300 proceeds to step 1314. Otherwise the process 1300 proceeds to the step 1316.

At step 1314, if the task requires multi-node data retrieval, the process 1300 proceeds to execute the process 1400 described herein. Otherwise, the process 1300 proceeds to execute the process 1700 described herein.

At step 1316, if the task requires tool usage, the process 1300 proceeds to the step 1318. Otherwise the process 1300 proceeds to the step 1320.

At step 1318, the tool is used and if usage of the tool results in interoperation with a data retrieval subsystem (e.g. the data retriever subsystem 216 of FIG. 2 or the multi-node data retriever subsystem 218 of FIG. 2), the process 1300 proceeds to the step 1314. Otherwise the process 1300 proceeds to the step 1320.

At step 1320, if task execution is complete, the process 1300 proceeds to the step 1322. Otherwise the process returns to step 1308 and continues task execution.

At step 1322, results from execution of each task are obtained and compiled.

At step 1324, one or more responses to the one or more prompts received in the step 1302 are provided to the one or more users.

Several example use cases in which the system 102 can be utilized follow. In one example, within a task plan generated by the task logistics subsystem, each node is assigned a distinct task, including terrain scanning, drilling, and ore analysis. The task processor subsystem within each node generates task-specific responses: for example, one node's task processor identifies high aluminum concentration areas and provides coordinates along with accuracy metrics and visual heatmaps; another node's task processor subsystem reports the status of drilling operations and provides real-time video feeds; and a third robot's task processor analyzes the aluminum ore for purity, offering a detailed compositional breakdown. These individual responses are then aggregated by the AI agent in the task logistics subsystem, which synthesizes the data into a comprehensive report. The final report includes a summary of completed and ongoing tasks, visual data, and actionable insights, and is outputted to the mission control interface for real-time monitoring and decision-making.

In another example, three autonomous robots, each equipped with a node, are deployed for aluminum mining on Mars, with each robot having distinct capabilities tailored to its specialized role. The first robot, designated as the Surveyor Node, possesses geospatial mapping capabilities, enabling the creation of high-resolution 3D maps of the Martian surface, identification of aluminum deposits, and dynamic path planning for mining operations. The second robot, referred to as the Excavator Node, is equipped with advanced mining tools and material handling systems to excavate and transport aluminum ore, utilizing AI-powered collision avoidance and energy management systems to ensure continuous and efficient operation. The third robot, known as the Processing Node, includes a smelting system for refining the extracted ore into aluminum, along with material analysis and waste management capabilities to optimize the refinement process and maintain inventory control. These robots communicate and coordinate tasks via their respective nodes to achieve efficient, collaborative mining and processing of aluminum on Mars.

In another example, each node is configured with a specific data security schedule to manage access to encrypted data based on operational requirements and security protocols. The Surveyor Node operates from 06:00 AM to 08:00 PM (Mars Local Time) on weekdays, with high-security access during mapping operations and restricted access during daily maintenance periods. The Excavator Node is designed for continuous 24/7 operation from Monday to Saturday, with a daily restricted period from 06:00 PM to 08:00 PM for maintenance, and it implements emergency shutdown protocols that restrict data access in case of equipment failure. The Processing Node is active from 08:00 AM to 10:00 PM on weekdays, with full access to encrypted data during refinement operations and restricted access during quality assurance periods, while remaining inactive on Sundays to allow for system maintenance. These schedules ensure that data access is tightly controlled, aligning with the operational needs of each node while safeguarding against unauthorized access and potential security threats.

In another example, the event tracking subsystem monitors user and system activities to detect potential security threats by identifying deviations from established patterns and protocols. For example, the system may detect unauthorized access attempts if a user tries to access data stored on a node outside of its scheduled security window. It can also identify unusual data transfer activities, such as an unexpectedly large data transfer from a node to an unknown external device. Additionally, the system monitors user behavior for irregularities, such as a user making repeated, atypical requests for sensitive data on a node. The event tracking subsystem utilizes advanced analytical techniques, including machine learning models, to recognize these anomalies and potential threats, such as invalid commands or unauthorized access attempts. When a threat is detected, the system may trigger alerts, block access, or notify the node manager, thereby enhancing the security of the network.

At least some examples disclosed herein have the following advantages. The system 102 may include the one or more registered nodes 116 within one or more node networks including one or more nodes. A registered node may have its own unique security key and data. In an example, there may be some duplicated data that may exist in another node providing for fault tolerant operations. In an example, the one or more electronic devices 104 may be connected to a conversational interface (i.e., the interface subsystem 206). Given the advancements in generative AI capabilities, most web applications may eventually be replaced by APIs. Generative AI models may interact with these APIs directly, providing responses to users through a conversational interface. Essentially, instead of accessing a web application, users will be able to interact with the same data through a generative AI model and interface, leading to a streamlined experience. This represents a significant consolidation of current web application functionalities.

The system 102 may utilize AI models that include third party open source and/or commercial generative AI services including OpenAI models, Anthropic models, Google Gemini models, and the like. These AI models may have capabilities to assist with multi-model content generation, decision making, reasoning, function calling, task planning, execution, and the like. The system 102 is modular and allows the one or more users and one or more organizations to register data sources and crawlers, agent tools, AI models in a simple and modular fashion and with no changes to the application logic of the core system. The system 102 allows for easy updates to newer versions of the core system. The system 102 allows the core system to function in different scenarios in different industries and on different devices. These features are independent of the core system allowing the system to function in different scenarios in different industries and on different devices.

An advantage of the system 102 may include increased security as there is no centralized location for data. The key vault system is configured to encrypt the one or more security keys (e.g., the one or more encryption keys) of the nodes 116. The key vault system is configured to provide and restrict the one or more security keys as needed in cases of unauthorized use and may restrict access to a data security key of the nodes 116 for various reasons including but not limited to irregular behavior.

The system 102 may be configured to assist one or more administrators within an organization and one or more users outside of the organization to accomplish one or more tasks and use cases through natural language. The system 102 may include one or more subsystems which include, but are not limited to, data storage, a crawler, the data ingestion subsystem, the multi-node data retriever subsystem, backend administration, a conversational interface, the event tracking subsystem, and the key vault system.

The system 102 may include a search system (e.g., a RAG system) that performs information retrieval on a variety of data depending on one or more inputs provided by one or more users. The data retrieved may then be submitted to a generative AI model using a natural language prompt to complete the answer to the user's query. The system 102 may include the key vault system responsible for storing and encrypting the one or more data security keys for each node of the nodes 116.

The system 102 may be installed on any device including a server, a mechanical device, and the like. The nodes 116 may communicate with one another and act as a system that may accomplish the one or more tasks. Further, when a node 116 is prompted, the system may distribute the prompt to nodes 116 within the shared node network. The one or more agent tools are independent of the system 102 and installed along with the AI-models. The one or more agent tools may be dependent on the device and industry. For example, the one or more agent tools may be used to control movements of a robot, retrieve and analyze information, retrieve information from the internet, and the like.

Some examples are modular and allow users and organizations to add custom data including proprietary data which may be secured using data security keys. The one or more agent tools, including the RAG tools, data analysis tools, tools that control the device including the mechanical devices, may be customized and added based on specific needs and use cases in a simple and modular fashion and with no changes to the programming code of the method.

The scope of the subject matter claimed herein may include other modifications that occur to those skilled in the art. Such other modifications are intended to be within the scope of the claims if they have similar elements that do not differ from the literal language of the claims or if they include equivalent elements with insubstantial differences from the literal language of the claims.

The examples herein can comprise hardware and software elements. The examples that are implemented in software include but are not limited to, firmware, resident software, microcode, etc. The functions performed by various code described herein may be implemented in variety of combinations. For the purposes of this description, a computer-usable or computer-readable non-transitory medium can be any apparatus that can comprise, store, communicate, propagate, or transport the program for use by or in connection with the instruction execution system, apparatus, or device.

A memory or data storage medium can be an electronic, magnetic, optical, electromagnetic, infrared, or semiconductor system (or apparatus or device). Examples of a memory or computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system 102 either directly or through intervening I/O controllers. Network adapters may also be coupled to the system 102 to enable the data processing system to become coupled to other data processing systems or remote printers or storage devices through intervening private or public networks. Modems, cable modem and Ethernet cards are just a few of the currently available types of network adapters.

A representative hardware environment for practicing the examples may include a hardware configuration of an information handling system 102 in accordance with the examples herein. The system 102 herein comprises at least one processor or central processing unit (CPU). In the system 102, CPUs can be interconnected via a system bus 202 to various devices such as a random-access memory (RAM), read-only memory (ROM), and an input/output (I/O) adapter. The I/O adapter can connect to peripheral devices, including disk units and tape drives, or other program storage devices that are readable by the system 102. The system 102 can read the instructions on the program storage devices and follow these instructions to execute the methodology of the examples herein.

The system 102 further includes a user interface adapter that connects a keyboard, mouse, speaker, microphone, and/or other user interface devices including a touch screen device (not shown) to the bus to gather user input. Additionally, a communication adapter connects the bus to a data processing network, and a display adapter connects the bus to a display device which may be embodied as an output device including a monitor, printer, or transmitter, for example.

A description of an example with several aspects in communication with each other does not imply that all such aspects are required. On the contrary, a variety of optional aspects are described to illustrate the wide variety of possible examples. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other examples need not include the device itself.

The illustrated steps are set out to explain the examples shown, and it should be anticipated that ongoing technological development will change the manner in which particular functions are performed. These examples are presented herein for purposes of illustration, and not limitation. Further, the boundaries of the functional building blocks have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed examples. Also, the words “comprising,” “having,” “containing,” and “including,” and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms “a,” “an,” and “the” include plural references unless the context clearly dictates otherwise.

Finally, the language used in the specification has been principally selected for readability and instructional purposes, and it may not have been selected to delineate or circumscribe the claimed subject matter. It is therefore intended that the scope of the examples disclosed herein be limited not by this detailed description, but rather by any claims that are issued on an application based here on. Accordingly, the examples disclosed herein are intended to be illustrative, not limiting.

What is claimed is:

1. A system comprising:

two or more nodes, each node of the two or more nodes comprising:

a memory; a network information subsystem that maintains one or more consolidated ontologies, stored in a graph database, that map each of the two or more nodes to one or more capabilities, one or more availabilities, and one or more subject matter areas of that node, edges of the graph database relating the two or more nodes with the one or more capabilities, the one or more availabilities, and the one or more subject matter areas; and at least one processor coupled with the memory in the node, the at least one processor is configured to:

receive, by the node of the two or more nodes, a prompt via an interface of the node, generate, using an AI model local to the node, a plurality of tasks to respond to the prompt, identify, using the network information subsystem of the node, a subset of the two or more nodes to perform a task of the plurality of tasks, wherein the identifying comprises an AI agent of the network information subsystem analyzing requirements of the task and using one or more tools to query the one or more consolidated ontologies to select, from among the two or more nodes and based on the capabilities, availabilities, and subject matter areas mapped thereto, the subset of the two or more nodes capable of performing the task and to return a list of the subset of the two or more nodes along with relevance scores, each task being associated with at least one node of the subset of the two or more nodes, communicate the plurality of tasks to the identified subset of the two or more nodes, receive one or more responses from the identified subset of the two or more nodes, generate a summary response based on the one or more responses, and communicate the summary response via the interface of the node that received the prompt.

2. The system of claim 1, wherein the at least one processor is further configured to:

receive a task of the plurality of tasks; and execute the task to generate a response of the one or more responses.

3. The system of claim 1, wherein to generate the plurality of tasks comprises to pass the prompt to an artificial intelligence (AI) model configured to analyze the prompt using natural language processing to (1) identify key topics or context in which the task is to be performed and (2) decompose the prompt into the plurality of tasks based on one or more of the identified topics and context.

4. The system of claim 3, wherein the AI model is configured to generate a task plan organizing the plurality of tasks to correspond to an acyclic graph with interdependencies between tasks.

5. A system comprising:

two or more nodes, each node of the two or more nodes comprising:

a memory storing an AI model; a network information subsystem that maintains one or more consolidated ontologies, stored in a graph database, that map each of the two or more nodes to one or more domains of data stored at that node, the one or more consolidated ontologies comprising a consolidated subject matter ontology and a consolidated geospatial ontology that include information regarding all of the two or more nodes; and at least one processor coupled with the memory in the node, the at least one processor is configured to:

receive, by the node of the two or more nodes, via an interface of the node, a query requesting data from the one or more domains of data, identify, using the network information subsystem of the node, a subset of the two or more nodes storing the data, wherein the identifying comprises an AI agent of the network information subsystem using one or more tools to query the one or more consolidated ontologies to identify, from among the two or more nodes, which nodes store relevant data, retrieve the data from the subset of the two or more nodes, generate a response to the query based on the data, and communicate a response via the interface of the node that received the query.

6. The system of claim 5, wherein the one or more ontologies comprise one or more of a subject matter ontology, a geospatial ontology, geofence ontology, a capability ontology, or an availability ontology.

7. The system of claim 6, wherein:

the geospatial ontology relates nodes with geospatial information.

8. The system of claim 5, wherein:

the query is a first query; and to retrieve the data comprises to communicate a second query based on the first query to the subset of the two or more nodes.

9. The system of claim 8, wherein a node of the subset of the two or more nodes receiving the second query is configured to:

analyze the second query using an artificial intelligence (AI) model;

identify, using the AI model and a data storage ontology local to the node of the subset of the two or more nodes, one or more data stores local to the node of the subset of the two or more nodes that are relevant to the second query, the data storage ontology relates the one or more data stores with subject matter areas; and retrieve data from the identified one or more data stores.

10. The system of claim 8, wherein:

a node of the subset of the two or more nodes comprises a data security subsystem and at least one other subsystem; and the data security subsystem is configured to:

receive a request from the other subsystem to decrypt target data;

determine whether the target data is public data or private data; and decrypt the target data if the target data is public data.

11. The system of claim 10, wherein to decrypt the target data comprises decrypting target data identified via a vector embedding representing multi-modal data, the vector embedding being stored as plaintext.

12. The system of claim 8, wherein:

a node of the subset of the two or more nodes comprises a data security subsystem and at least one other subsystem; and the data security subsystem is configured to:

receive a request from the other subsystem to decrypt target data;

determine whether the target data is public data or private data; and deny decryption of the target data if the target data is private data.

13. The system of claim 5, wherein to retrieve the data comprises to determine whether the data is private data or public data.

14. The system of claim 5, wherein:

each node of the two or more nodes is configured to operate according to a security schedule; and the at least one processor is further configured to determine whether data retrieval requests are in compliance with the security schedule for each node of the two or more nodes.

15. The system of claim 5, wherein:

each node of the two or more nodes comprises a data security subsystem; and to retrieve the data comprises communicating with the data security subsystem to decrypt the data using a security key associated with each node of the two or more nodes.

16. A method of processing a prompt in a system, the system including two or more nodes, each node of the two or more nodes includes a memory, a network information subsystem that maintains one or more consolidated ontologies, stored in a graph database, that map each of the two or more nodes to one or more capabilities, one or more availabilities, and one or more subject matter areas of that node, and at least one processor coupled with the memory in the node, the method comprising:

receiving, by the node of the two or more nodes, a prompt via an interface of the node, generating, using an AI model local to the node, a plurality of tasks to respond to the prompt, identifying, using the network information subsystem of the node, a subset of the two or more nodes to perform a task of the plurality of tasks, wherein the identifying comprises an AI agent of the network information subsystem analyzing requirements of the task and using one or more tools to query the one or more consolidated ontologies to select, from among the two or more nodes and based on the capabilities, availabilities, and subject matter areas mapped thereto, the subset of the two or more nodes capable of performing the task and to return a list of the subset of the two or more nodes along with relevance scores, each task being associated with at least one node of the subset of the two or more nodes, communicating the plurality of tasks to the identified subset of the two or more nodes, receiving one or more responses from the identified subset of the two or more nodes, generating a summary response based on the one or more responses, and communicating the summary response via the interface of the node that received the prompt.

17. A method of processing a prompt in a system, the system including two or more nodes, each node of the two or more nodes comprising a memory storing an AI model, each node of the two or more nodes further comprising a network information subsystem that maintains one or more consolidated ontologies, stored in a graph database, that map each of the two or more nodes to one or more domains of data stored at that node, the one or more consolidated ontologies comprising a consolidated subject matter ontology and a consolidated geospatial ontology that include information regarding all of the two or more nodes, each node of the two or more nodes being associated with at least one domain of the one or more domains of data and at least one processor coupled with the memory in the node, the method comprising:

receiving, by the node of the two or more nodes, via an interface of the node, a query requesting data from the one or more domains of data, identifying, using the network information subsystem of the node, a subset of the two or more nodes storing the data, wherein the identifying comprises an AI agent of the network information subsystem using one or more tools to query the one or more consolidated ontologies to identify, from among the two or more nodes, which nodes store relevant data, retrieving the data from the subset of the two or more nodes, generating a response to the query based on the data, and communicating a response via the interface of the node that received the query.

* * * * *